(12) United States Patent
Akkarawittayapoom

(10) Patent No.: US 10,296,569 B2
(45) Date of Patent: *May 21, 2019

(54) SYSTEMS AND METHODS FOR CREATING USER-MANAGED ONLINE PAGES (MAPPAGES) LINKED TO LOCATIONS ON AN INTERACTIVE DIGITAL MAP

(71) Applicant: Somchai Akkarawittayapoom, Bangkok (TH)

(72) Inventor: Somchai Akkarawittayapoom, Bangkok (TH)

(73) Assignee: Somchai Akkarawittayapoom, Bangkok (TH)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,070

(22) Filed: Nov. 17, 2017

(65) Prior Publication Data
US 2018/0095944 A1    Apr. 5, 2018

Related U.S. Application Data

(63) Continuation-in-part of application No. PCT/IB2016/000900, filed on May 17, 2016, which is
(Continued)

(51) Int. Cl.
*G06F 17/00* (2019.01)
*G06F 17/22* (2006.01)
(Continued)

(52) U.S. Cl.
CPC ...... *G06F 17/2288* (2013.01); *G06F 17/2247* (2013.01); *G06F 17/248* (2013.01);
(Continued)

(58) Field of Classification Search
CPC .... G06F 17/24; G06F 17/212; G06F 17/3001; G06F 17/2288; G06F 17/2247;
(Continued)

(56) References Cited

U.S. PATENT DOCUMENTS 5,418,949 A    5/1995  Suzuki
5,960,411 A    9/1999  Hartman et al.
(Continued)

*Primary Examiner* — Scott T Baderman
*Assistant Examiner* — Hassan Mrabi
(74) *Attorney, Agent, or Firm* — Morgan Lewis & Bockius LLP

(57) ABSTRACT

Systems and methods are used to enable creating, searching, and managing user-managed online pages (e.g., MAPpages) linked to locations on an interactive digital map. In one aspect, the method includes, at a server system: receiving, from a client, a request to create a new MAPpage of a first type selected from a plurality of preexisting types; creating the new MAPpage of the first type associated with a first physical location and the client, uploading the new MAPpage to a platform containing MAPpages uploaded directly from content contributors; indexing the new MAPpage to the first physical location on an interactive digital map; and for each MAPpage associated with the client, enabling the client to associate the respective MAPpage with one or more physical locations, the one or more physical locations including the first physical location.

16 Claims, 49 Drawing Sheets

Related U.S. Application Data a continuation-in-part of application No. 14/855,204, filed on Sep. 15, 2015, now Pat. No. 9,654,549.

(60) Provisional application No. 62/162,837, filed on May 18, 2015.

(51) Int. Cl.

| | |
|---|---|
| *H04L 29/08* | (2006.01) |
| *G06Q 30/02* | (2012.01) |
| *G06F 17/30* | (2006.01) |
| *G06F 17/24* | (2006.01) |
| *G06Q 10/10* | (2012.01) |
| *G06Q 30/00* | (2012.01) |
| *H04W 4/02* | (2018.01) |
| *H04L 29/06* | (2006.01) |
| *G06Q 50/00* | (2012.01) |

(52) U.S. Cl.
CPC ..... *G06F 17/3087* (2013.01); *G06F 17/30241* (2013.01); *G06F 17/30867* (2013.01); *G06F 17/30991* (2013.01); *G06Q 10/10* (2013.01); *G06Q 30/00* (2013.01); *G06Q 30/0261* (2013.01); *G06Q 30/0277* (2013.01); *H04L 67/02* (2013.01); *H04L 67/18* (2013.01); *H04L 67/306* (2013.01); *H04W 4/02* (2013.01); *G06Q 50/01* (2013.01); *H04L 67/42* (2013.01)

(58) Field of Classification Search
CPC ......... G06F 17/30991; G06F 17/30241; G06F 17/30867; G06F 17/248; G06F 17/3087; G06Q 30/00; G06Q 30/0261; G06Q 30/0277; G06Q 10/10; G06Q 50/01; H04W 4/02
USPC .................................................. 715/255, 229
See application file for complete search history.

(56) References Cited

U.S. PATENT DOCUMENTS

| | | |
|---|---|---|
| 6,026,433 A | 2/2000 | D'Arlach et al. |
| 8,065,291 B2 | 11/2011 | Knorr |
| 8,108,416 B2 | 1/2012 | Marlow |
| 8,190,997 B2 | 5/2012 | Shellen et al. |
| 8,510,349 B1 | 8/2013 | Puttick |
| 8,515,839 B2 | 8/2013 | Ma et al. |
| 8,600,814 B2 | 12/2013 | Dubnicki |
| 8,635,228 B2 | 1/2014 | Shahabi et al. |
| 8,768,912 B2 | 7/2014 | Virdy |
| 8,774,825 B2 | 7/2014 | Forstall et al. |
| 8,799,799 B1 | 8/2014 | Cervelli et al. |
| 8,823,734 B1 | 9/2014 | Bailiang |
| 8,856,644 B1 | 10/2014 | Pereira et al. |
| 8,930,233 B2 | 1/2015 | Johnson |
| 8,965,988 B1 | 2/2015 | Negahban et al. |
| 9,087,035 B1 | 7/2015 | Bandaru et al. |
| 2003/0225853 A1 | 12/2003 | Wang et al. |
| 2004/0215516 A1 | 10/2004 | Demoon et al. |
| 2005/0246265 A1 | 11/2005 | McHale et al. |
| 2006/0161599 A1 | 7/2006 | Rosen |
| 2007/0192299 A1 | 8/2007 | Zuckerberg et al. |
| 2007/0214141 A1 | 9/2007 | Sitting et al. |
| 2008/0033641 A1 | 2/2008 | Medalia |
| 2008/0033652 A1 | 2/2008 | Hensley et al. |
| 2008/0086368 A1 | 4/2008 | Bauman et al. |
| 2008/0102857 A1 | 5/2008 | Kim |
| 2008/0140640 A1 | 6/2008 | Raff |
| 2009/0043598 A1 | 2/2009 | Mayer |
| 2009/0049374 A1 | 2/2009 | Echenberg |
| 2010/0017703 A1 | 1/2010 | Glickman, Jr. et al. |
| 2010/0331016 A1 | 12/2010 | Dutton et al. |
| 2011/0082746 A1 | 4/2011 | Rice et al. |
| 2011/0112892 A1 | 5/2011 | Tarantino |
| 2011/0202822 A1 | 8/2011 | Zuckerberg et al. |
| 2012/0159314 A1 | 6/2012 | Schrier et al. |
| 2013/0045729 A1 | 2/2013 | Haik et al. |
| 2013/0060636 A1 | 3/2013 | Walker et al. |
| 2013/0145257 A1 | 6/2013 | Shalabi et al. |
| 2014/0032325 A1 | 1/2014 | Weiss et al. |
| 2014/0074934 A1 | 3/2014 | an Hoff et al. |
| 2014/0075275 A1 | 3/2014 | Aleksandrovsky et al. |
| 2014/0075289 A1 | 3/2014 | Brant |
| 2014/0082064 A1 | 3/2014 | Nicks et al. |
| 2014/0188635 A1 | 7/2014 | Badger et al. |
| 2015/0120696 A1 | 4/2015 | Blemaster |
| 2015/0199647 A1 | 7/2015 | Shin et al. |
| 2015/0363503 A1 | 12/2015 | Scheuerman |
| 2016/0302030 A1 | 10/2016 | White |

Blank page
Single Listing page
Multi-listing page
User Profile page
Resume page
Company Profile page
Promotion page
Advertising page
Brochure page
Leaflet page
Flyer page
Catalogue page
Timeline page
Web page (URL page)

Receive, from a second client, a search request for MAPpages in the platform, wherein the search request includes a location parameter and a search parameter;
execute the search request concurrently with the location parameter and the search parameter;
identify one or more candidate MAPpages that meet the location parameter and the search parameter; and
return, to the second client, two or more candidate MAPpages in response to the search request, wherein:
a first candidate MAPpage is displayed with a first set of attributes, and
a second candidate MAPpage is displayed with a second set of attributes

~1834

Figure 18C

SYSTEMS AND METHODS FOR CREATING USER-MANAGED ONLINE PAGES (MAPPAGES) LINKED TO LOCATIONS ON AN INTERACTIVE DIGITAL MAP

RELATED APPLICATIONS

This application is a continuation-in-part of PCT International Application Serial No. PCT/IB2016/000900, filed May 17, 2016, which is a continuation-in-part of U.S. application Ser. No. 14/855,204, filed Sep. 15, 2015, which claims priority to U.S. Provisional Application Ser. No. 62/162,837, filed May 18, 2015, which are incorporated herein by reference in their entirety.

TECHNICAL FIELD

The disclosed embodiments relate generally to online document creation attached to an interactive digital map, and more particularly to systems, methods, and computer readable storage media for creating user-managed online pages and/or documents attached to one-to-one virtual and physical locations on an interactive digital map or satellite imagery via a communication network.

BACKGROUND

In the analogue world, people use paper and pencil/pen to do many things such as write, draw, calculate and create graphics to express, describe, communicate, show, promote, and advertise. This familiarity with pages means most people are capable of creating page or even several pages of content.

The first step to creating a web page is to create and register a unique domain name as their web address. One of the most common problems that most of the people encounter is registering a unique domain name. There has been many cases where corporations or individuals who have discovered that their names were already registered by unknown third parties.

As the computer has developed over half a century, most people today can use a computer and keyboard or other input devices to create a page or a document. As the World Wide Web (www) has been around for about 3 decades, the sole method of creating an online page or online document (web page) has required people to understand Hyper Text Markup Language (HTML). Therefore, only people who know HTML can develop or create a web page, which makes it difficult for most people to create or develop their own web page.

Consequently, this has led to the increasing popularity of social networking websites and applications that enhance social interaction among individuals through the Internet such as Facebook and Instagram. Many individuals even use various social networking websites to conduct their businesses. Therefore, there are virtually no limits to the number of social networking accounts a single person can create on any social networking website as there is no request that individuals reveal their true identity. In fact, there are many fake accounts created both by individuals or organization because social networking websites were not designed to promote businesses, which has led to credibility issues.

In the real world, trustworthy individuals, businesses and organizations conduct their businesses or activities on physical locations. That is why there are many physical locations such as stores, offices, shops, restaurants, hotels, schools, universities, factories, showrooms, warehouses, and public organization. This physicality then is unique and part of each individual and organization's identity. This physical presence is something that people generally regard as one of the most important criteria of a trustworthy business or organization.

Every business organization, from individuals to small and medium or even large enterprises, needs to promote and advertise their products and services. Promoting and advertising is a major expense and investment especially to individuals and small businesses. Finding the right marketing tools, channels or media to promote and advertise is difficult, troublesome, time consuming, and inefficient, as well as not knowing the returns of any marketing-related investment.

The majority of the current marketing model globally is in the form of creating and publishing content to attract people interested in inserting advertisements into various printed or online content in hopes that people consuming those contents will be interested in those advertisements. Advertisements on television, newspapers, magazines, online magazines, radio channels, and search engines all fall into this category.

However, many direct advertisements still have many limitations. Billboards have physical limitations in that they are only effective when people look up to see the advertisement on the billboard, which is only possible if they pass by that physical location. In addition, most current marketing models have limited flexibility to rapidly manage, change or adjust the marketing campaign or advertisement.

At present, most members of the general public who do not know HTML are unable to create or develop the online pages and/or documents by themselves. Therefore, they are unable to promote or advertise their products and/or services online easily at their own physical location without making significant marketing outlay as most marketing strategies use conventional media channels. Some people or organizations complement their conventional channels with social networking web sites or applications designed to encourage social sharing and interaction as a way of promoting their products and services. However, social networking websites were not designed to promote products and services and have limitations and credibility issues.

SUMMARY

Accordingly, there is a need for systems and methods for creating user-managed online pages so that anyone with the ability to use a computer and keyboard or any computing device should be able to create or develop their own online page or online document. This is especially true since the Internet has increasingly become a utility network for people to communicate, share, view, educate, learn, interact, and transact with each other through several kinds of computing devices, and is a medium that encourages interaction between vast numbers of individuals and organizations.

The present disclosure relates to systems and methods for creating user-managed online pages (MAPpage) via a communication network linked to one-to-one virtual and physical locations on an interactive digital map. The disclosed embodiments will enable anyone to create pages visible online or documents easily without having any knowledge of HTML language or computer programming languages. The system will act as a platform for any user to create, develop, search, view, share, post, advertise, promote and manage pages visible online or documents and even interact, comment, provide feedback, communicate, and conduct business transactions with other users.

Users will be able to create pages and/or documents attached to defined physical geographical locations or areas on the digital map. The physical geographical locations or areas as defined by the users, will act as the address of each user's MAPpage and/or documents without having to acquire, register and use a domain name on the World Wide Web (WWW). There is no requirement in the present systems and methods that the pages created by such users by coded with HTML or other computer languages or protocols.

The disclosed embodiments allow users to search pages visible online and/or documents by various search methods/criteria (Locate, Near Me, Promotion, Featured, Key word, etc.) on an interactive digital map from a variety of computing devices such as desktop and laptop computers, tablets, handheld computing devices, mobile computing devices, and wearable computing devices.

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable creating, searching, and managing user-managed online pages (e.g., MAPpages) linked to locations on an interactive digital map.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures. In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device.

FIG. 6 is a sample listing of online document templates in accordance with some embodiments.

FIGS. 18A-18C are flow diagrams illustrating a method of creating, indexing, managing, and/or searching user-managed online pages (e.g., MAPpages) linked to locations on an interactive digital map, in accordance with some embodiments.

DETAILED DESCRIPTION

Figure 1:
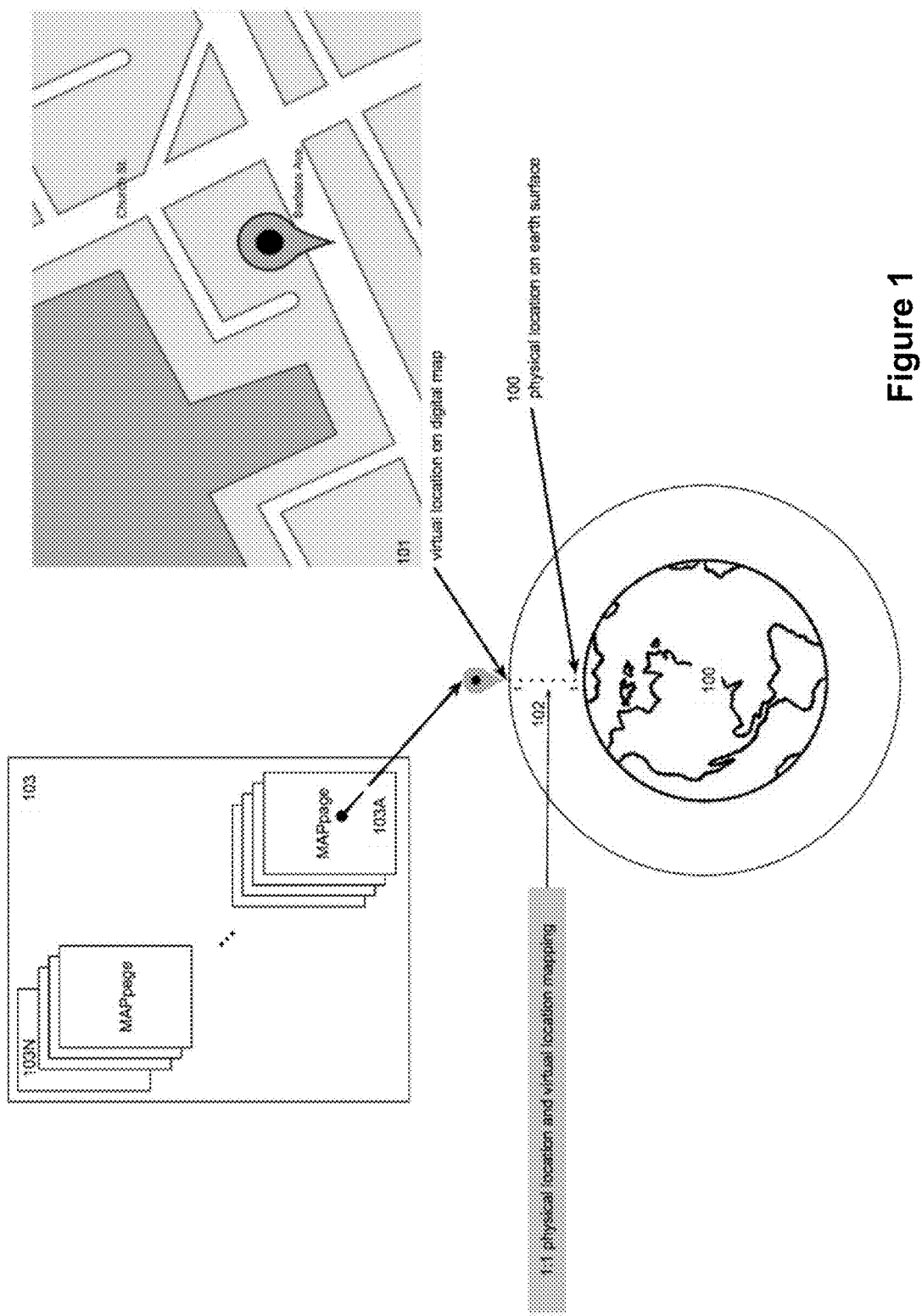
FIG. 1 is a conceptual diagram illustrating an embodiment of the present invention.

The following is a detailed description of illustrative embodiments of the present invention. As these embodiments of the present invention are described with reference to the aforementioned drawings, various modifications or adaptations of the methods and or specific systems described may become apparent to those skilled in the art. All such modifications, adaptations, or variations that rely upon the teachings of the present invention, and through which these teachings have advanced the art, are considered to be within the spirit and scope of the present invention. The descriptions and drawings are not to be considered in a limiting sense as it is understood that the present invention is in no way limited to the embodiments illustrated.

MAPpage is a page or document, visible online, that attaches to a selected address or area of virtual location on an interactive digital map which is correlated in terms of a one-to-one relationship to geographical physical location. Digital map technology can be Google Maps, Apple Maps or other third parties Map platforms which are used to provide interactive digital maps for this present invention. Users can create and present a wide variety of information on a platform that offers a wide range of templates for them to customize. The methods and systems of the present invention will allow users to control the digital map and create online pages (MAPpage) to be virtually linked or attached to the geographical physical location in a digital form through its virtual location on an interactive digital map. Various types of data or information can be integrated. Registered users need to be an owner or have the authority to utilize the defined geographical location.

The present invention includes systems and methods that help members of the general public by offering user-friendly online templates that registered members can easily create, upload, update, hide or make public, edit, and delete information themselves. One way the MAPpage platform distinguish over other platforms is that there is no requirement to know any HTML or computer programming languages. The templates that are offered can simply be used as long as the end-users know how to navigate online and register to use their personal MAPpage. The platform allows people to conduct location-based searches. The systems allow users to link their MAPpage to other social networking applications. The systems allow people to subscribe, follow and comment as well as create groups of users and classify them into different classes of viewing.

MAPpage is a new way of allowing individual end-users to eliminate problems associated with registering one's own website by using conventional domain names due to the high probability of not getting a unique name on the world wide web.

The MAPpage can be created and accessed through all types of computing equipment including desktop computers, laptops, tablets, and all types of handheld, mobile, and wearable computing devices.

The various embodiments described herein include systems, methods and/or devices used to enable creating, managing, and/or searching user-managed online pages (e.g., MAPpages) linked to locations on an interactive digital map. Some embodiments include systems, methods and/or devices to create a new MAPpage (e.g., associated with a physical location, contact information, a client, a type, and a timestamp), and to enable the client to associate one or more MAPpages with one or more physical locations and/or one or more sets of contact information.

(A1) In accordance with some embodiments, a method is performed at a server system. The method includes: receiving, from a client, a request to create a new MAPpage. The MAPpage is a page visible online that is associated with a first physical location. The client is prompted to select a type for the new MAPpage from a plurality of preexisting types. In some embodiments, the plurality of preexisting types comprises two or more preexisting types selected from the group consisting of a single listing page, a multi-listing page, a user profile page, a resume page, a company profile page, a promotion page, a property page, an auto page, a jobs page, a services page, and a products page. In some embodiments, the plurality of preexisting types comprises three or more preexisting types selected from the group consisting of a single listing page, a multi-listing page, a user profile page, a resume page, a company profile page, a promotion page, a property page, an auto page, a jobs page, a services page, and a products page. In some embodiments, the plurality of preexisting types comprises four or more preexisting types selected from the group consisting of a single listing page, a multi-listing page, a user profile page, a resume page, a company profile page, a promotion page, a property page, an auto page, a jobs page, a services page, and a products page. In some embodiments, the plurality of preexisting types comprises additional preexisting types not listed above. In response to receiving a first selection of the type for the new MAPpage, the client is prompted to select a template for the new MAPpage from a plurality of preexisting templates of the selected type. In response to receiving a second selection of the template for the new MAPpage, providing the template to the client for inputting one or more content elements for the new MAPpage; receiving, from the client, the one or more content elements for the new MAPpage. The method continues by prompting the client to identify the first physical location associated with the new MAPpage, prompting the client to identify contact information associated with the new MAPpage, and creating the new MAPpage. In some embodiments, the new MAPpage is associated with the identified first physical location. In some embodiments, the new MAPpage is associated with the identified contact information. In some embodiments, the new MAPpage is associated with the client. In some embodiments, the new MAPpage is associated with the preexisting type. In some embodiments, the new MAPpage is associated with the timestamp. In some embodiments, the new MAPpage is associated with any combination or all of the identified first physical location, the identified contact information, the client, the preexisting type and the time stamp. In some embodiments the new MAPpage is associated with a first type and an existing MAPpage associated with the client is associated with a second type, distinct from the first type; and for each MAPpage associated with the client, the client is enabled to associate the respective MAPpage with one or more physical locations, the one or more physical locations including the first physical location, and/or one or more sets of contact information.

(A2) In some embodiments of the method of A1, the one or more physical locations, including the first physical location, are on an interactive digital map.

(A3) In some embodiments of the method of any of A1 to A2, an association is formed with any combination of one or more MAPpages associated with the client, one or more physical locations associated with the client, and zero or more sets of contact information associated with the client.

(A4) In some embodiments of the method of any of A1 to A3, the new MAPpage is associated with one or more physical locations.

(A5) In some embodiments of the method of any of A1 to A4, the new MAPpage is associated with zero or more sets of contact information.

(A6) In some embodiments of the method of any of A1 to A5, two or more MAPpages associated with the client are associated with a single physical location.

(A7) In some embodiments of the method of any of A1 to A6, two or more MAPpages associated with the client are associated with a single set of contact information.

(A8) In some embodiments of the method of any of A1 to A7, prompting the client to identify the first physical location associated with the new MAPpage includes prompting the client to identify a new location or to select a previously identified location.

(A9) In some embodiments of the method of any of A1 to A8, prompting the client to identify contact information associated with the new MAPpage includes prompting the client to identify new contact information or to select previously identified contact information.

(A10) In some embodiments of the method of any of A1 to A9, content of the new MAPpage and the existing MAPpage associated with the client is managed by the client.

(A11) In some embodiments of the method of any of A1 to A10, for each MAPpage associated with the client, privacy of a respective MAPpage is uniquely adjusted by the client.

(A12) In some embodiments of the method of any of A1 to A11, the contact information includes public contact information and private contact information.

(A13) In some embodiments of the method of any of A1 to A12, the new MAPpage is associated with one or more existing MAPpages associated with the client.

(A14) In some embodiments of the method of any of A1 to A13, creating the new MAPpage includes posting and/or uploading the new MAPpage to a platform containing MAPpages uploaded directly from content creators, such as the client.

(A15) In some embodiments of the method of A14, creating the new MAPpage includes indexing the new MAPpage for searching in the platform.

(A16) In some embodiments of the method of any of A1 to A15, the method includes: receiving, from the client, a new MAPpage template; and in response to receiving the new MAPpage template from the client, providing the new MAPpage template as a selection option for users other than the client.

(A17) In some embodiments of the method of any of A14 to A16, the method includes: receiving, from a second client, a search request for MAPpages in the platform; receiving, from the second client, a location parameter for the search request; receiving, from the second client, at a different time than receiving the location parameter for the search request, a search parameter, distinct from the location parameter, for the search request; executing the search request concurrently with the location parameter and the search parameter; identifying one or more candidate MAPpages that meet the location parameter and the search parameter; and returning, to the second client, at least one of the candidate MAPpages in response to the search request.

(A18) In some embodiments of the method of A17, the method includes prior to receiving, from the second client, the location parameter for the search request, providing, to the second client, a range for the location parameter for the search request.

(A19) In some embodiments of the method of A18, the range is modified by the second client.

(A20) In some embodiments of the method of any of A18 to A19, providing the range for the location parameter for the search request includes providing a map from which to indicate the location parameter.

(A21) In some embodiments of the method of A20, the location parameter for the search request is indicated by the second client selecting an area of interest on the map.

(A22) In some embodiments of the method of any of A17 to A21, the second client and the client are the same user.

(A23) In some embodiments of the method of any of A17 to A22, the method includes, in response to the search request, returning, to the second client, the at least one of the candidate MAPpages and one or more search results from a web crawler, wherein the candidate MAPpages are distinguished from the search results from the web crawler.

(A24) In some embodiments of the method of A23, the one or more search results from the web crawler satisfy the location parameter.

(A25) In another aspect, a server system includes one or more processors and memory, the memory storing instructions that, when executed by the one or more processors, cause the server system to perform or control performance of any of the methods A1 to A24 described herein.

(A26) In yet another aspect, some embodiments include a non-transitory computer readable storage medium, storing one or more programs configured for execution by one or more processors of a server system, the one or more programs including instructions for performing any of the methods A1 to A24 described herein.

(B1) In accordance with some embodiments, a method is performed at a server system. The method includes: receiving, from a client, a request to create a new MAPpage of a first type. The first type is selected from a plurality of preexisting types including two or more preexisting types of MAPpages for information, products, and/or services. The client creates the new MAPpage of the first type, wherein the new MAPpage is associated with a first physical location and the client, and uploads the new MAPpage of the first type to a platform containing MAPpages uploaded directly from content contributors. The platform includes MAPpages of a second type, distinct from the first type, of the plurality of preexisting types. The method continues by indexing the new MAPpage to the first physical location on an interactive digital map, wherein the first physical location acts as a default address of the new MAPpage. The new MAPpage is not associated with a domain name on the World Wide Web (WWW). For each MAPpage associated with the client, enabling the client to associate the respective MAPpage with one or more physical locations, the one or more physical locations including the first physical location.

(B2) In some embodiments of the method of B1, the first physical location is a set of geographic coordinates including latitude, longitude, and/or elevation.

(B3) In some embodiments of the method of any of B1 to B2, the first physical location is a physical address.

(B4) In some embodiments of the method of any of B1 to B3, the default address of the new MAPpage is further editable by the client.

(B5) In some embodiments of the method of B4, further editing by the client of the default address of the new MAPpage includes adding an additional physical location associated with the MAPpage.

(B6) In some embodiments of the method of any of B4 to B5, further editing by the client of the default address of the new MAPpage includes changing the default address of the MAPpage from the first physical location to a different physical location.

(B7) In some embodiments of the method of any of B1 to B6, an association is formed with any combination of one or more MAPpages associated with the client, one or more physical locations associated with the client, and zero or more sets of contact information associated with the client.

(B8) In some embodiments of the method of any of B1 to B7, the new MAPpage is associated with one or more physical locations.

(B9) In some embodiments of the method of any of B1 to B8, the new MAPpage is associated with zero or more sets of contact information.

(B10) In some embodiments of the method of any of B1 to B9, two or more MAPpages associated with the client are associated with a single physical location.

(B11) In some embodiments of the method of any of B1 to B10, two or more MAPpages associated with the client are associated with a single set of contact information.

(B12) In some embodiments of the method of any of B1 to B11, for each MAPpage associated with the client, privacy of a respective MAPpage is uniquely adjusted by the client.

(B13) In some embodiments of the method of any of B1 to B12, the new MAPpage is associated with one or more existing MAPpages associated with the client.

(B14) In some embodiments of the method of any of B1 to B13, the method includes receiving, from a second client, a search request for MAPpages in the platform; the search request includes a location parameter and a search parameter; executing the search request concurrently with the location parameter and the search parameter; identifying one or more candidate MAPpages that meet the location parameter and the search parameter; and returning, to the second client, two or more candidate MAPpages in response to the search request. A first candidate MAPpage is displayed with a first set of attributes, and a second candidate MAPpage is displayed with a second set of attributes.

(B15) In another aspect, a server system includes one or more processors and memory, the memory storing instructions that, when executed by the one or more processors, cause the server system to perform or control performance of any of the methods B1 to B14 described herein.

(B16) In yet another aspect, some embodiments include a non-transitory computer readable storage medium, storing one or more programs configured for execution by one or more processors of a server system, the one or more programs including instructions for performing any of the methods B1 to B14 described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1 is a conceptual diagram illustrating an embodiment of the present invention. Physical location 100 depicts the existing geographical location on Earth that people can actually visit.

Virtual location 101 is the unique and corresponding virtual location of 100 on digital map platform technologies such as Google Maps, Apple Maps or any other digital map. The digital format allows us to regard these digital locations as virtual locations.

The relationship depicted in 102 is the unique one-to-one link that exists between the physical location 100 and the virtual location 101, which is what allows the invention to create a platform enabling users to create a set of online documents shown as 103A to 103N. In being a digital platform, users can access many types of information but most importantly, it is a user-friendly platform that allows its registered members to create and manage their own content at any time, at their own convenience.

The present invention is the systems and methods of creating MAPpage 103. The system 200 offers a user-friendly platform that offers a wide selection of templates to suit different needs. All registered members can select the templates they need and input content, which can be anything from text to photos and graphics and web links, and after confirming, the data is immediately uploaded to the System 200. All the content can be edited and deleted by the content-owner and there are sections that allow other members to interact by posting comments on MAPpage and sharing information on social networks. Anyone on the Internet can easily find MAPpage 103 by conducting an online search on any type of computing devices by referred to location data from GPS or location identification functionality of mobile computing devices. MAPpage 103 could simply be shared with anyone via email and social networking websites or applications. There are no limits to the types of transactions that can be done both on and with the MAPpage 103.

Figure 2:
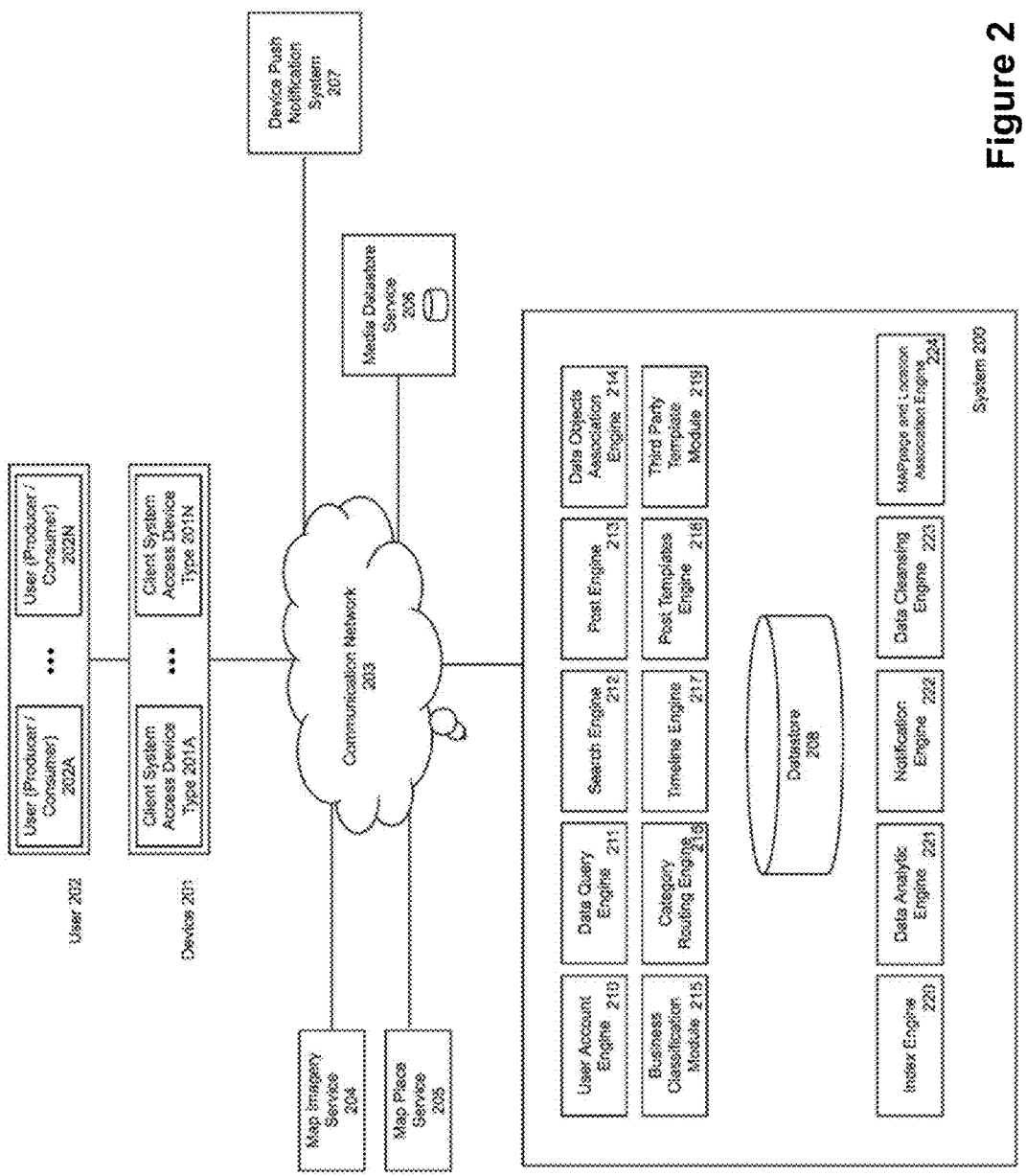
FIG. 2 is a high-level block diagram of a system application environment in accordance with some embodiments.

FIG. 2 is a high-level block diagram of a system application environment in accordance with an embodiment of the invention. The block diagram illustrates an example of a high-level systems application environment to generate and manage MAPpage 103.

System 200 comprises many different elements. System application environment in FIG. 2 has three primary components. The first is System 200, a wide range of Devices (collectively 201, but can there are no limits to appliances such as mobile computing devices that can access this digital platform hence 201A to 201N) that is the medium the system is accessed and content is created (to be explained in detail in FIG. 3 block diagram), and the User 202 who uses the devices. There are no limits to the number of users and each user can have two roles in being both a producer and manager of content on each MAPpage 103, and a consumer who accesses other MAPpage 103 produced in the system. Thus, User 202 are simultaneously producers and consumers.

To access System 200, User 202 has to do so on a Device 201, which then links to a Communication Network 203, which is the hub that allows this platform to work as it can be accessed from anywhere on earth, and offers business continuity online to support Users 202 at all times.

Besides Device 201 and System 200 that are linked to each other via the Communication Network 203, there are many supporting aspects to the system which can be used to improve the efficiency of the system. It could be map imagery service 204 which provides additional images of maps. There is map place service 205 which can be accessed to provide additional place information that is linked to the maps shown in Map Imagery Service 204. The large scale media datastore service 206 is where all types of media such as images, videos and sound clips are stored. The Device Push Notification System 207 is a complementary section that is responsible for global content caching and global content distribution so that the data can be sent quickly to members who elect to receive push-notification that sends messages to their Devices 201, and other systems as they see fit, which should facilitate their needs. The way each of these elements work are illustrated in FIG. 2.

System 200 has many subsystems that cooperate together to perform the required functionality such as creating and managing MAPpage 103. It starts from the most elementary stages such as checking on each user session. For instance, if user 202 posts content such as creating MAPpage 103 or initiating user interaction such as like, share, or comment, every user interaction will be logged into System 200 and checked by user account engine 210 which is responsible for creating and managing the user account profile to identify the user 202. A user account needs to be created before allowing the user to interact with the System 200 by creating MAPpage 103, and logging in to the user account first is necessary to any interactions through applications installed on the device 201. The user account which can then be used as a reference point in the system. When the registration is completed, all the data is stored in the datastore 208, which in some embodiments is a central database for the system. If the user 202 accesses the system 200 in a consumer role, there is no need to create a user account as long as there is no user interaction that requires content creation that will be stored in System 200. If there is interaction that requires data storage, the user 202 will have to create a user account in the user account service engine 210. The purpose of this design is to make the system easy to use from the general public perspective. Therefore every potential user 202 is encouraged to explore the overall functionality of the system before asking them to complete a user registration.

The subsystem in system 200 which responds to the MAPpage 103 creation and lifecycle management is the post engine 213. In some embodiments, the post engine subsystem handles every MAPpage creation request from the user 202 through applications installed on device 201. To handle MAPpage creation and management properly, the post engine 213 cooperates with other subsystems in system 200 such as media datastore service 206 which stores media files that the user 202 uploads during the MAPpage 103 posting. Media data store service 206 also handles global content caching and distribution for other users to access media content around the world. The post engine 213 also cooperates with the data objects association engine 214 to establish the underlying information association between MAPpage 103 and other related information within the system 200. The business classification module 215 analyzes and classifies MAPpage 103 content into appropriate classes such as individual users, small/medium business users or large enterprise users. Also having the category routing engine 216 to analyze and tag the MAPpage 103 information with virtual categories recognized by the system 200 to indicate that the content of posting MAPpage 103 by User 202 such as property, automotive, jobs, products or services; daily life categories such as eat, drink, play, stay or other categories related to the user's daily life activities. The purpose of these classification and categorization operations is to make the system easy to use when other users 202, operating in consumer roles, need to find or access MAPpage 103 that match to what they are looking for in daily life activities. System 200 can respond to a user 202 quickly and comprehensively. The user 202 can retrieve MAPpage 103 by using advance search operations such as a location-based search because the system 200 has a subsystem called MAPpage and location association engine 224 to associate the MAPpage information with location and contact information to provide location-based search on digital map through the application installed on the device 201.

When a MAPpage 103 has been created or updated by a user 202, operating in the Producer role, an important subsystem is the index engine 220 which responds by automatically indexing the MAPpage 103 information and making the MAPpage 103 available to search. Index engine 220 indexes MAPpage 103, data store 208 and all the aggregated and extracted data from the business classification module 215 and category routing engine 216 into the index engine 220.

Furthermore, the system 200 has a subsystem called the data analytic engine 221 to analyze and perform artificial intelligence algorithms on the created or updated MAPpage 103 by the user 202 to make the system better understand each User's behavior and preferences associated with MAPpage 103. The system's data cleansing engine 223 subsystem automatically identifies and removes expired content on MAPpage 103. This ensures that the system 200 always has valid data available for user.

The above system description explains system behavior when managing the MAPpage 103 creation by the user 202, operating in the producer role. On the other hand, when the User 202 operates in the consumer role, the user performs search operations with MAPpage 103 in which the applications on the device 201 sends a search operation request to the system 200 via the communication network 203. The subsystem search engine 212 in system 200 handles this search operation. The search engine 212 parses and extracts the location-based search query that the user 202 performs on the applications installed in the device 201 and processes the location-based search results then responds back to application installed in the device 201 on the same path the request came in. This operation is performed repeatedly until the user 202 is satisfied with the search results.

When the user 202 receives the search results back from the system 200, the user 202 can view the detailed information of each MAPpage 103 in the search result by performing a MAPpage view rendering request operation to the system 200. The subsystem data query engine 211 on the system 200 responds to this view rendering request. The data query engine 211 retrieves the MAPpage information from the Datastore 208 and maybe from other data sources in the system 200 to compose the MAPpage profile information and send back to the device 201 to render the MAPpage 103 profile information to the user 202. The system application installed on the device 201 allows the user 202 to perform further interactions such as save bookmark, like, share, comment or other user interactions depending on MAPpage 103 type (as seen in FIG. 6). These interactions will be sent to the system 200 by connecting to the subsystems data object association engine 214 and the timeline engine 217 to record the timeline of user interaction and then cooperate with the data analytic engine 221 to perform user behavior analysis with artificial intelligence algorithm.

When the system 200 has stored various aspects of the information, the subsystem notification engine 222 sends push notification information to user 202 through the device push notification system 207 in order to notify the user 202 in a meaningful and timely manner about the new interesting information according to user preferences.

Furthermore, in some embodiments, the system 200 has two other subsystems, the post templates engine 218 and the third party template module 219, that enable users to select their pre-designed template, input and upload content. The post templates engine 218 manages the visual display of templates in MAPpage 103: when a user 202 is a producer creating MAPpage 103 and when displaying to all users 202 in consumer role. The third party template module 219 manages design templates from the third party template designers that have been selected specifically for the system 200, so there will always be a wide variety of templates that will be updated to the system.

Although illustrative embodiments have been described in detail herein with reference to the accompanying drawings, variations to specific embodiments and details are encompassed by this disclosure. Any particular feature described, either individually or as a part of an embodiment, can be combined with other individually described features, or parts of other embodiments. Thus, in the absence of describing other combinations should not preclude the inventor(s) from claiming rights to such combinations.

Figure 3:
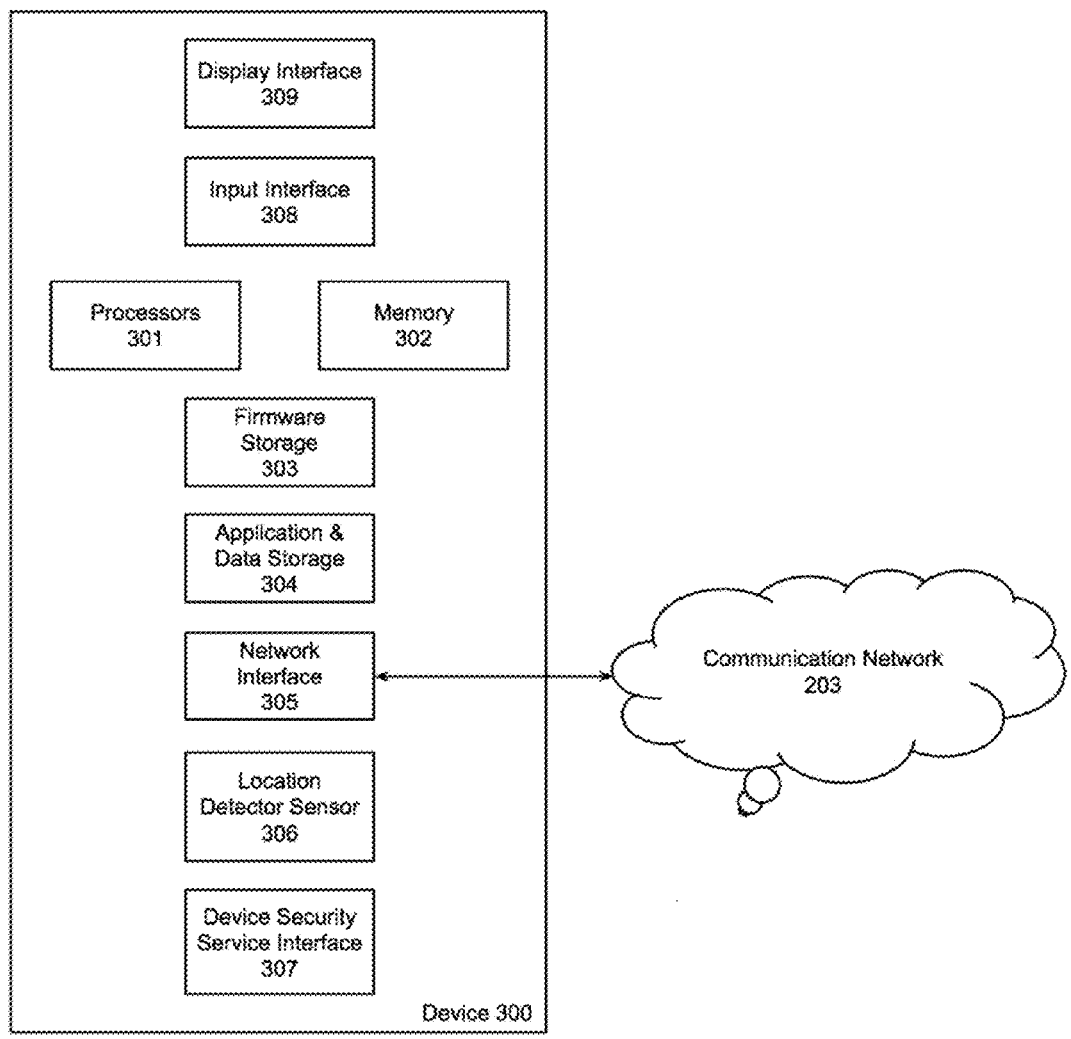
FIG. 3 is a block diagram that illustrates a mobile computing device in accordance with some embodiments.

FIG. 3 is a block diagram that illustrates a mobile computing device upon which examples described herein may be implemented.

The user 202 accesses the system 200 thru the device 201. The components of the device 201 comprise many components. The device 201 in FIG. 2 can be the device that has components like in the FIG. 3 device 300. It is a computing device which can be fixed such as desktop personal computers, or mobile like smart phones or tablets. In general, these computing devices will have processors 301, memory 302, firmware storage 303, application and data storage 304, a network interface 305, an input interface 308, an output display interface 309, and a location detector sensor 306 which are used to indicate the user location to global positioning and the device security service interface 307 for managing device security. These devices can be connected to the communication network 203 thru the network interface 305. The network technology can be Wi-Fi, LAN or Telecommunication Data Network such as 3G, 4G, LTE and WiMAX.

The device 300 has an input interface 308 which can be conventional or virtual keyboards, touch screens or any other input technologies that can be implemented in the future such as voice recognition or any other input technology. The purpose is to allow the user 202 to input information into the device 300. The device 300 also has an output display interface 309 which can be LED, LCD or any other display technology that can display image, text, video or voice or other media communicate to the user 202. With these capabilities, the user 202 can interact with the device 300 smoothly.

The device 300 has a location detector sensor 306 which may be implemented in the form of hardware sensor or software implementation. The purpose of this sensor is to indicate user location on the global positioning system. The position can be in the form of latitude, longitude coordinates or any other type of global positioning standard.

The device 300 includes a device security service interface 307 which requires the user 202 to operate the device 300 in a highly secure manner. The device security service interface 307 can be implemented by hardware or software or the combination of both hardware and software. The device security service interface 307 performs data encryption, user identification, anti-hacking function and other security related functionalities in order to increase security enforcement.

The device 300 has firmware storage 303 which is normally implemented in the form of ROM (Read-only Memory) or hard disk storage, flash drive or any other storage technology to store Devices operating system. This storage is highly secure which are not permit any modification by malicious code and/or unauthorized software, to ensure that the device 300 will not be compromised at the operating system level.

The device 300 has application and data storage 304 for storing application and/or user data. This kind of storage normally is implemented by hard disk, flash drive storage or any other storage technology that can persist so the data will be saved even if the user does not use the device 300 for a long time or its battery runs out.

The MAPpage client system application for the device 300 can be implemented in the form of software application installed into application and data storage 304. When the user 202 uses the application, the device's operating system will load the application from the application and data storage 304 to processors 301 in order to execute the software application. In addition, the MAPpage client system application can also be implemented in the form of a web-based application, which can be used on the device 300 web browser. Therefore, the user 202 can choose to access MAPpage client system application through an application installed on the device 300, or a web-based application that run on the Device's web browser. Both implementation forms of MAPpage client system application access to the system 200 is done via the communication network 203.

Figure 4:
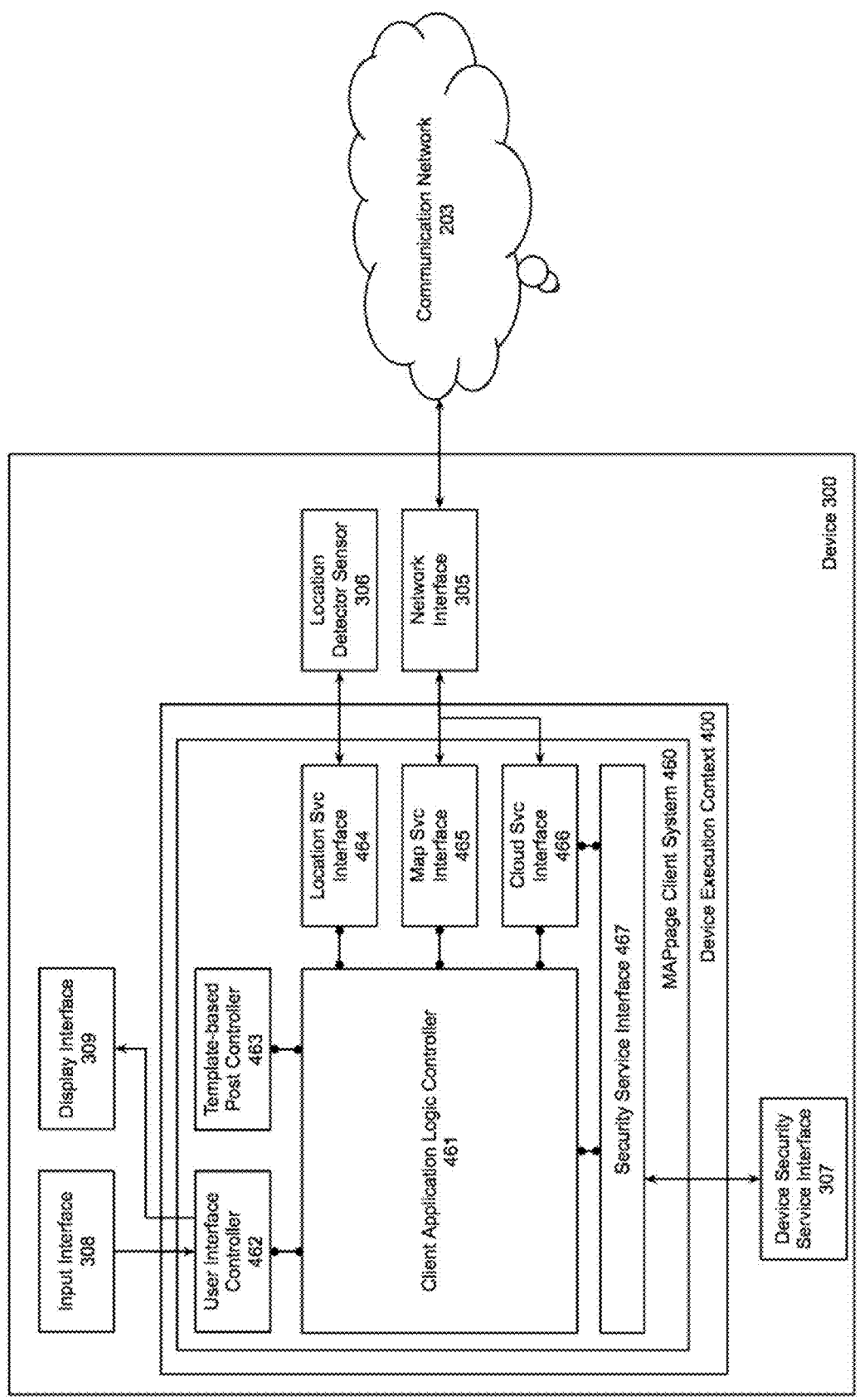
FIG. 4 illustrates an exemplary client system application environment in accordance with some embodiments.

FIG. 4 is a block diagram illustrates the logical software components of MAPpage Client System application 460 that execute on the device 300 in which examples described herein may be implemented.

When the user 202 starts to use the MAPpage client system application 460 on the device 300, the MAPpage client system application 460 is loaded by the device's operating system to run in the device execution context 400. Normally, the device execution context 400 is designed to be able to run any application software that is installed on the device 300. The MAPpage client system application 460 is application software that has a specific application logic to perform functionality provided by the system 200. As mentioned earlier, the MAPpage client system application 460 may be implemented in the form of web-based application which is executed on the device's web browser.

The core component of the MAPpage client system application 460 on the device 300 is the client application logic controller 461. The primary responsibility of this component is to control flow and provide application logic in order to respond to the user 202 when the user 202 performs an input method via the user interface controller 462 and the input interface 308 and also controls the application logic to display the output thru the user interface controller 462 and the display interface 309. The client application logic controller 461 connects to the system 200 via the map service interface 465 and the cloud service interface 466 and cooperates with the device security service interface 307 via the security service interface 467 to enhance user security.

Figure 9:
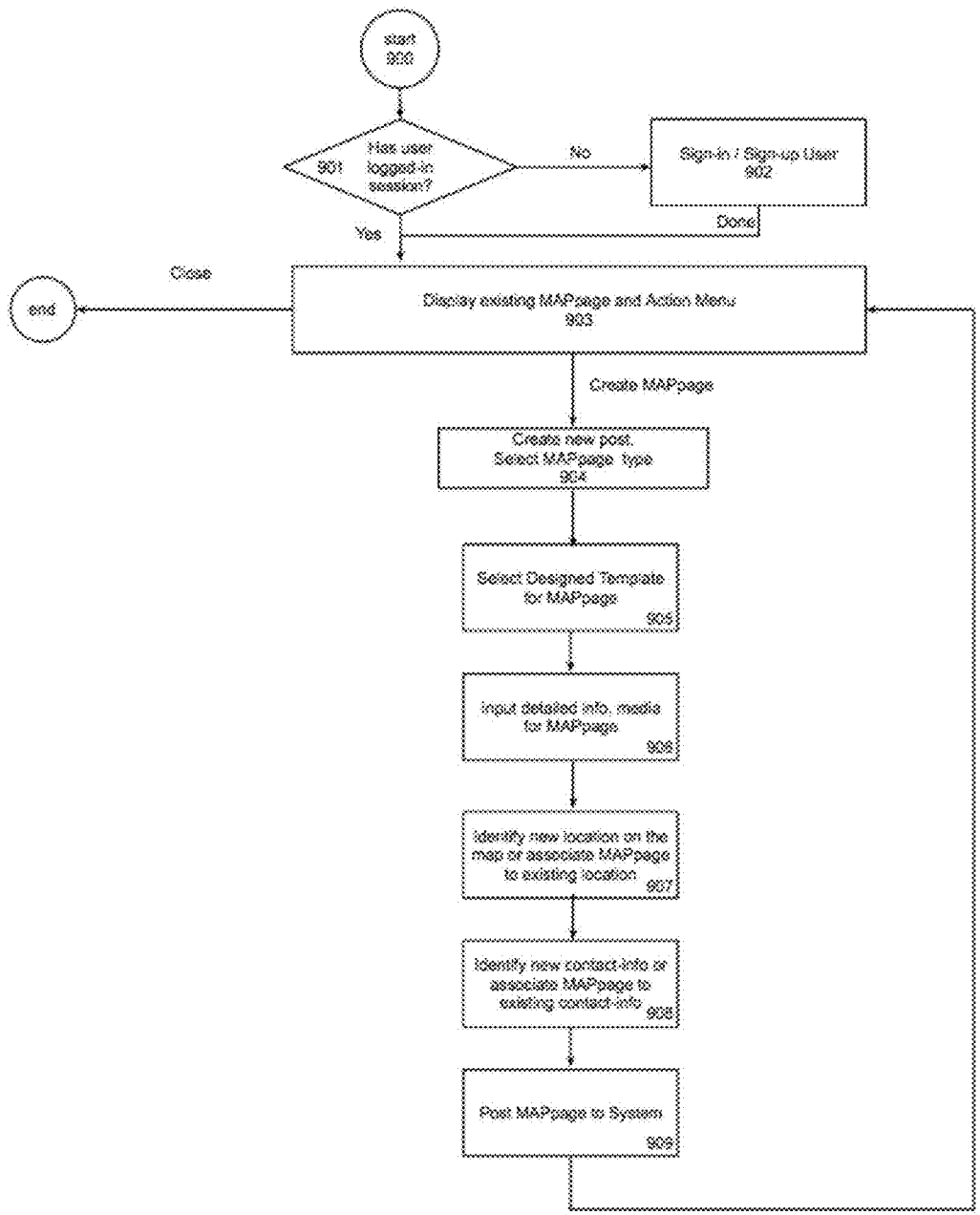
FIG. 9 is a flow diagram of an exemplary method for creating MAPpage attached to a one-to-one virtual and physical location on an interactive digital map via a communication network, in accordance with some embodiments.

In the case that the user 202 performs the MAPpage 103 creation at step 905 in FIG. 9, the user 202 chooses a template before posting on MAPpage 103. To do this function, the template-based post controller 463 pulls all relevant templates for the user to select during the MAPpage 103 creation.

To display map imagery on the display interface 309, the MAPpage client system application 460 performs this operation via the map service interface 465 which is connected to the system 200 and/or the map imagery service 204 via the communication network 203.

For other operations related to the user 202, the MAPpage client system application 460 performs this operation by cooperating with the system 200 through the cloud service interface 466 and the security service interface 467 to enforce security.

To detect the user latitude, longitude or any other global positioning standard, MAPpage the client system application 460 leverages the location service interface 464 which cooperates with the device-level location detector sensor 306 of the device 300 to identify the position.

Figure 5:
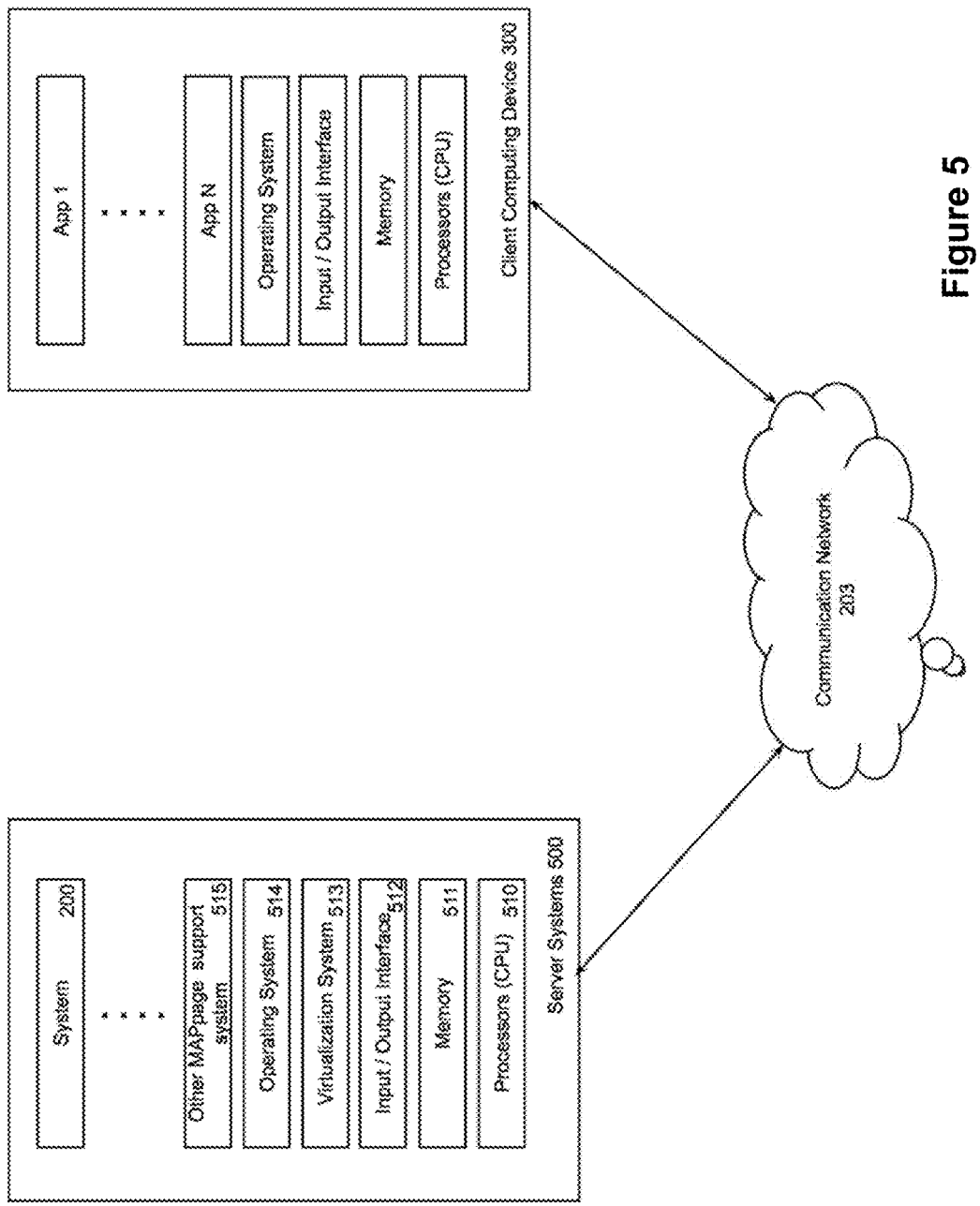
FIG. 5 is a block diagram of an example system in accordance with some embodiments.

FIG. 5 is a block diagram illustrates an example cooperation between the system 200 of FIG. 2 and the device 300 of FIG. 3 via a communication network 203.

The server systems 500 is a group of computer servers for hosting the system 200. The components of the server systems 500 are similar to other computer systems. It comprises processors (CPU) 510, memory 511 and input/output interface 512 which allows server systems 500 to connect to external components such as storage and network, which are all its hardware resources.

The important component of the server systems 500 is the virtualization system 513 which allow the server systems 500 to run the system 200 efficiently on available hardware resources. It performs workload distribution to Processors (CPU) 510, memory 511 and input/output interface 512. In time of high workload from many millions of users 202, the virtualization system 513 will respond by scaling up the computation power to multiple server systems 500 hardware units. When the workload is reduced, the virtualization system 513 will shrink the computation power to sufficient resources to cope with the lighter workload.

Like other computer systems, the operating system 514 runs program execution including the system 200 on hardware resources managed by the virtualization system 513.

The remaining part is the application software, which are system 200 and other MAPpage Support System 515. This application software works together on the operating system 514.

The server systems 500 connect to the communication network 203 while the communication network 203 connects the device 300, which has a MAPpage client system application 460 installed as shown and described in FIGS. 3 and 4.

FIG. 6 lists examples of the types of MAPpage 103. The system 200 will provide templates for each type of MAPpage 103.

The blank page is a free form page which can be viewed as a simple blank paper page. The user 202 can input any data to the blank page with no pre-defined format. In such embodiments, all data will be indexed for search enquiry.

The single listing page is another type of MAPpage 103 that the user 202 can post information based upon predefined categories provided by the system 200 such as property, automobiles, products, and services. The provided templates of the single listing page for each category will be designed to best serve the offering of those products/services categories. The single listing page will allow the user 202 to post only one listing item.

The multi-listing page is another type of MAPpage 103 that allows the user 202 to post information similar to the single listing page with the additional capability to support multiple items on a single multi-listing page.

The user profile page is another type of MAPpage 103 that allows the user 202 to post his or her profile.

The resume page is another type of MAPpage 103 that allows the user 202 to post his or her resume/CV.

The company profile page is another type of MAPpage 103 that allows business users to post their business profile. All templates will be designed to allow business users to provide complete business profile information.

The user 202 can post different kinds of information and data such as text, data, images, videos and sound clips as well as location related information such as address, latitude and longitude information or boundary of the location, which is referred to as Virtual Location 101.

Figure 7:
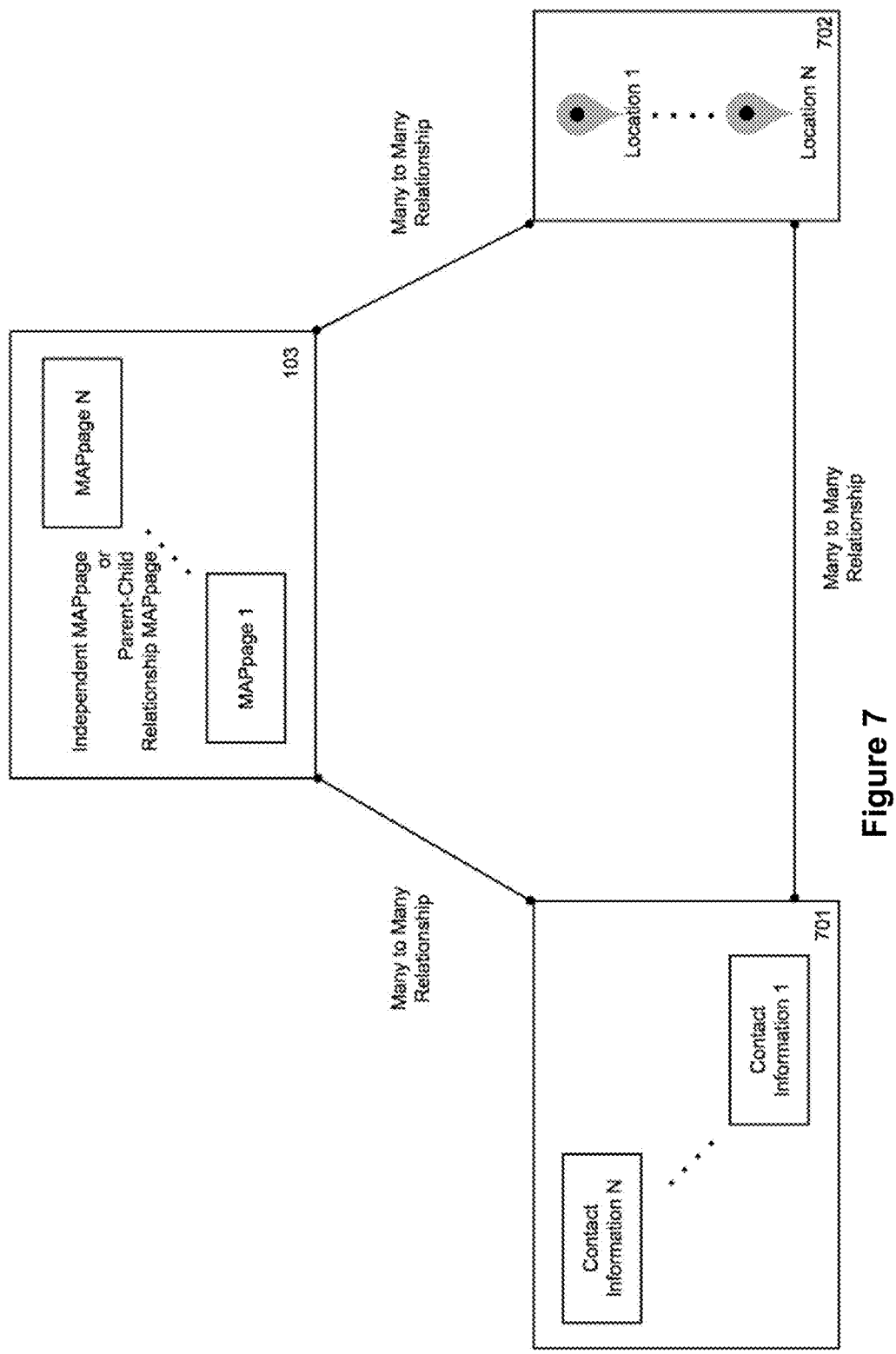
FIG. 7 illustrates an exemplary association among contact information, location information, and online pages and/or documents (MAPpage), in accordance with some embodiments.

FIG. 7 illustrates an exemplary association among contact information 701, location information 702 and MAPpage 103. Each location information 702 datum can have a relation with many MAPpages 103. For example, a business has five branches in different locations and their MAPpages can be linked to each other. Each MAPpage 103 can have relation with many location information datum 702. For example, a single office building can have many MAPpages for different businesses even though they are sharing the same geographic location which can be distinguished by their unique addresses. The relationship between these three entities (MAPpage 103, contact information 701 and location information 702) is in the form of many-to-many relationship.

There are several benefits from this many-to-many relationship. If user 202 is a business, it can create one company profile page and link this company profile page to several location information 702 datum (branches). The user 202 can simply manage to add or delete location information 702 linked to the company profile page when there is a change in branch locations at any time from any computing device.

Once there is a change on the relationship in MAPpage 103 and location information 702, system 200 will index the change of the relationship immediately. For example, if User 202, in a producer role, decides to eliminate the relationship of the company profile page from one particular location information datum 702 (branch), all consumer users 202 will not be able to search the company profile page from that particular location information 702 (branch) while the users 202 still can search the company profile page from other location information 702, which still have the relationship.

The contact information 701 will allow the user 202 to have multiple contact information. The user 202 can freely assign different contact information to any MAPpage 103 or any location information 702.

The user 202 as producer has full flexibility to manage the relationship among MAPpage 103, contact information 701 and location information 702.

In addition, the MAPpage 103 can be independent or have a parent-child relationship with other MAPpages 103. The system 200 will build parent-child relationships among MAPpages defined by the user 202. If there is a relationship between parent MAPpage 103 and location Information 702, the system 200 will associate the relationship of that location information 702 to Child MAPpage 103 automatically.

The above description is an example of building relationships among MAPpage 103, contact Information 701 and location Information 702. There are no limits to the types of relationships that can be done on the MAPpage 103.

Figure 8:
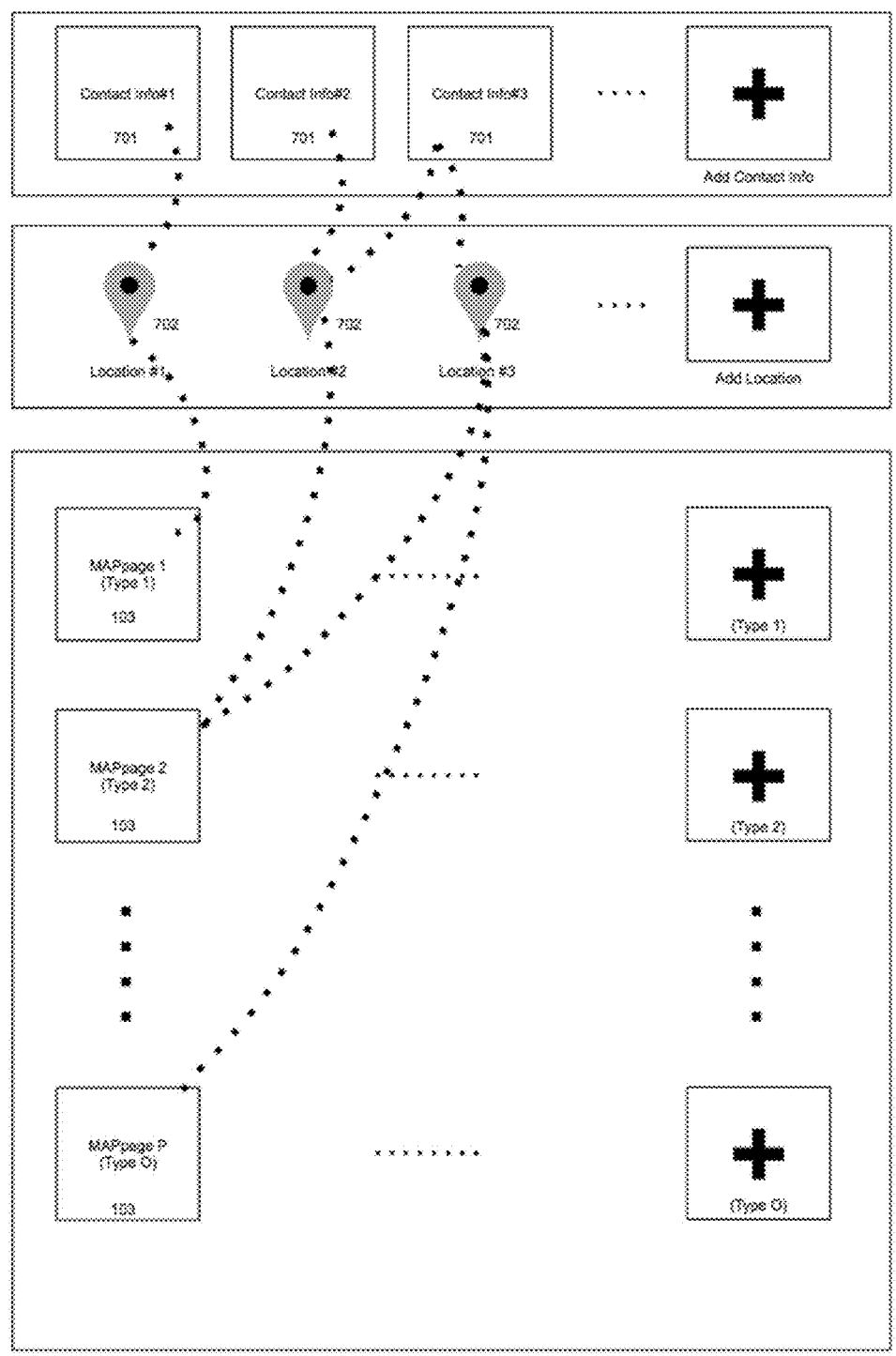
FIG. 8 illustrates an example layout of contact information, location information, and MAPpage in three content regions in portrait orientation, in accordance with some embodiments.

FIG. 8 illustrates an example of an user interface layout of contact Information 701, location Information 702 and MAPpage 103 in three content regions in this portrait orientation displayed on a mobile computing device. The user 202 can manage the relationship among contact information 701, location information 702 and MAPpage 103 by creating the dotted line to pair the relationship between each entity.

From this example user interface, the display screen of the mobile computing device is divided into three content regions. Content region one displays contact information 701 created by user 202. content region two displays location information 702 defined by user 202. Content region three displays all MAPpages 103 created by the user 202.

FIG. 9 illustrates an example method of creating a MAPpage 103. A method such as described by an example of FIG. 2 can be implemented using, for example, components described with an example of FIG. 2, FIG. 3 and FIG. 4. Accordingly, reference made to elements of FIG. 2, FIG. 3 and FIG. 4 are for purposes of illustrating a suitable element or component for performing a step or sub-step being described.

When User 202 (producer role) needs to create a MAPpage 103, the first step as shown in step 901 is to perform user identification. The system will check whether the user has logged in to determine whether the user has to sign-in or sign-up for an account to create new content to store on the system 200. If a user 202 is not already verified or has an invalid user session, the system will display the user interface for the user 202 to sign-in or sign-up at step 902.

Once the user 202 identified themselves, the system performs step 903 to display all existing MAPpages 103 created by the user and offer a choice of actions available to the user to manage their MAPpages. If the user needs to create another MAPpage 103, the system will begin the process of MAPpage 103 creation at step 904. At step 904, the user 202 can choose from among the various types of MAPpage 103 as illustrated in FIG. 6 and the user 202 can also determine the association between the newly created MAPpage with existing MAPpages and indicate their roles in each parent-child relationship.

At step 905, the user 202 can select their template for their MAPpage 103 creation. The types of templates available to each user depended on the type of MAPpage they required for the functionality which the user 202 chose in step 904.

At step 906, the user 202 inputs the detailed information of MAPpage 103 the input data may be in form of text, media files to be uploaded. The media files which the user can select either resides in the device 300 or from media files to be uploaded directly from the device such as a photograph taken from a camera through the MAPpage client system application 460 in the device 300. During the input of detailed information and media in this step, the user performs this activity on the designed template they chose in step 905.

At step 907, the system will ask the user to identify the virtual location 101 of the newly created MAPpage to be associated with the location-based search capability in the system 200. To associate the location information in this step, it allows the user to identify a new location or select a previously identified location. To identify a new location, the system displays the user interface as map imagery for user to identify the location on the digital map. The user 202 can use the input interface 308 such as to use their finger to identify the location on the touch screen then draw the boundary and/or pin the exact location on the digital map. One MAPpage 103 can have multiple virtual locations 101 associated with it. This is a highly scalable data architecture of the present invention. This means that the user 202, serving in the producer role, does not need to make duplicate posting of the same MAPpage 103 for each location. Just creating one MAPpage and linking all associated virtual locations 101 to the created MAPpage is all that is needed.

At step 908, the system asks the user to identify the contact information of the MAPpage 103 which may be a newly created contact or an existing contact. So, one MAPpage 103 can have multiple contact information associated with it. This association model is similar to the one described in step 907 for the virtual location 101 associated to MAPpage 103.

At step 909, once the user 202 completes all input information and chooses media files to be uploaded, and location and contact information is identified, the system posts and uploads this information from the device 300 to the system 200 via the communication network 203. The amount of time required to post and upload depends on the size of data and available bandwidth in the communication network 203 at that time. When the operation is completed, the MAPpage 103 creation process will be handled by the system 200 which creates, indexes and performs other activities as described in FIG. 2.

Figure 10:
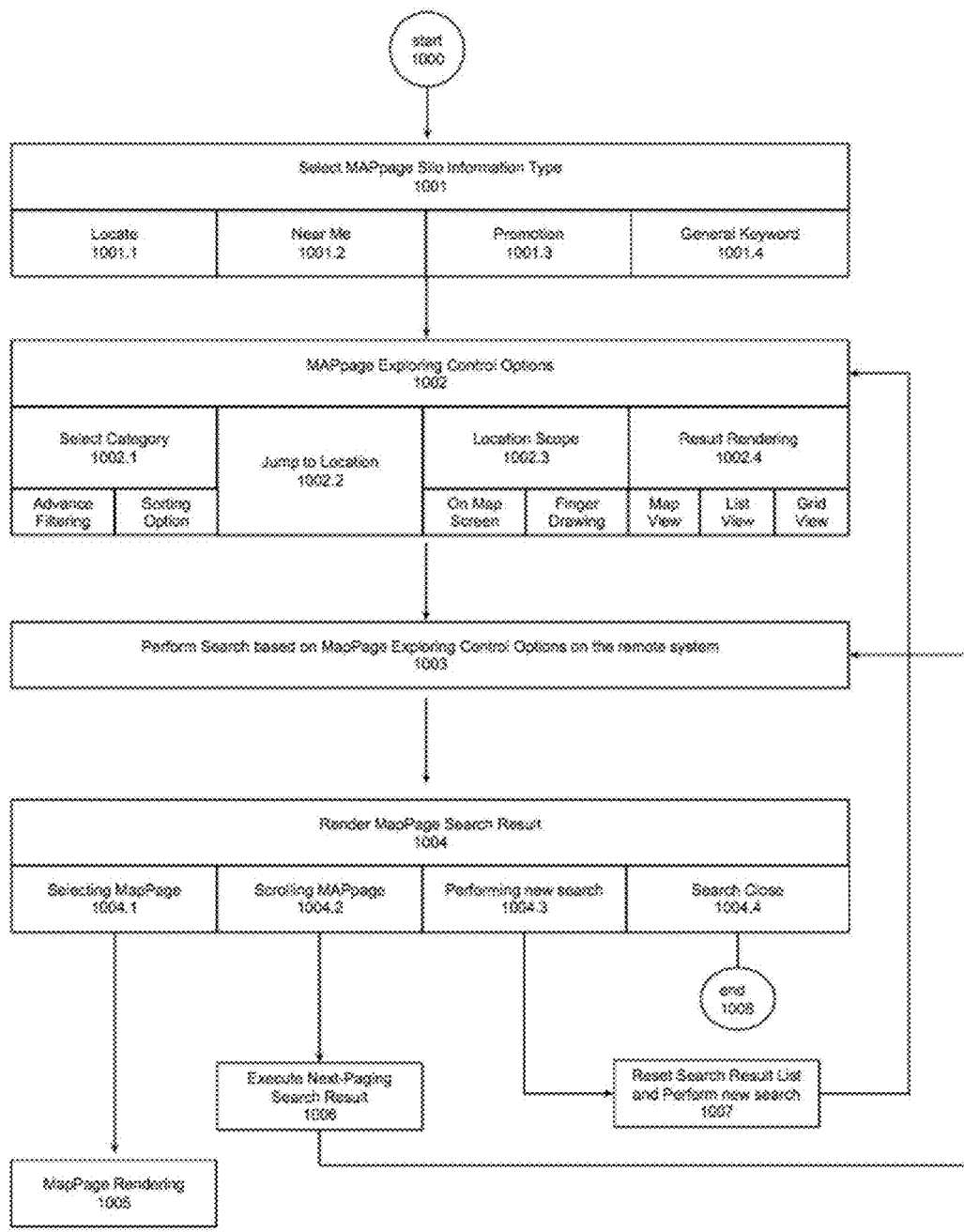
FIG. 10 is a flow diagram of an exemplary method for searching online pages (MAPpage) available on the interactive digital map, in accordance with some embodiments.

FIG. 10 illustrates an example of a search method for MAPpage 103. When the user 202, in the consumer role, performs a location-based search for MAPpage 103 in system 200, the user 202 has the choice of selecting the operation mode of MAPpage information in step 1001. There are four operation modes in this embodiment. The purpose of separating into four operation modes is to help the user 202 filter search results according to the MAPpage characteristic they are looking for.

'Locate' 1001.1, this operation mode allows the user 202 to search any MAPpage 103 created by any users (producer role) in the System 200 based in any location around the world, and select the category in step 1002.1 to search items such as property, automotive, products, services, and jobs.

'Near Me' 1001.2, this operation mode allows the user 202 who needs to find a MAPpage 103 located close to the present location of the user 202 at the time of performing the search. The user 202 can also relocate to a different location without physically moving to the geographical area of the search. The search can also be further refined based on user daily life activity categorized by the system such as eat, drink, shop, stay and learn.

'Promotion' 1001.3, this operation mode allows User 202 to search the MAPpage type for promotions in different locations.

'General keyword' 1001.4, this is a free form operation mode which is not filtered by information type like 1001.1, 1001.2 and 1001.3. The user 202 can simply enter keywords they want to search. The system 200 will perform the search and return search results without filtering by information type. This search operation mode is similar to other available search engines for the user 202 who are not familiar with other three operation modes.

At step 1002, the MAPpage client system application 460 has the search helper tools that allows the user 202 to conduct and intelligent search based on location. System display map imagery with the tools overlay on the map and allow user to select the category 1002.1 which also have the optional advanced filtering parameter and sorting option parameter. Some examples of sorting options are sorting by relevance, distance and price.

The user 202 can relocate the center of search area to another location that far away from the user by using 'Jump to Location' 1002.2 control option. This capability allows the user 202 to input their target location by using criteria such as city name, province or country. The underlying application logic of the MAPpage client system application 460 will perform the geocoding by cooperating with the map place service 205 to jump to the specified location.

The user 202 has the capability to scope the location 1002.3 on the map by using the finger to draw the area of interest on the map, so the application will only display search results only in that area of interest. And another choice of scoping the location is to scope by device 300 display interface 309 viewport.

Result rendering option 1002.4 allows the user 202 to select search results rendering options such as map-view, list-view or thumbnail grid-view.

Once the user 202 adjusts the search tool, the MAPpage client system application 460 will go to step 1003 which sends the search query with parameters specified by the user 202 to the system 200 via the communication network 203 and directly contact the search engine 212. Once search results come back to the MAPpage client system application 460, the system will display search results in step 1004 and display the results based on user control in step 1002.

When search results are displayed, the user 202 has four available options. The first option is selecting MAPpage 1004.1. Once the user 202 performs MAPpage selection from search results, this action will display the selected MAPpage 103. This action will be done in the MAPpage rendering 1005 which is explained with reference to FIG. 11 below. The second option is scrolling MAPpage 1004.2. Since search results can result in many MAPpages 103, the user 202 can scroll through the results list and select the next page of the search results 1006. The search results will be rendered at step 1004 and the cycle will be repeated. The third option is to reset the search and perform a new search in step 1004.3 and 1007 by clearing the previous search keywords and setting new parameters. Fourth, when user 202 is satisfied, the search process ends in step 1004.4, 1008.

Figure 11:
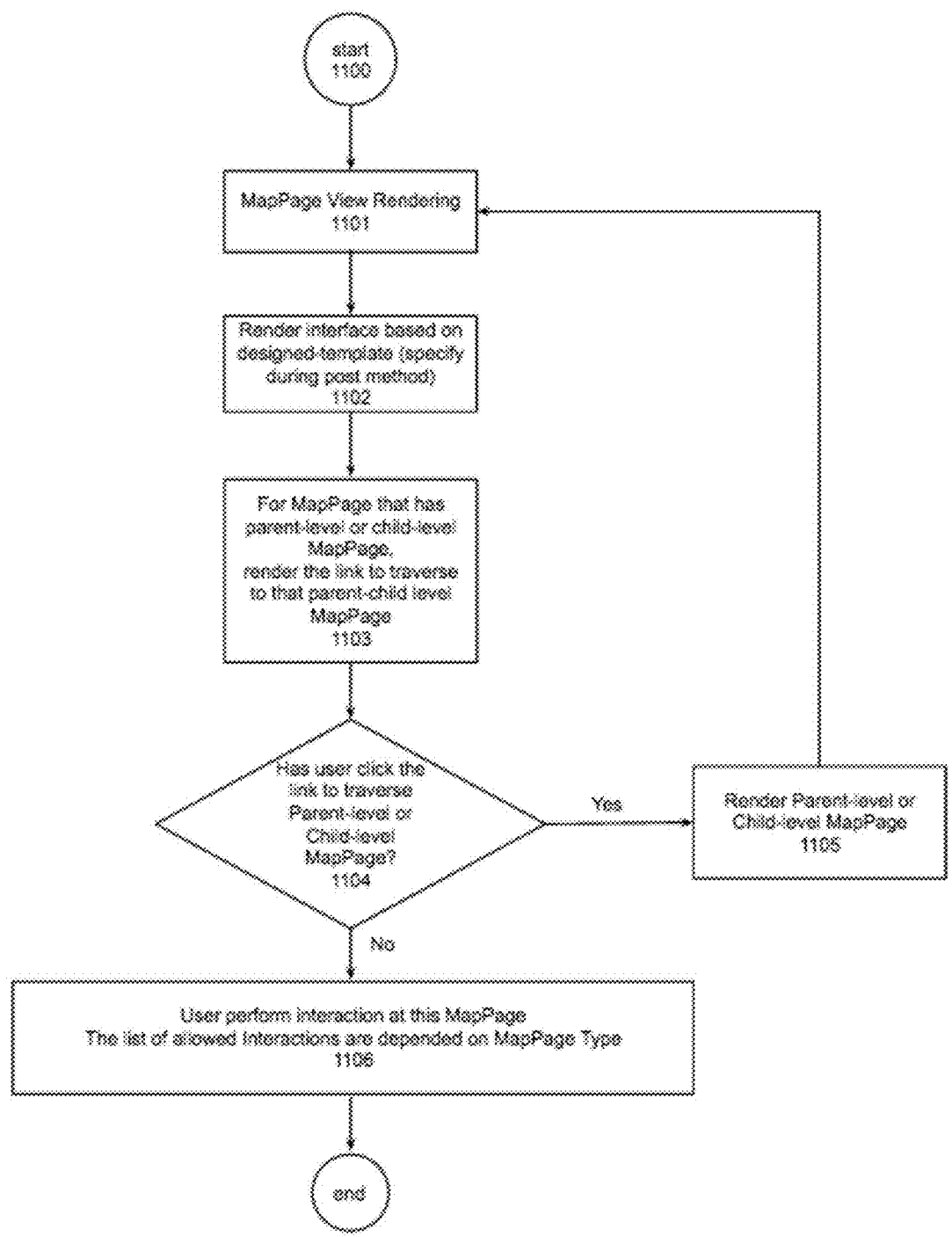
FIG. 11 is a flow diagram of an example method for rendering MAPpage information, in accordance with some embodiments.

FIG. 11 illustrates an example MAPpage 103 rendering method. The user 202 can access MAPpage 103 in various ways by searching with methods which have been explained above with reference to FIG. 10, or the users 202 can save their favorite MAPpages. Whenever the user 202 decides to view detail information of any MAPpage 103, the system will begin to render that MAPpage at step 1101, and the MAPpage client system application 460 will connect to the system 200 via the communication network 203 to retrieve detailed MAPpage information including text, media information. Once the information arrives from the server into the MAPpage client system application 460, the system will begin to render the user interface according to the MAPpage designed template as specified by the creator of that MAPpage 103 (User 202 who is in producer role and created that MAPpage 103). The system will display all text, media (photos, videos) and location-based information in a user-friendly format.

At step 1103, if the rendering MAPpage has a parent-child relationship with another MAPpage, the system display user interface will allow the user 202 to view other associated MAPpage as specified by the MAPpage creator. If the user 202 decides to view the other associated MAPpages 103 at the step 1104, then the system will display the chosen associated MAPpage 103 at step 1105. If the user 202 does not want to visit the associated MAPpages 103, the system will enter into step 1106. This means the user will remain in the current MAPpage 103 and perform other interactions such as save favorite, like, comment, review or share information as permitted by that MAPpage type.

Figure 12:
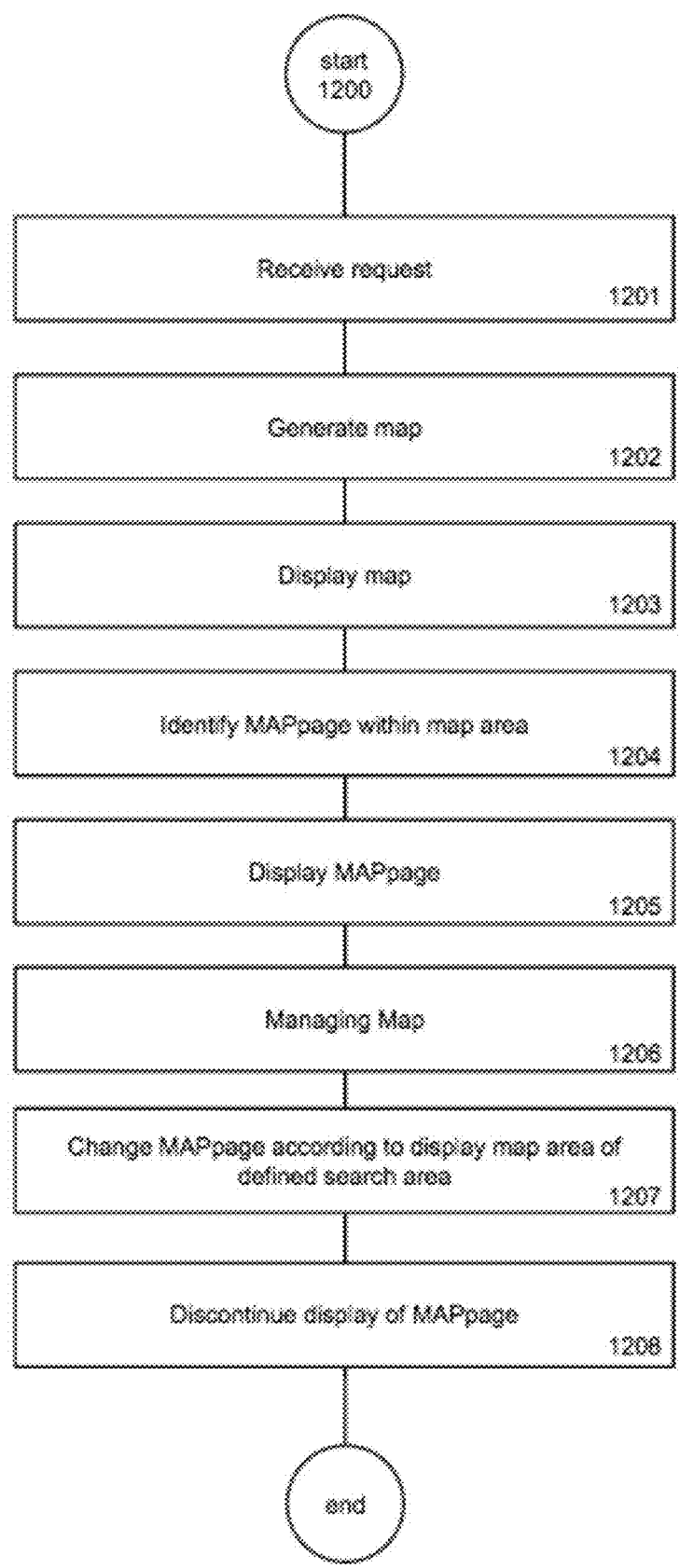
FIG. 12 is a flow diagram of an example method for displaying available MAPpage on interactive digital map, in accordance with some embodiments.

FIG. 12 illustrates an example of a method to render a MAPpage 103 search result of the 'Render MapPage Search Result' step 1004 in FIG. 10.

The MAPpage client system application 460 provides a way to display search result in two perspectives. The first perspective is to render the search result as a list like commonly used search engines such as GOOGLE and BING search. The second perspective is to render the MAPpage search result as pins on digital maps. So the method to handle this rendering perspective on the digital map will be described herein.

When the User 202 sends a search request to the system 200 and receives the search results, the system enters into step 1201 'Received request'. The MAPpage client system application 460 prepares a map image on the display interface 309 of the device 300 and generates a map in step 1202. At this point, the application sends a request to retrieve a digital map from the map imagery service 204 according to the location requested in step 1201 to display at step 1203 'Display Map'.

Then at step 1204, the MAPpage client system application 460 translates and extracts the MAPpage search results and identifies which MAPpages will be displayed (e.g., as pins) in digital map form at step 1205.

At step 1206, the user 202 can interact with digital map in many ways such as changing the map imagery from plain map to satellite map imagery. Or the User 202 can adjust the map's perspective by adjusting the viewing angle to display the map from 90 degrees to 45 degrees angle.

If the User 202 decides to pan the map, the map can pan left or right, allowing new and relevant MAPpages in nearby locations to appear as pins in step 1207.

Once the User 202 is satisfied with their search operation, the process can be ended by leaving that search screen. The system will clear all the search results currently displayed on the device 300 off the display interface 309 in readiness for the next search operation.

Figure 13:
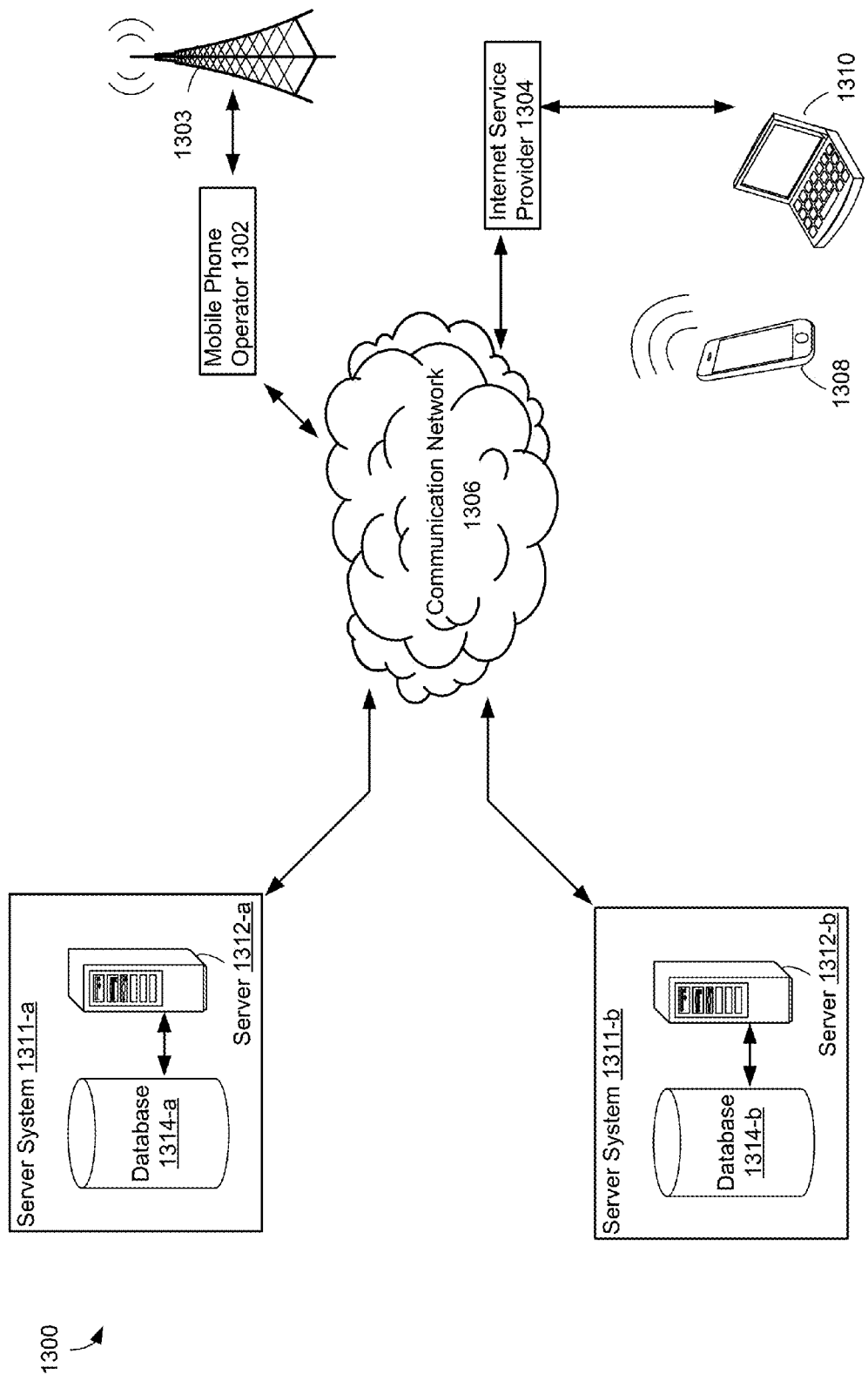
FIG. 13 is a diagram of a client-server environment, in accordance with some embodiments.

FIG. 13 is a diagram of client-server environment 1300, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein. To that end, client-server environment 1300 includes server system 1311-a, which stores items (e.g., MAPpages) in database 1314-a and performs searches for items (as well as other tasks) using server 1312-a. Client-server environment 1300 also includes server system 1311-b, which transmits requests (e.g., a request to create a new MAPpage, a search request for MAPpages, etc.) to server system 1311-a and is therefore, in some circumstances, a client of server system 1311-a. Server system 1311-b includes server 1312-b and database 1314-b. As used herein, the term "client" is intended to, in some circumstances, include servers, e.g., when said servers are accessing services that are made available by another server, and therefore are acting as clients.

Client-server environment 1300 further includes one or more mobile phone operators 1302, one or more Internet service providers 1304, and a communication network 1306.

Mobile phone operator 1302 (i.e., wireless carrier), and Internet service provider 1304 are capable of being connected to communication network 1306 in order to exchange information with one another and/or other devices and systems. Additionally, mobile phone operator 1302 and Internet service provider 1304 are operable to connect client devices to communication network 1306 as well. For example, smart phone 1308 is operable with the network of mobile phone operator 1302, which includes for example, base station 1303. Similarly, for example, personal computer 1310 (e.g., a laptop computer, tablet, desktop, smart television, workstation or the like) is connectable to the network provided by Internet service provider 1304, which is ultimately connectable to communication network 1306.

Communication network 1306 may be any combination of wired and wireless local area network (LAN) and/or wide area network (WAN), such as an intranet, an extranet, including a portion of the Internet. It is sufficient that communication network 1306 provides communication capability between client devices (e.g., smart phones 1308 and personal computers 1310) and servers. In some embodiments, communication network 1306 uses the HyperText Transport Protocol (HTTP) to transport information using the Transmission Control Protocol/Internet Protocol (TCP/IP). HTTP permits a client device to access various resources available via communication network 1306. However, the various embodiments described herein are not limited to the use of any particular protocol.

In this manner, smart phone 1308 and personal computer 1310 (collectively referred to as "client device 1308/1310") are, in some circumstances, clients of server system 1311-a and/or server system 1311-b. For example, in some circumstances, as explained in greater detail below, client device 1308/1310 sends a request to create a new MAPpage to server system 1311-b, which triggers server system 1311-b to send the request to create a new MAPpage to server system 1311-a. In other examples, client device 1308/1310 directly sends a request to create a new MAPpage to server system 1311-a.

Those skilled in the art will appreciate from the present disclosure that any number of such devices and/or systems may be provided in a client-server environment, and particular devices may be altogether absent. In other words, client-server environment 1300 is merely an example provided to discuss more pertinent features of the present disclosure.

Figure 14:
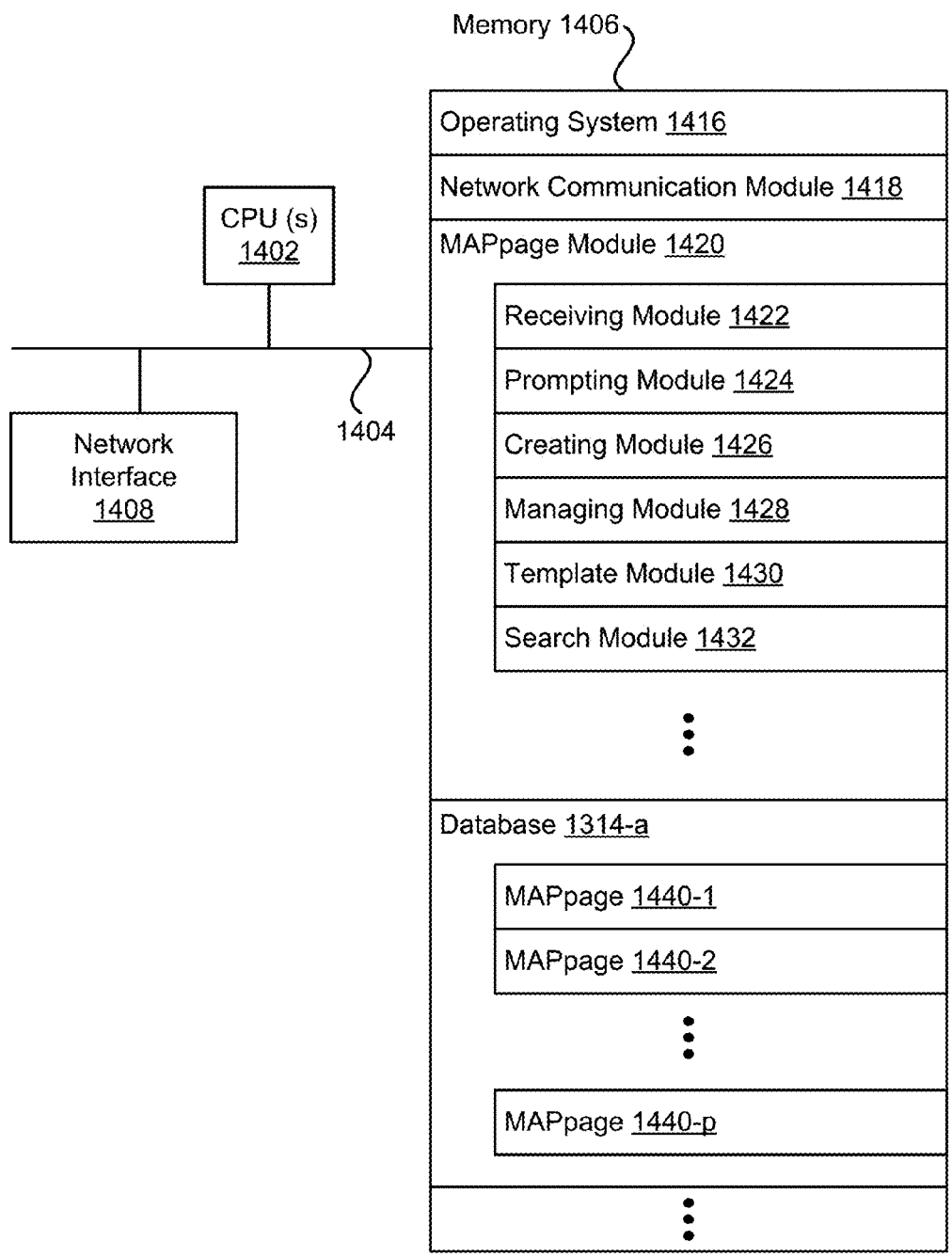
FIG. 14 is a block diagram illustrating an example of a server system, discussed above with reference to FIG. 13, in accordance with some embodiments.

FIG. 14 is a block diagram illustrating an example of server system 1311-*a*, discussed above with reference to FIG. 13, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein. Server system 1311-*a* typically includes one or more processing units (sometimes called CPUs or processors) 1402 for executing modules, programs and/or instructions stored in memory 1406 and thereby performing processing operations, memory 1406, one or more network or other communications interfaces 1408, and one or more communication buses 1404 for interconnecting these and optionally, various other components. The one or more communication buses 1404 optionally include circuitry (sometimes called a chipset) that interconnects and controls communications between system components. Memory 1406 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 1406 optionally includes one or more storage devices remotely located from CPU(s) 1402. Memory 1406, or alternatively the non-volatile and/or volatile memory device(s) within memory 1406, comprises a non-transitory computer readable storage medium. In some embodiments, memory 1406, or the non-transitory computer readable storage medium of memory 1406 stores the following programs, modules, and data structures, or a subset or superset thereof:

- operating system 1416 that includes procedures for handling various basic system services and for performing hardware dependent tasks;
- network communication module 1418 that facilitates communication with other devices (e.g., other server systems 1311 as well as client devices 1308/1310) via one or more network interfaces 1408 (wired or wireless) and one or more communication networks, such as the Internet, other wide area networks, local area networks, metropolitan area networks, and so on;
- MAPpage module 1420 that is used for creating, managing, and/or searching MAPpages, optionally including:
  - receiving module 1420 that is used for receiving requests and/or information from a client;
  - prompting module 1424 that is used for prompting the client to provide information;
  - creating module 1426 that is used for creating a new MAPpage;
  - managing module 1428 that is used to enable the client to associate a respective MAPpage with one or more physical locations and/or one or more sets of contact information;
  - template module 1430 that is used to receive and/or provide new MAPpage templates; and
  - search module 1432 that is used to receive search requests for MAPpages, provide a range for a location parameter for the search request, execute search requests (e.g., directed toward MAPpages stored in database 1314-*a* or directed toward search results from a web crawler), and/or return search results; and
- database 1314-*a* that includes one or more MAPpages (e.g., MAPpage 1440-1 through MAPpage 1440-*p*, where p is a positive integer, or MAPpages 103, FIG. 1).

Each of the above identified elements in FIG. 14 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 1406 optionally stores a subset of the modules and data structures identified above. Furthermore, memory 1406 optionally stores additional modules and data structures not described above. In some embodiments, the programs, modules, and data structures stored in memory 1406, or the non-transitory computer readable storage medium of memory 1406, provide instructions for implementing some of the methods described below. In some embodiments, some or all of these modules may be implemented with specialized hardware circuits that subsume part or all of the module functionality.

Although FIG. 14 shows server system 1311-*a* in accordance with some embodiments, FIG. 14 is intended more as a functional description of the various features which may be present in server system 1311-*a* than as a structural schematic of the embodiments described herein. In practice, and as recognized by those of ordinary skill in the art, the programs, modules, and data structures shown separately could be combined and some programs, modules, and data structures could be separated.

Attention is now directed towards embodiments of user interfaces ("UI") and associated processes that are, optionally, implemented on an electronic device, such as client device 1308. Similar user interfaces are, optionally, implemented on device 201, device 300, client device 1310, and/or other electronic devices such as a portable communications device (e.g., a mobile telephone, smart phone, etc.), a portable multifunction device (e.g., a phablet), a portable electronic device (e.g., laptops or tablet computers), and/or a desktop computer.

FIGS. 15A-15J illustrate exemplary user interfaces for creating, managing, and/or searching user-managed online pages (e.g., MAPpages) linked to locations on an interactive digital map, in accordance with some embodiments. The user interfaces in these figures are used to illustrate the processes described below, including the processes in FIGS. 16A-16E. Although some of the examples which follow will be given with reference to inputs on a touch-screen display (where the touch-sensitive surface and the display are combined, for example on client device 1308), in some embodiments, the device detects inputs on a touch-sensitive surface that is separate from the display (e.g., inputs on a track pad of a laptop computer) or the device detects inputs from other sources (e.g., inputs from a mouse and/or keyboard of a desktop computer). For convenience of explanation, the embodiments described with reference to FIGS. 15A-15J will be discussed with reference to operations performed on a device with a touch-sensitive display system and/or touch screen. For sake of clarity, FIGS. 15A-15J simply show the touch screen of device 1308, without showing other details of device 1308. The user interfaces in FIGS. 15A-15J include the following elements, or a subset or superset thereof: signal strength indicator(s) for wireless communication(s), such as cellular and Wi-Fi signals; time; Bluetooth indicator; and battery status indicator. These well-known elements are not described in detail so as not to unnecessarily obscure aspects of the disclosed embodiments.

Figure 15A:
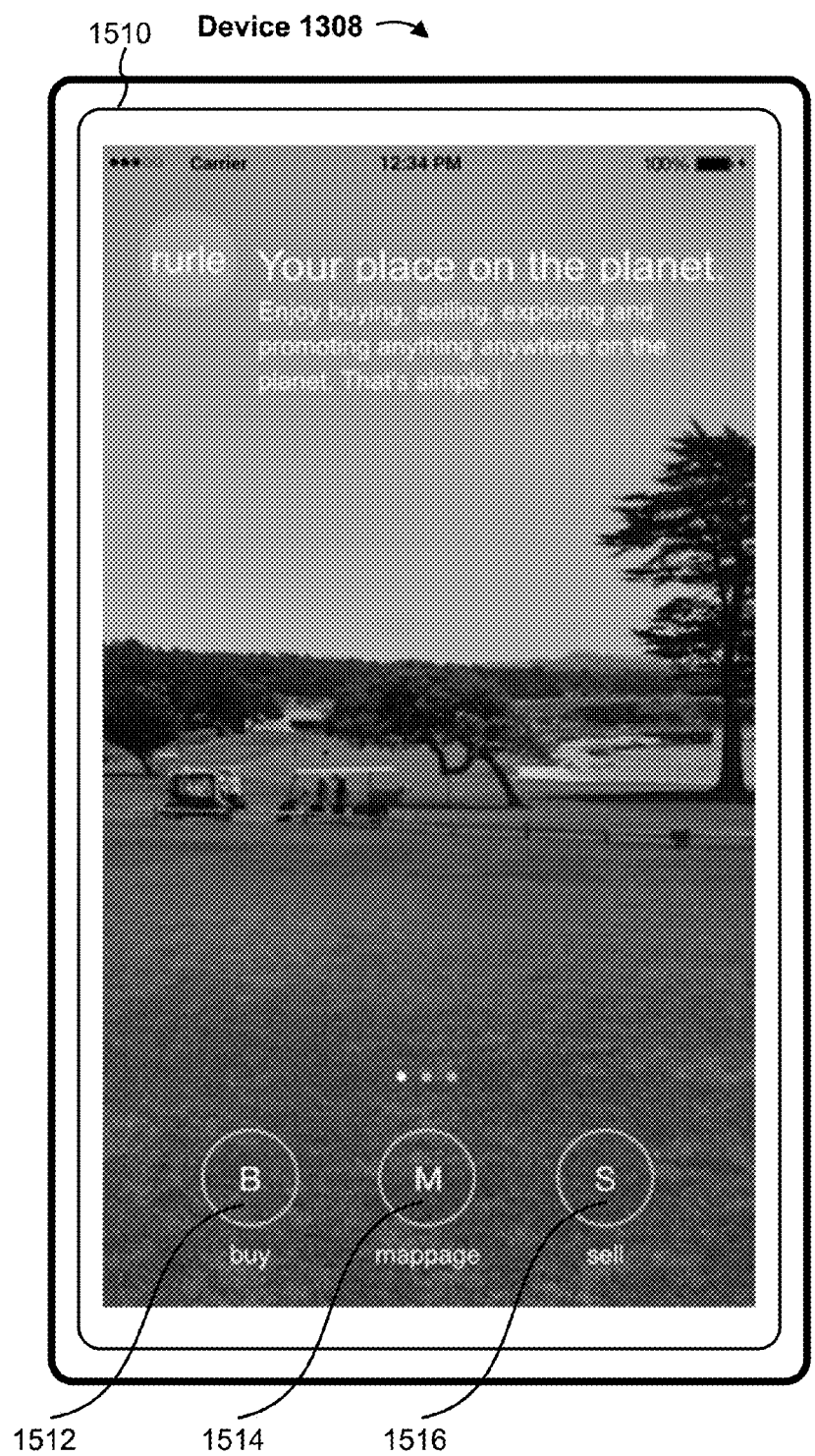
FIGS. 15A-15J illustrate exemplary user interfaces for creating, managing, and/or searching user-managed online pages (e.g., MAPpages) linked to locations on an interactive digital map, in accordance with some embodiments.

FIG. 15A illustrates an exemplary user interface 1510 including a menu of options to navigate a platform containing MAPpages (sometimes called a "MAPpage platform") on client device 1308, in accordance with some embodiments. In some embodiments, user interface 1510 includes the following elements, or a subset or superset thereof: icon 1512, labeled "buy;" icon 1514, labeled "mappage;" and icon 1516, labeled "sell." In some embodiments, when a user selects icon 1512 to "buy," a user interface for buying a product or service (e.g., user interface 1560 of FIG. 15F) is displayed. In some embodiments, when a user selects icon 1516 to "sell," a user interface for selling a product or service (e.g., user interface 1550 of FIG. 15E) is displayed. In some embodiments, when a user selects icon 1514 for "mappage," a user interface for managing MAPpages (e.g., user interface 1595 of FIG. 15J) is displayed. In some embodiments, if a user has not yet logged in to an account, when the user selects icon 1514 and/or icon 1516, a user interface to create an account or log in to an existing account (e.g., user interface 1520 of FIG. 15B) is displayed. Although not shown in FIG. 15A, in some embodiments, user interface 1510 includes one or more options for logging in to an account (e.g., with a "Log In" icon, with an option to log in with another account of the user, such as a Facebook account, with an option to register with email, etc.).

Figure 15B:
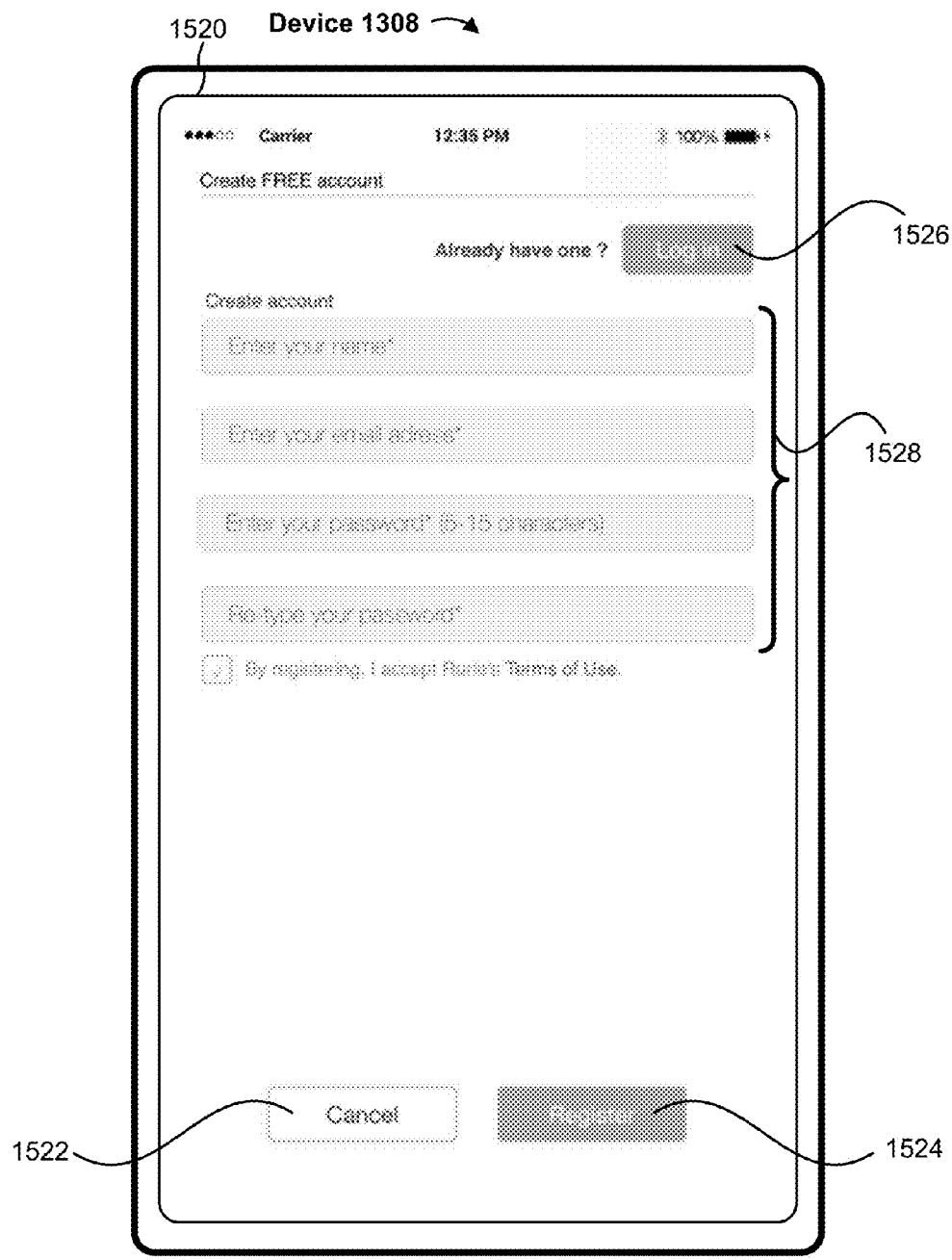

FIG. 15B illustrates an exemplary user interface 1520 for creating an account in the MAPpage platform, in accordance with some embodiments. In some embodiments, user interface 1520 includes the following elements, or a subset or superset thereof: a plurality of fields 1528 for a user to enter information (e.g., name, email address, password, password confirmation, etc.); icon 1522, labeled "Cancel;" icon 1524, labeled "Register;" and icon 1526, labeled "Log in." In some embodiments, a user is prompted for information such as name, email address, and password to create a new account (e.g., using the plurality of fields 1528). In some embodiments, the user selects icon 1524 to register (e.g., after entering the required information) and create an account or the user selects icon 1522 to cancel creation of the account. In some embodiments, if a user already has an account, the user may select icon 1526 to log in (e.g., by entering the user's email address and password).

Figure 15C:
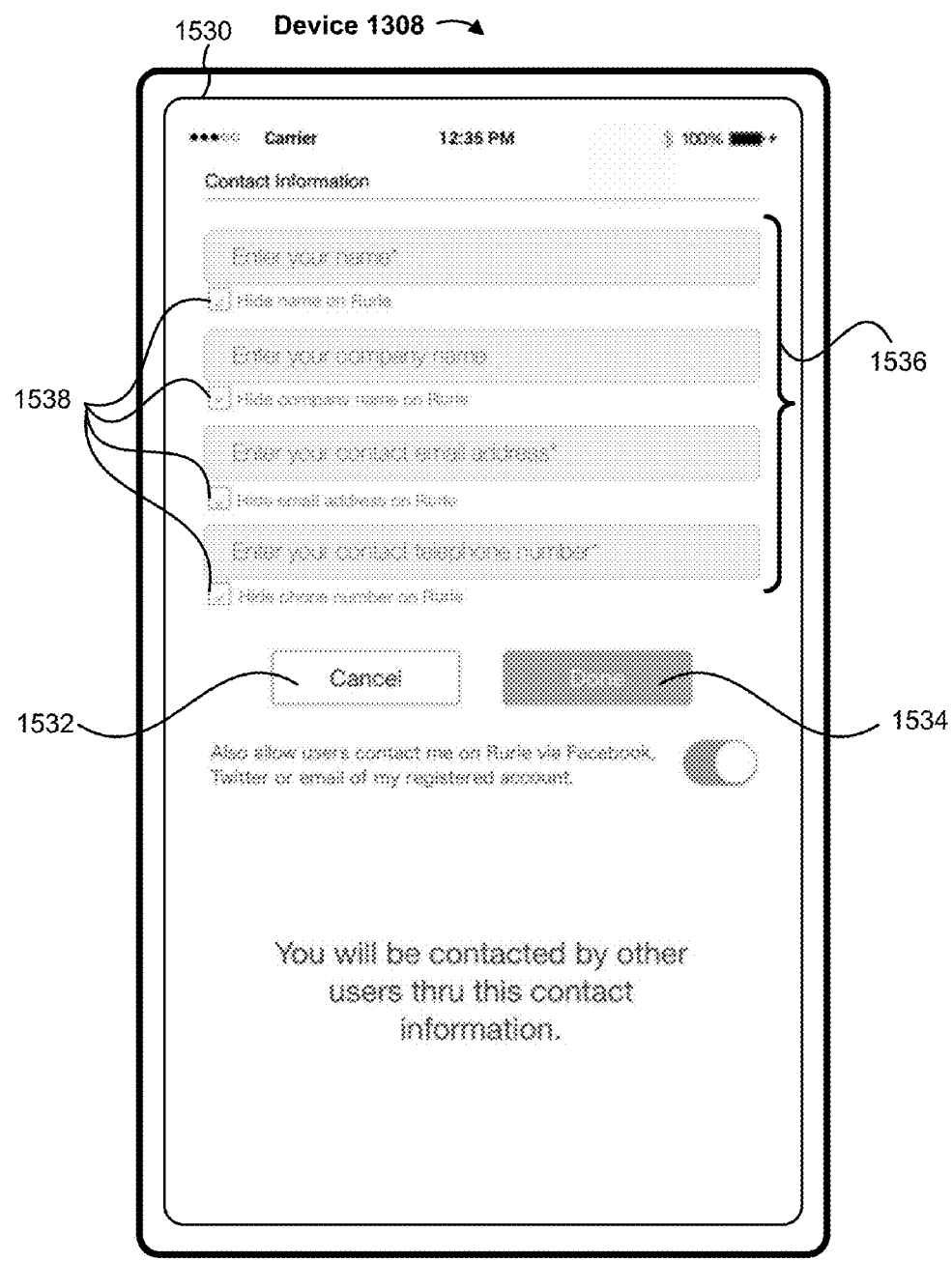

FIG. 15C illustrates an exemplary user interface 1530 for entering contact information, in accordance with some embodiments. In some embodiments, user interface 1530 includes the following elements, or a subset or superset thereof: a plurality of fields 1536 for a user to enter contact information (e.g., name, company name, contact email address, contact telephone number, etc.); a plurality of selection boxes 1538 to hide/show the respective contact information; icon 1532, labeled "Cancel;" and icon 1534, labeled "Done." In some embodiments, a user is prompted for contact information such as name, company name, contact email address, and contact telephone number (e.g., using the plurality of fields 1536). In some embodiments, the user selects icon 1534 to save the entered contact information (e.g., after entering the required information) or the user selects icon 1532 to cancel creation of the contact information. In some embodiments, a user has the option to choose whether to hide one or more fields of the contact information (e.g., using the plurality of selection boxes 1538). For example, if the user selects the box to hide the phone number, the phone number becomes private contact information (e.g., viewable only by the user) instead of public contact information (e.g., viewable by other users of the MAPpage platform). In some embodiments, a user has the option to allow other users to use alternate methods (e.g., Facebook, Twitter, etc.) to contact the user in the MAPpage platform.

Figure 15D:
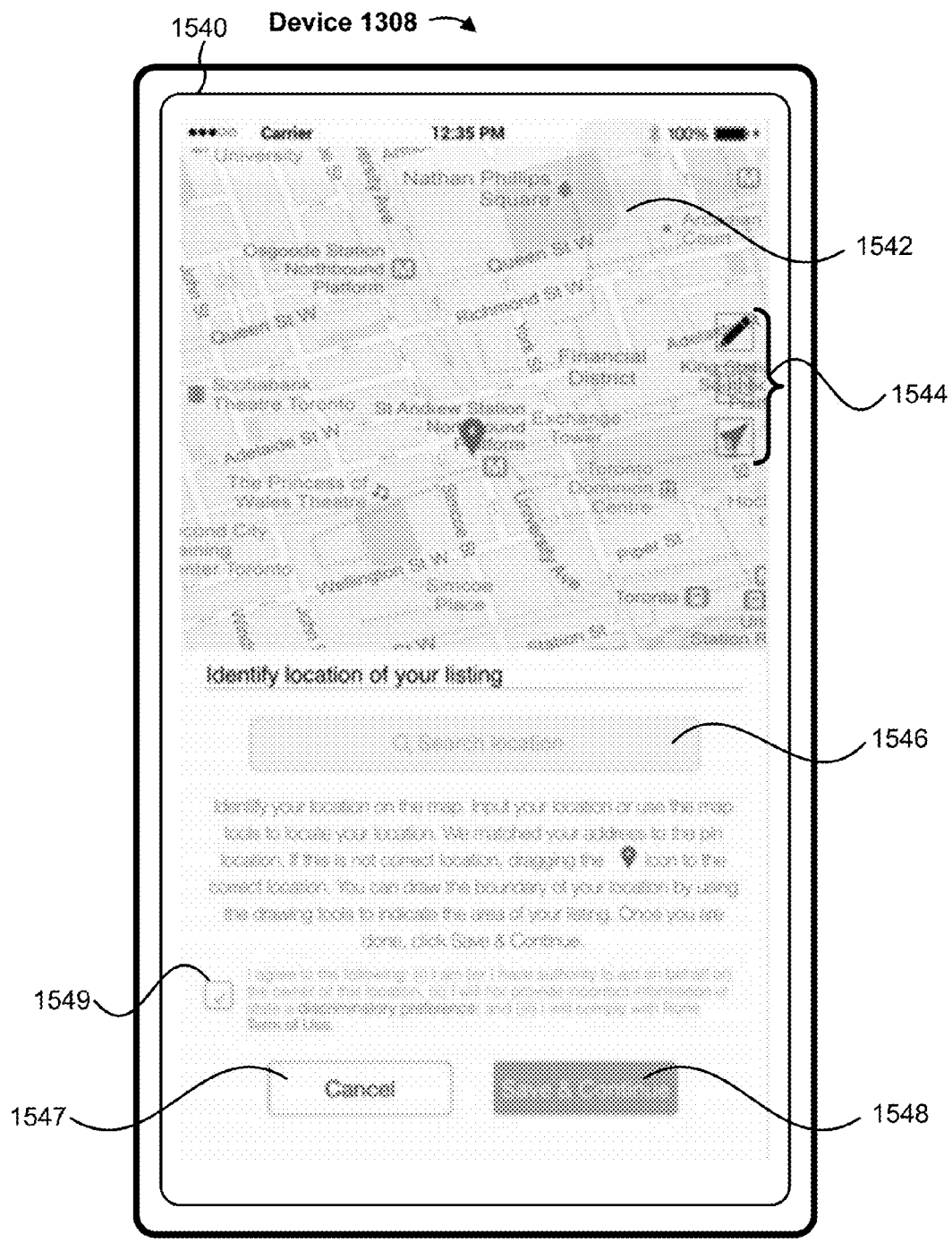

FIG. 15D illustrates an exemplary user interface 1540 for identifying a physical location to associate with a MAPpage, in accordance with some embodiments. In some embodiments, user interface 1540 includes the following elements, or a subset or superset thereof: interactive digital map 1542; one or more map tools 1544; text box 1546; icon 1547, labeled "Cancel;" and icon 1548, labeled "Save & Continue." In some embodiments, a user identifies a physical location by entering an address in text box 1546. In some embodiments, a user identifies a physical location by selecting a location on interactive digital map 1542 (e.g., using a finger and/or stylus to draw a boundary around an area or pin an exact location). In some embodiments, a user identifies a physical location by using one or more map tools 1544 to select a location. In some embodiments, the user selects icon 1548 to save the identified location or the user selects icon 1547 to cancel identifying a location. In some embodiments, user interface 1540 includes a selection box 1549 to indicate that the user agrees to the following: (1) the user has the authority to act on behalf of the owner of the identified location; (2) the user will not provide incorrect information or state a discriminatory preference; and (3) the user will comply with the MAPpage platform's terms of use.

Figure 15E:
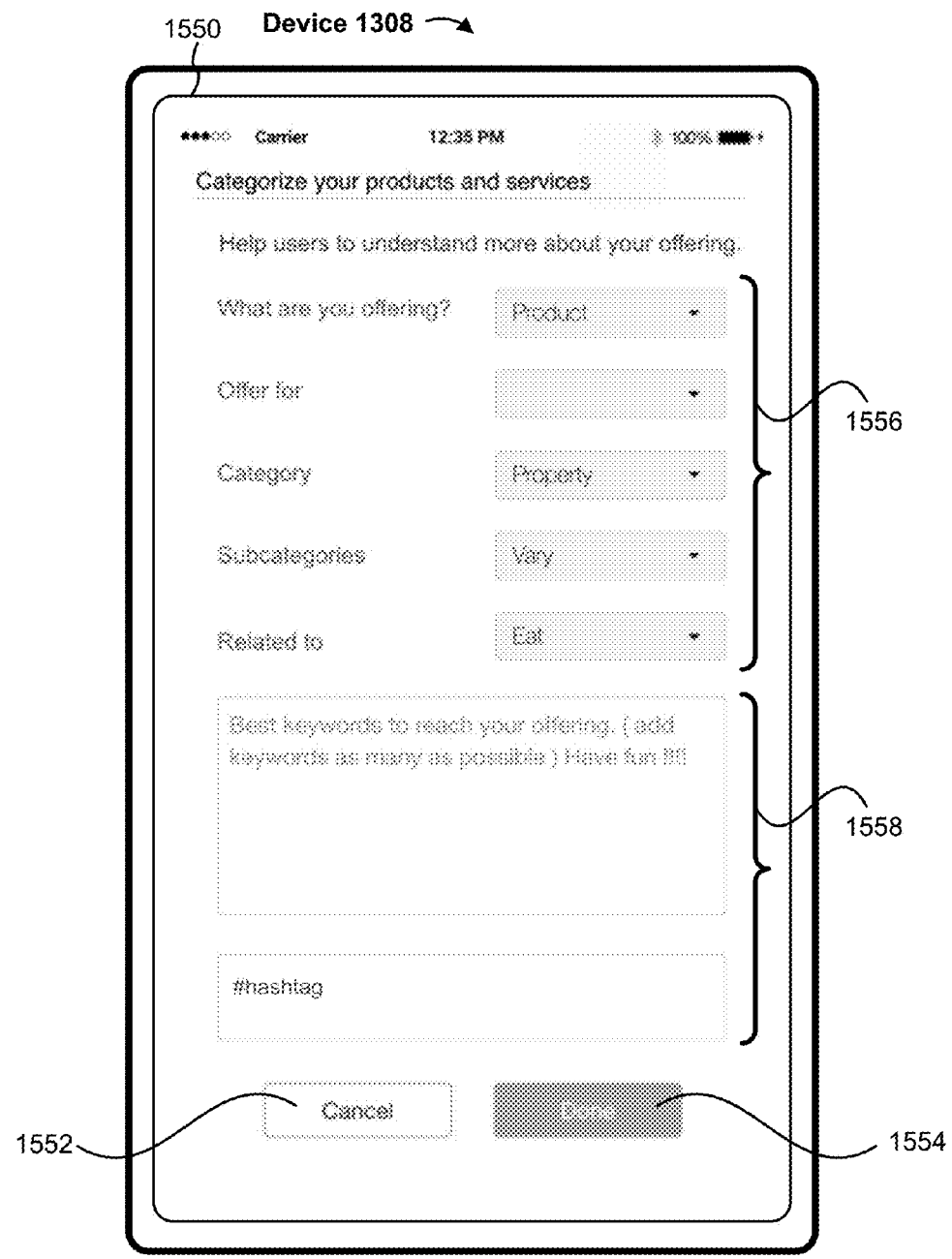

FIG. 15E illustrates an exemplary user interface 1550 for inputting elements for a new MAPpage, in accordance with some embodiments. In the example of FIG. 15E, user interface 1550 is a template for a single listing MAPpage. In some embodiments, templates for other types of MAPpages (e.g., as discussed with respect to FIG. 6) include analogous elements. In some embodiments, user interface 1550 includes the following elements, or a subset or superset thereof: one or more selection menus 1556; one or more text boxes 1558 (e.g., to enter keywords, to enter hashtags, etc.); icon 1552, labeled "Cancel;" and icon 1554, labeled "Done." In some embodiments, a user inputs elements for a new MAPpage by selecting from different options of selection menus 1556 (e.g., type of item or service offered, category of offering, subcategory of offering, and related daily life category) and by entering text (e.g., entering keywords and/or hashtags) in text boxes 1558. In some embodiments, the user selects icon 1554 to save (and/or submit) the entered information (e.g., after entering the required information) or the user selects icon 1552 to cancel creation of the new MAPpage.

Figure 15F:
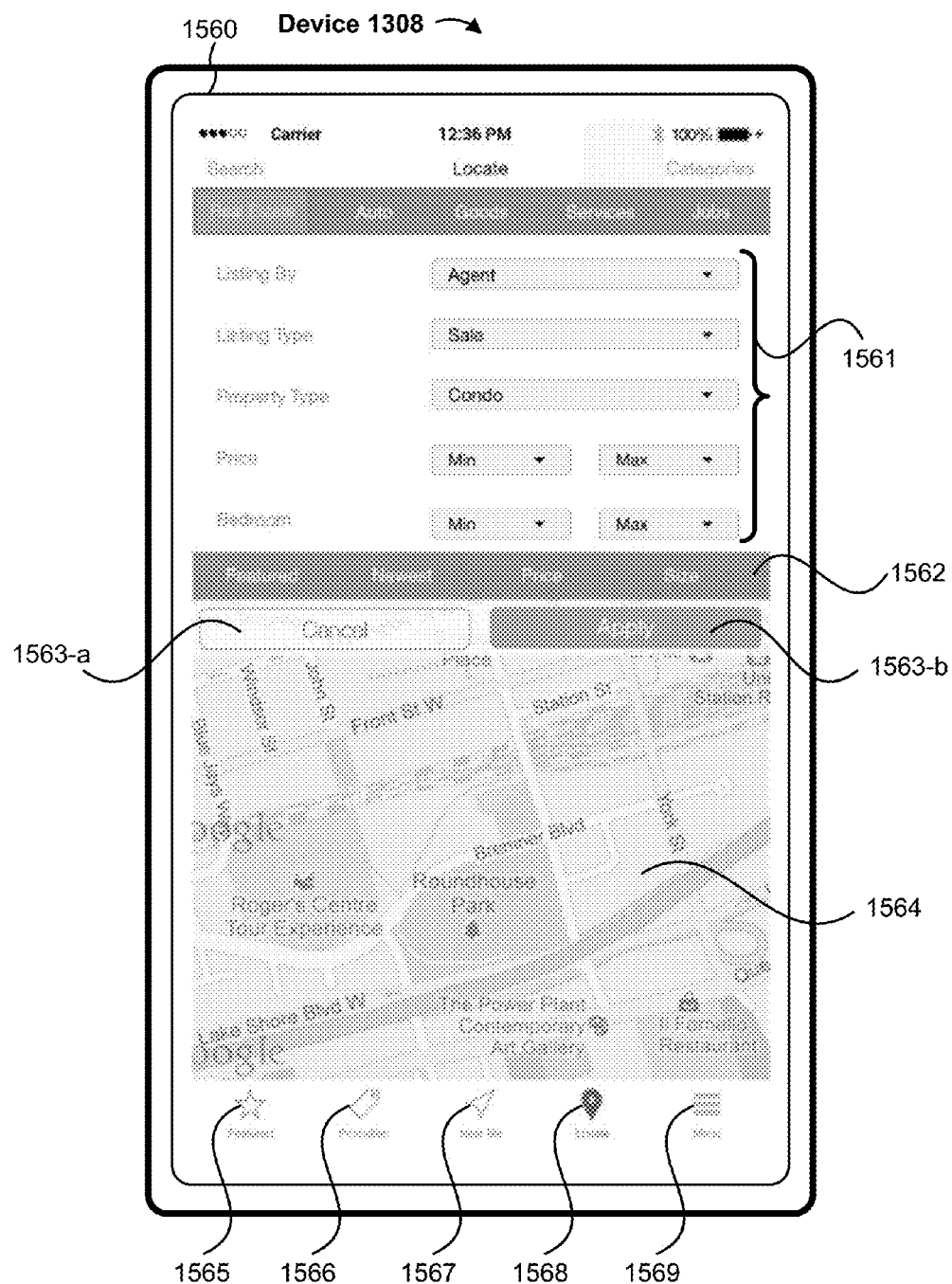

FIG. 15F illustrates an exemplary user interface 1560 for searching with a "locate" operation mode in the MAPpage platform, in accordance with some embodiments. The "locate" operation mode (e.g., 'Locate' 1001.1) is described above with respect to FIG. 10. In some embodiments, user interface 1560 includes the following elements, or a subset or superset thereof: one or more selection menus 1561; sorting menu 1562; icon 1563-a, labeled "Cancel;" icon 1563-b, labeled "Apply;" interactive digital map 1564; icon 1565, labeled "Featured;" icon 1566, labeled "Promotion;" icon 1567, labeled "Near Me;" icon 1568, labeled "Locate;" and icon 1569, labeled "Menu." In this example, icon 1568 has been selected for "Locate" and the category of "Real Estate" has been selected. A user may then input search criteria with the one or more selection menus 1561, such as who the property is listed by (e.g., by agent, by owner, new construction, etc.), listing type (e.g., for sale, for rent, etc.), property type (e.g., condo, house, townhouse, apartment, etc.), price (e.g., including a minimum and/or maximum price), and bedrooms (e.g., including a minimum and/or maximum number of bedrooms). In some embodiments, the user may select an option for sorting the results with sorting menu 1562 (e.g., to sort by relevance, price, size, etc.). The user also may input a location parameter for the search request using interactive digital map 1564. In some embodiments, the user selects an area of interest on interactive digital map 1564 by using a finger and/or stylus to draw a boundary around an area of interest on the map. In some embodiments, the user selects an area of interest on the map by using a finger and/or stylus to pin an exact location on the map. In some embodiments, the user selects icon 1563-*b* to apply the inputted search criteria or the user selects icon 1563-*a* to cancel the search.

Figure 15G:
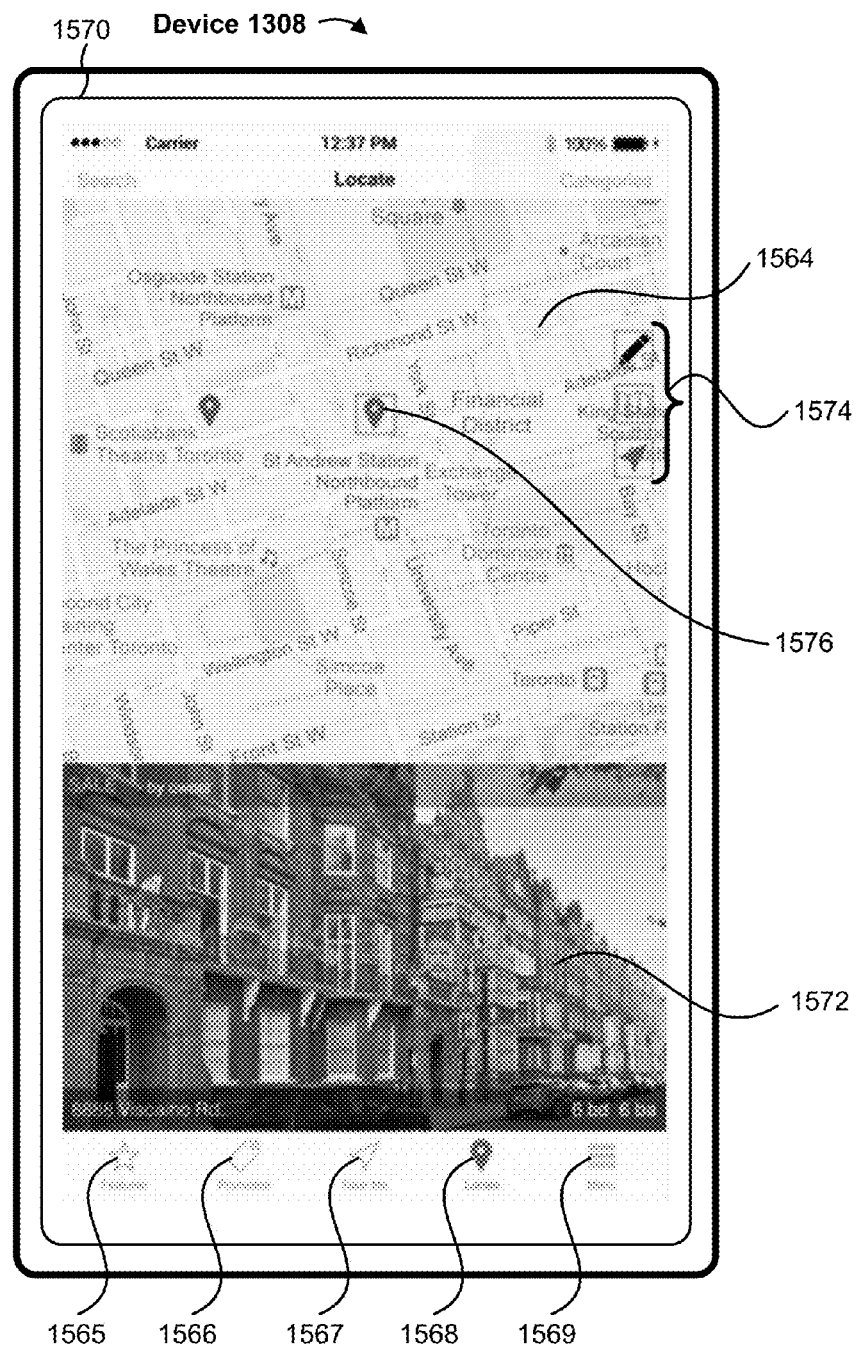

FIG. 15G illustrates an exemplary user interface 1570 for displaying a search result (e.g., in response to a search initiated in user interface 1560 of FIG. 15F), in accordance with some embodiments. In some embodiments, user interface 1570 includes the following elements, or a subset or superset thereof: interactive digital map 1564; one or more map tools 1574; MAPpage result 1572; icon 1565, labeled "Featured;" icon 1566, labeled "Promotion;" icon 1567, labeled "Near Me;" icon 1568, labeled "Locate;" and icon 1569, labeled "Menu." In this example, MAPpage result 1572 shows a property at 8888 Viscaino Rd. with 6 bedrooms and 6 baths that is for sale by owner for $999,999, and the location of the property is highlighted on interactive digital map 1564 (e.g., at location 1576). Although FIG. 15G shows a single search result, in some embodiments, user interface 1570 displays more than one search result.

Figure 15H:
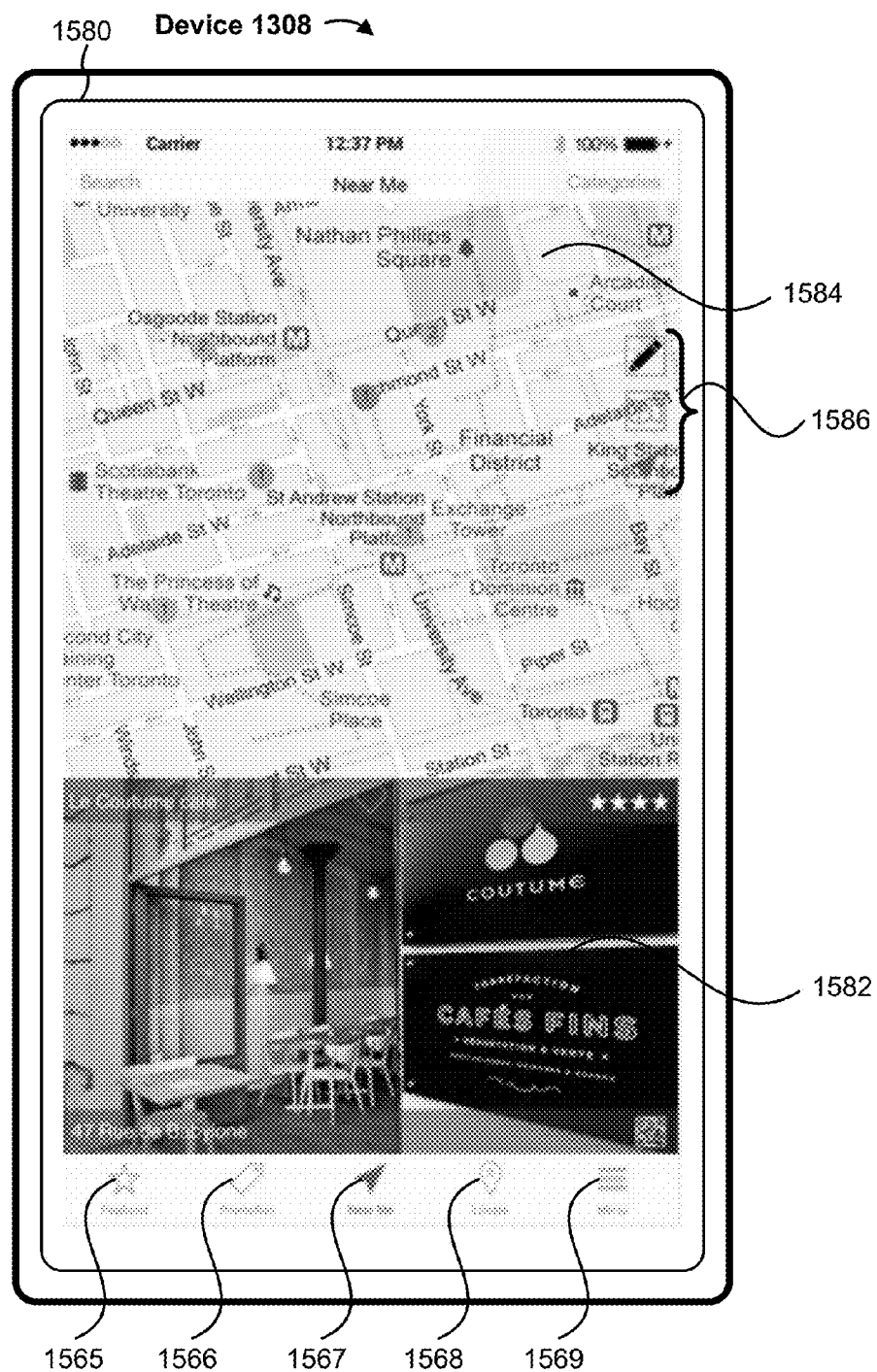

FIG. 15H illustrates an exemplary user interface 1580 for displaying a "Near Me" search result (e.g., in response to a "Near Me" search with icon 1567), in accordance with some embodiments. In some embodiments, user interface 1580 includes the following elements, or a subset or superset thereof: interactive digital map 1584; one or more map tools 1586; MAPpage result 1582; icon 1565, labeled "Featured;" icon 1566, labeled "Promotion;" icon 1567, labeled "Near Me;" icon 1568, labeled "Locate;" and icon 1569, labeled "Menu." In this example, a user searched with a "Near Me" operation mode (e.g., 'Near Me' 1001.2), as described above with respect to FIG. 10. Here, MAPpage result 1582 shows a nearby café and related information (e.g., name, address, photos, ratings, etc.).

Figure 15I:
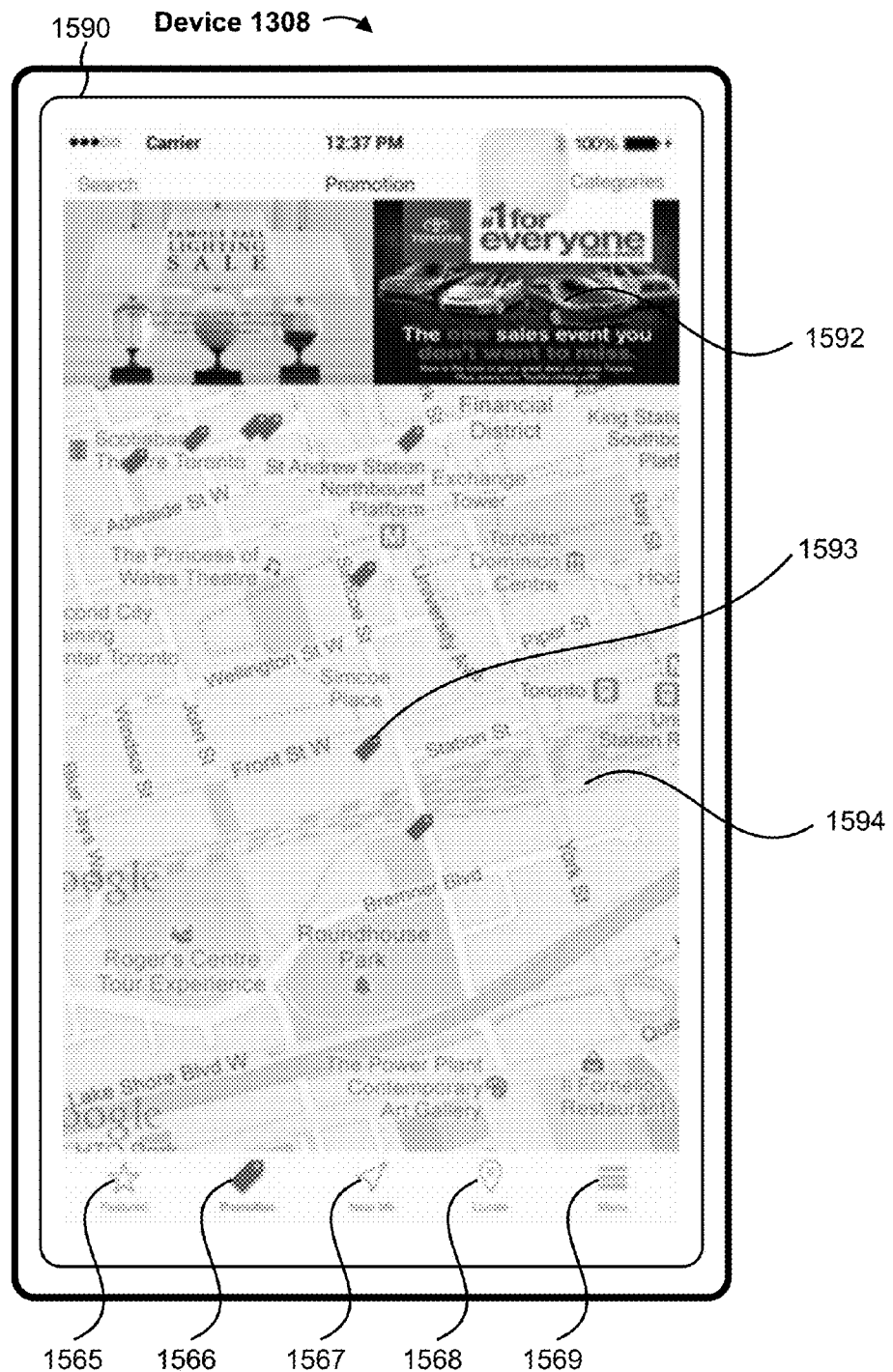

FIG. 15I illustrates an exemplary user interface 1590 for displaying a "Promotion" search result (e.g., in response to a "Promotion" search with icon 1566), in accordance with some embodiments. In some embodiments, user interface 1590 includes the following elements, or a subset or superset thereof: interactive digital map 1594; one or more MAPpage results 1592; one or more promotion icons 1593; icon 1565, labeled "Featured;" icon 1566, labeled "Promotion;" icon 1567, labeled "Near Me;" icon 1568, labeled "Locate;" and icon 1569, labeled "Menu." In this example, a user searched with a "Promotion" operation mode (e.g., 'Promotion' 1001.3), as described above with respect to FIG. 10. Here, MAPpage results 1592 show a promotion for a lighting sale and a promotion for a car sale in the location indicated by interactive digital map 1594. In some embodiments, a user selects a promotion icon (e.g., promotion icon 1593) on interactive digital map 1594 to learn more about the promotion at that location.

Figure 15J:
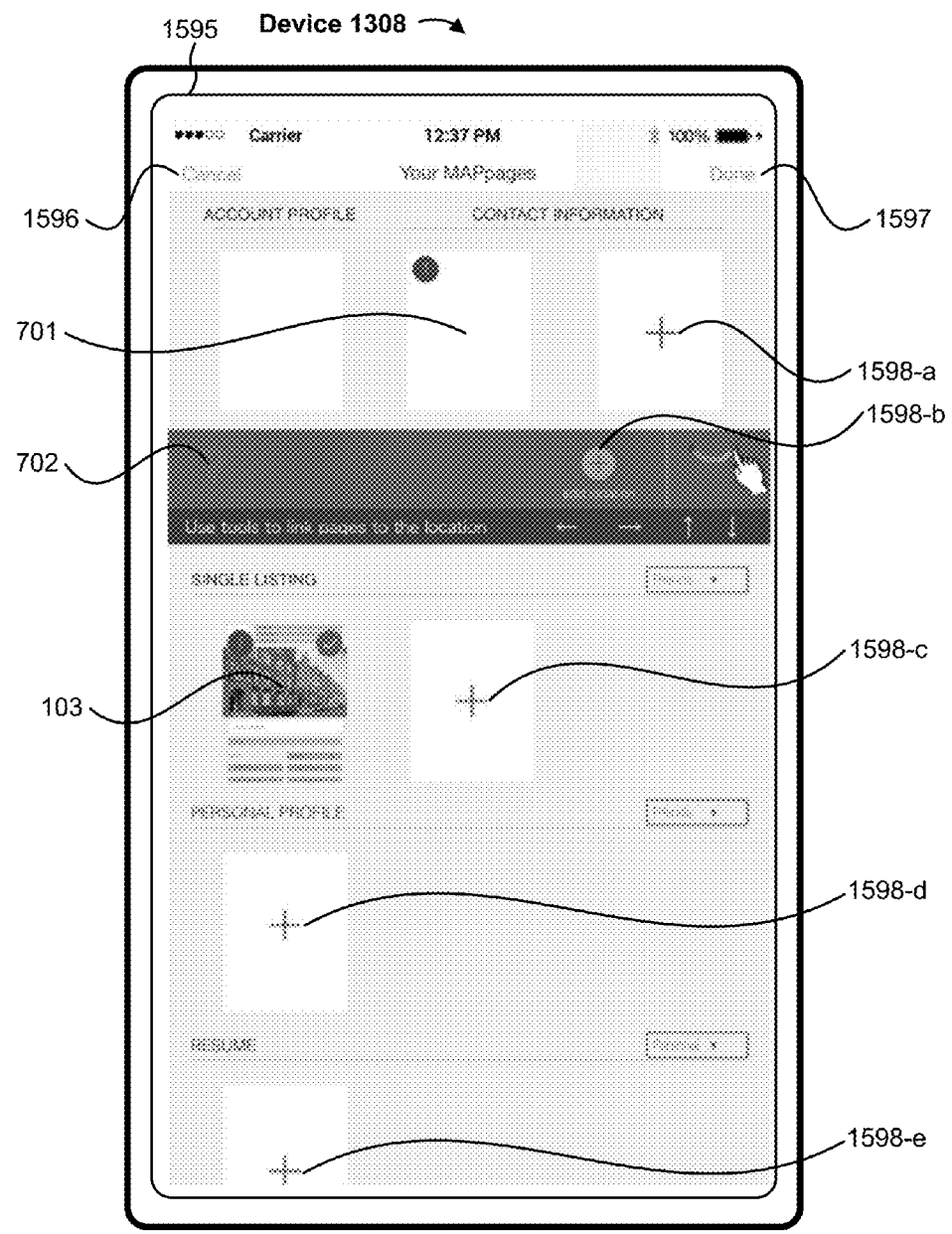
Figure 16A:
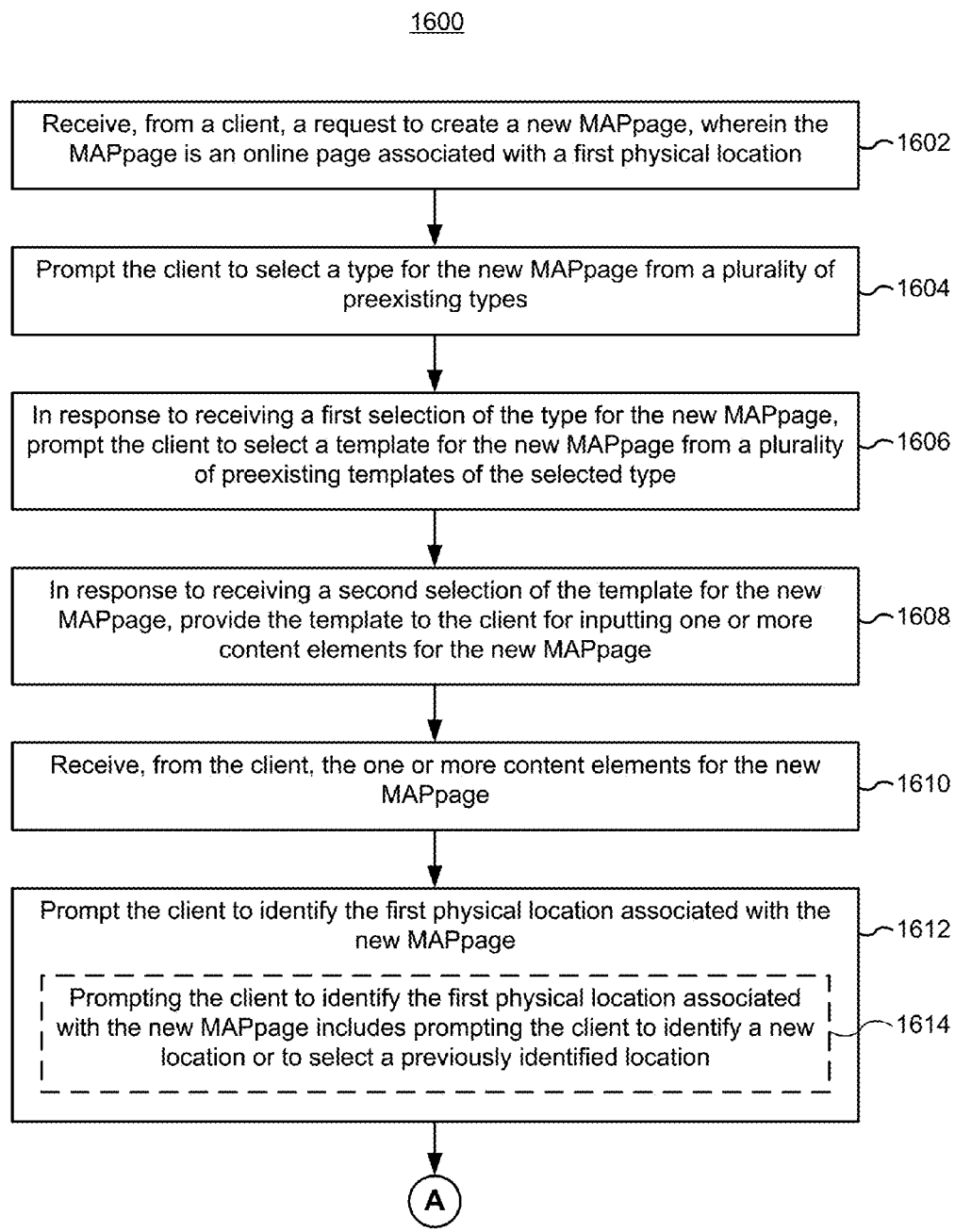
FIGS. 16A-16E are flow diagrams illustrating a method of creating, managing, and/or searching user-managed online pages (e.g., MAPpages) linked to locations on an interactive digital map, in accordance with some embodiments.
Figure 16B:
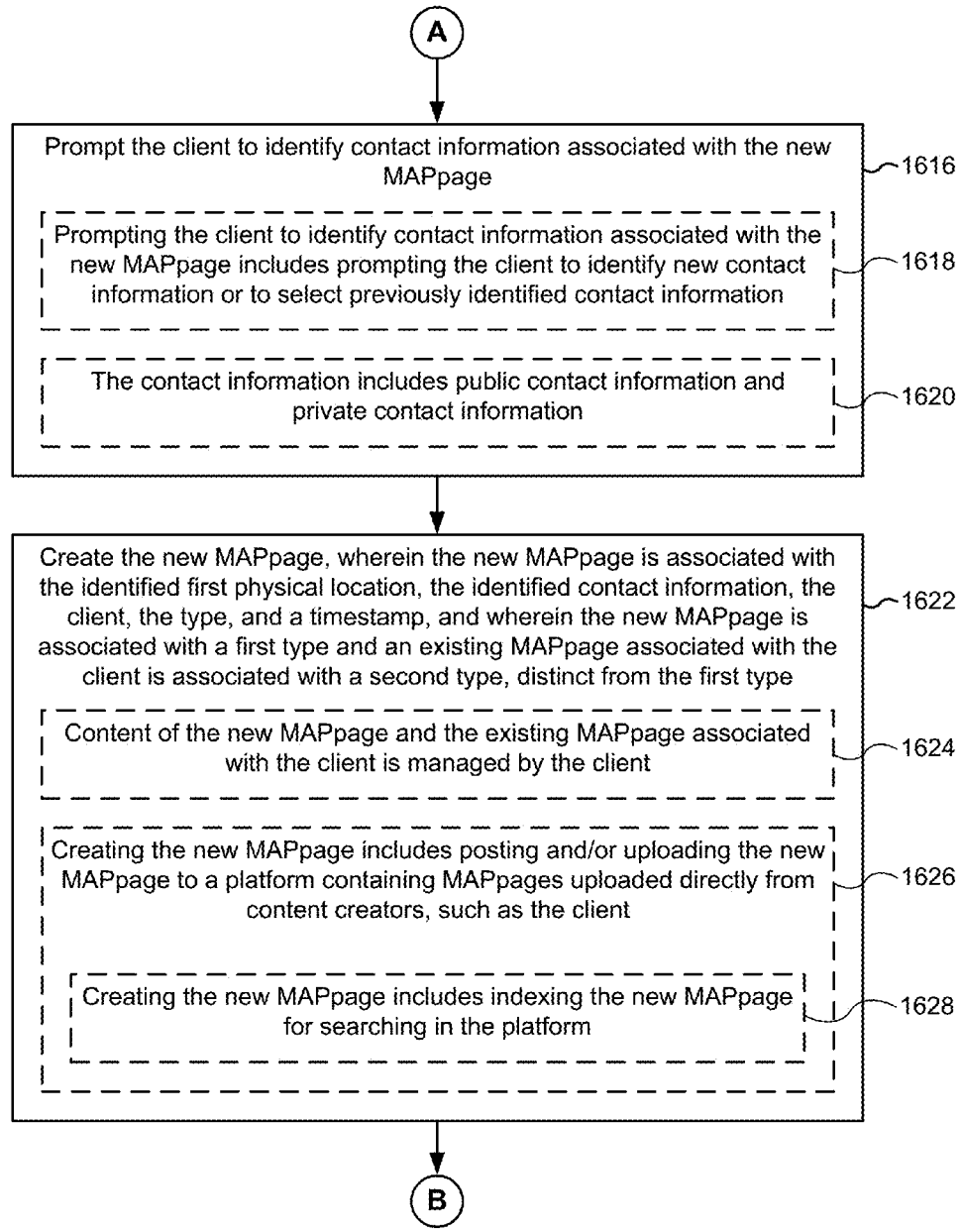
Figure 16C:
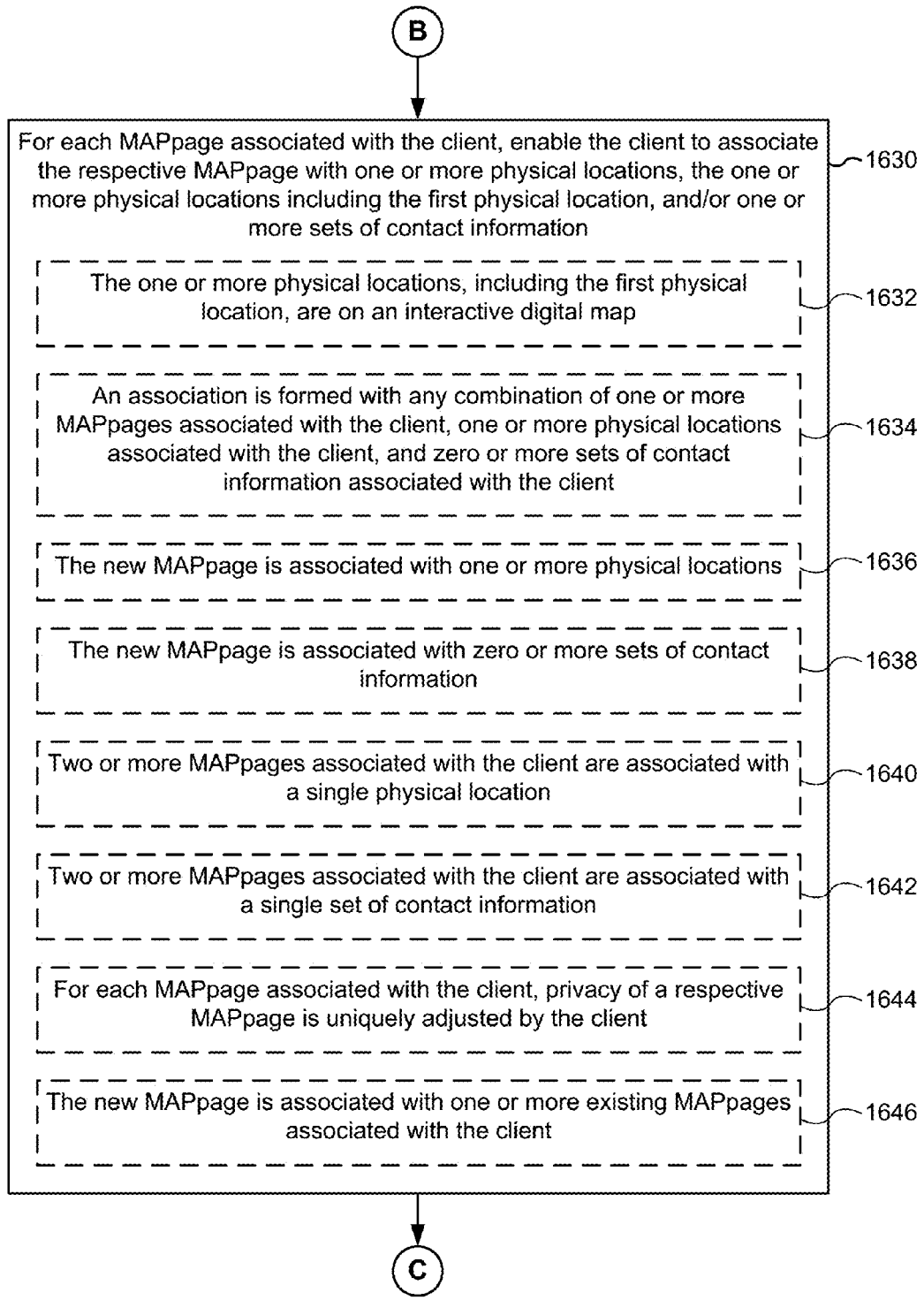
Figure 16D:
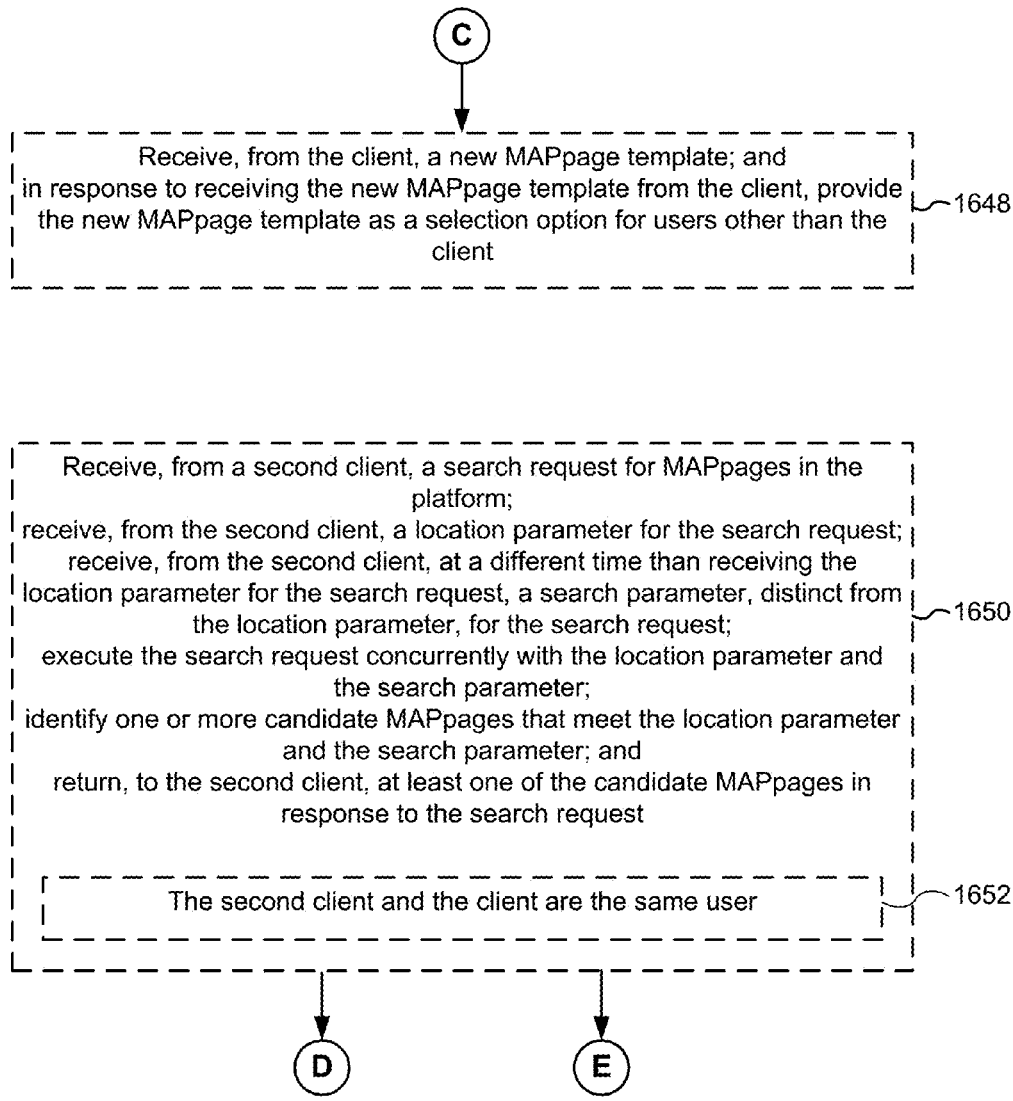
Figure 16E:
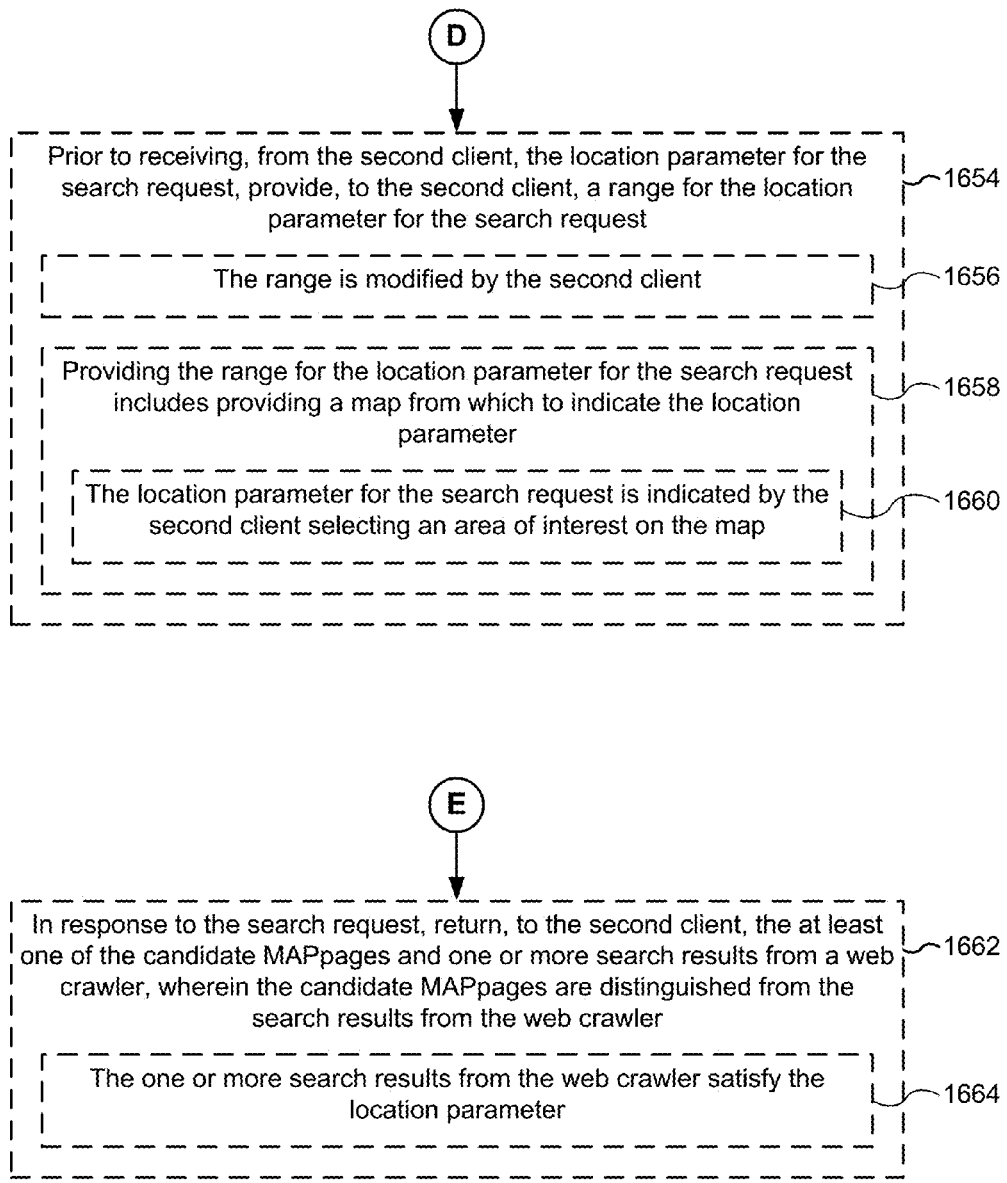

FIG. 15J illustrates an exemplary user interface 1595 for managing MAPpages and information associated with a respective client. In some embodiments, user interface 1595 includes the following elements, or a subset or superset thereof: an account profile region; a contact information region (e.g., including contact information 701 and icon 1598-*a* for adding additional contact information); a location region (e.g., including location information 702 and icon 1598-*b* for adding additional location information); and a MAPpage region (e.g., including one or more MAPpages 103 created by the respective client and icons 1598-*c*, 1598-*d*, and/or 1598-*e* for adding additional MAPpages of a respective type). In some embodiments, user interface 1595 is a scrollable interface, allowing the respective client to see a scrollable list of at least some of the content created and/or selected by the respective client. In some embodiments, the content in the scrollable list is organized and displayed by the content categories or types (e.g., single listing MAPpages, personal profile MAPpages, resume MAPpages, and other types of MAPpages discussed with respect to FIG. 6). In some embodiments, the respective client manages the relationships among contact information (e.g., contact information 701), location information (e.g., location information 702), and MAPpages (e.g., MAPpage 103) by drawing a connection (e.g., with a finger and/or stylus) between the desired relationship. In some embodiments, the respective client may associate a respective MAPpage with one or more physical locations and/or one or more sets of contact information. In some embodiments, user interface 1595 enables the respective client to create the many-to-many relationship (e.g., between MAPpages, contact information, and location information) discussed above with respect to FIG. 7. In some embodiments, the respective client may select contact information (e.g., contact information 701), location information (e.g., location information 702), and/or a MAPpage (e.g., MAPpage 103) in user interface 1595 to edit content of the selected item.

FIGS. 16A-16E are flow diagrams illustrating a method 1600 of creating, managing, and/or searching user-managed online pages (e.g., MAPpages) linked to locations on an interactive digital map, in accordance with some embodiments. In some embodiments, method 1600 is performed at a server system (e.g., server system 1311-*a*, FIGS. 13 and 14, or system 200, FIG. 2, or server systems 500, FIG. 5). In some embodiments, various operations performed with reference to method 1600 can be distributed across multiple servers or multiple server systems. In some embodiments, method 1600 is governed by instructions that are stored in a non-transitory computer readable storage medium and that are executed by one or more processors of a server system, such as the one or more processing units (CPUs) 1402 of server system 1311-*a*, shown in FIG. 14. For ease of explanation, the following describes method 1600 as performed by a single server system (e.g., server system 1311-*a*). Some operations in method 1600 are, optionally, combined and/or the order of some operations, is optionally, changed. Also, in some embodiments, operations shown in separate figures (e.g., FIGS. 16A-16E) may be combined to form other methods, and operations shown in the same figure and/or discussed in association with the same method may be separated into different methods.

As described below, method 1600 provides an efficient and user-friendly way to create online pages or documents easily without having any knowledge of HTML or computer programming languages. The method provides a platform for users to create, develop, search, view, share, post, advertise, promote and manage online pages or documents. The method provides a platform for users to interact, comment, provide feedback, communicate, and conduct business transactions with other users.

A server system receives (1602), from a client, a request to create a new MAPpage, wherein the MAPpage is an online page associated with a first physical location (e.g., a specific physical location, such as an address). In some embodiments, the request to create the new MAPpage is received from a client (e.g., over communication network 1306, FIG. 13, or over communication network 203, FIG. 2). As used herein, the term "client" refers to a component of computer hardware or software that accesses a service made available by the server system. Thus, in some circumstances, the client is another server system. In some circumstances, the request is received by a first module on the server system and the client is a second module, distinct from the first module, on the server system (e.g., the second module is another server computer or another software module). In some embodiments, the client is a search engine server system. In some embodiments, the client is a portable multifunction device (e.g., client device 1308/1310, FIG. 13). In some embodiments, the client is a user of a portable multifunction device (e.g., a user of client device 1308/1310, FIG. 13). In some embodiments, a request to create a new MAPpage is received in response to a user of a client device (e.g., client device 1308, FIG. 13) selecting an icon to sell in a MAPpage platform (e.g., icon 1516, labeled "sell," of user interface 1510, FIG. 15A). In some embodiments, a receiving module (e.g., receiving module 1422, FIG. 14) is used to receive, from a client, a request to create a new MAPpage, wherein the MAPpage is a page, viewable online, associated with a first physical location, as described above with respect to FIG. 14.

The server system prompts (1604) the client to select a type for the new MAPpage from a plurality of preexisting types. In some embodiments, the plurality of preexisting types is two or more of the group consisting of single listing page, multi-listing page, user profile page, resume page, company profile page, promotion page, advertising page, property page, auto page, jobs page, service page, product page, and other types listed in FIG. 6. In some embodiments, a prompting module (e.g., prompting module 1424, FIG. 14) is used to prompt the client to select a type for the new MAPpage from a plurality of preexisting types, as described above with respect to FIG. 14.

The server system, in response to receiving a first selection of the type for the new MAPpage, prompts (1606) the client to select a template for the new MAPpage from a plurality of preexisting templates of the selected preexisting MAPpage type. In some embodiments, the templates available for selection depend on the type of MAPpage selected (e.g., in operation 1604). For example, templates for a single listing MAPpage type may differ from templates for a resume MAPpage type, since different information is needed for a listing of a product/service than information for a resume. In some embodiments, a prompting module (e.g., prompting module 1424, FIG. 14) is used to prompt, in response to receiving a first selection of the type for the new MAPpage, the client to select a template for the new MAPpage from a plurality of preexisting templates of the selected type, as described above with respect to FIG. 14.

The server system, in response to receiving a second selection of the template for the new MAPpage, provides (1608) the template to the client for inputting one or more content elements for the new MAPpage. For example, FIG. 15E shows a template for a single listing MAPpage provided in user interface 1550. In FIG. 15E, user interface 1550 is provided to the client for inputting one or more content elements (e.g., type of item or service offered, category of offering, subcategory of offering, related daily life category, keywords, and/or hashtags) for the new MAPpage. In some embodiments, the one or more content elements include input from one or more selection menus (e.g., selection menus 1556, FIG. 15E), text input in one or more text boxes (e.g., text boxes 1558, FIG. 15E), and/or media files (e.g., from client device 1308). In some embodiments, a prompting module (e.g., prompting module 1424, FIG. 14) and/or a template module (e.g., template module 1430, FIG. 14) is used to provide, in response to receiving a second selection of the template for the new MAPpage, the template to the client for inputting one or more content elements for the new MAPpage, as described above with respect to FIG. 14.

While FIG. 15E shows one example of inputting one or more content elements for a new MAPpage, in some embodiments, the client has more user control over the content of the new MAPpage. In some embodiments, the client has control over the spatial arrangement of the one or more content elements for the new MAPpage and inputting one or more content elements for the new MAPpage includes inputting spatial arrangement of the one or more content elements for the new MAPpage. As an example, if the client selects a template for a promotion page with a photograph and text, the client can arrange the spatial arrangement of the photograph and text on the MAPpage. For example, the client can move the location of the text and/or move the location of the photograph.

The server system receives (1610), from the client, the one or more content elements (e.g., the one or more content elements inputted by the user of client device 1308 in operation 1608) for the new MAPpage. In some embodiments, the one or more content elements are received in response to a user of a client device (e.g., client device 1308, FIG. 13) selecting an icon to save and/or submit the content elements (e.g., icon 1554, labeled "Done," of user interface 1550, FIG. 15E). In some embodiments, a receiving module (e.g., receiving module 1422, FIG. 14) is used to receive, from the client, the one or more content elements for the new MAPpage, as described above with respect to FIG. 14.

The server system prompts (1612) the client to identify the first physical location associated with the new MAPpage. In some embodiments, the server system prompts the client to identify a new location or to select a previously identified location. In some embodiments, the server system prompts the client to identify a new location by providing a user interface with an interactive digital map and/or a text box (e.g., user interface 1540, FIG. 15D). In some embodiments, a user of a client device (e.g., client device 1308, FIG. 13) identifies a physical location by entering an address in a text box (e.g., text box 1546, FIG. 15D). In some embodiments, the user of the client device identifies a physical location by selecting a location on an interactive digital map (e.g., interactive digital map 1542, FIG. 15D) by using a finger (or stylus) to identify the location by drawing a boundary and/or pinning the exact location on the interactive digital map. In some embodiments, a prompting module (e.g., prompting module 1424, FIG. 14) is used to prompt the client to identify the first physical location associated with the new MAPpage, as described above with respect to FIG. 14.

In some embodiments, prompting the client to identify the first physical location associated with the new MAPpage includes (1614) prompting the client to identify a new location (e.g., as described above with respect to operation 1612) or to select a previously identified location.

The server system prompts (1616) the client to identify contact information associated with the new MAPpage. In some embodiments, the server system prompts the client to identify new contact information by providing a user interface (e.g., user interface 1530, FIG. 15C). In some embodiments, a user of a client device (e.g., client device 1308, FIG. 13) identifies contact information by entering information such as name, company name, contact email address, and contact telephone number (e.g., using the plurality of fields 1536, FIG. 15C). Typically, contact information is associated with the new MAPpage, but in some embodiments, a MAPpage does not have associated contact information (e.g., a user profile MAPpage). In some circumstances, where the new MAPpage type and/or template does not require contact information, operation 1616 is skipped. In some embodiments, a prompting module (e.g., prompting module 1424, FIG. 14) is used to prompt the client to identify contact information associated with the new MAPpage, as described above with respect to FIG. 14.

In some embodiments, prompting the client to identify contact information associated with the new MAPpage includes (1618) prompting the client to identify new contact information (e.g., as described above with respect to operation 1616) or to select previously identified contact information. In some embodiments, the new MAPpage is associated with one or more sets of identified contact information. In some embodiments, the new MAPpage is not associated with a set of contact information (e.g., when the MAPpage is a user profile page).

In some embodiments, the contact information includes (1620) public contact information (e.g., viewable by users other than the client) and private contact information (e.g., viewable only by the client). In some embodiments, a user of a client device (e.g., client device 1308, FIG. 13) has the option to choose whether to hide one or more fields of the contact information (e.g., using the plurality of selection boxes 1538, FIG. 15C). For example, if the user selects the box to hide the phone number, the phone number becomes private contact information (e.g., viewable only by the user or friends of the user) instead of public contact information (e.g., viewable by other users of the MAPpage platform).

The server system creates (1622) the new MAPpage, wherein the new MAPpage is associated with the identified first physical location (e.g., as identified in operation 1612), the identified contact information (e.g., as identified in operation 1616), the client (e.g., a user of client device 1308), the type (e.g., a single listing page, a multi-listing page, a user profile page, a resume page, a company profile page, a promotion page, a property page, an auto page, a jobs page, a services page, and a product page; or a sub-type, such as sub-types of property, auto, products, or services on a single-listing page), and a timestamp (e.g., including month, day, year, and/or time), and wherein the new MAPpage is associated with a first type and an existing MAPpage associated with the client is associated with a second type, distinct from the first type. In some embodiments, the client is associated with (and manages) more than one type of MAPpage. For example, the client is associated with (and manages) the new MAPpage of a first type (e.g., single listing MAPpage for selling a house) and the client is associated with (and manages) an existing MAPpage of a second type (e.g., a resume MAPpage), both within the same MAPpage platform. In some embodiments, a creating module (e.g., creating module 1426, FIG. 14) is used to create the new MAPpage, wherein the new MAPpage is associated with the identified first physical location, the identified contact information, the client, the type, and a timestamp, and wherein the new MAPpage is associated with a first type and an existing MAPpage associated with the client is associated with a second type, distinct from the first type, as described above with respect to FIG. 14.

In some embodiments, content of the new MAPpage and the existing MAPpage associated with the client is (1624) managed by the client. In some embodiments, content of the new MAPpage and the existing MAPpage associated with the client is managed by the client in a user interface such as user interface 1595, described above with respect to FIG. 15J. In some embodiments, relationships of the new MAPpage and the existing MAPpage (e.g., associations with locations, contact information, and/or other MAPpages) associated with the client are managed by the client in a user interface such as user interface 1595, described above with respect to FIG. 15J.

In some embodiments, creating the new MAPpage includes (1626) posting and/or uploading the new MAPpage to a platform containing MAPpages (e.g., a MAPpage platform) uploaded directly from content creators, such as the client. For example, in some embodiments, creating the new MAPpage includes posting, uploading, and/or saving the new MAPpage to a database (e.g., database 1314-*a*, FIG. 14) containing MAPpages from users of the MAPpage platform. In some embodiments, the new MAPpage is uploaded, posted, and/or saved from the client (e.g., from client device 1308) to the server system (e.g., server system 1311-*a*), via a communication network (e.g., communication network 1306, FIG. 13).

In some embodiments, creating the new MAPpage includes (1628) indexing the new MAPpage for searching in the platform (e.g., the MAPpage platform). In some embodiments, indexing the new MAPpage is performed by Index Engine 220, as described above with respect to FIG. 2. In some embodiments, a creating module (e.g., creating module 1426, FIG. 14) is used to index the new MAPpage for searching in the platform.

The server system, for each MAPpage associated with the client, enables (1630) the client to associate the respective MAPpage with one or more physical locations, the one or more physical locations including the first physical location, and/or one or more sets of contact information. In some embodiments, the server system provides a user interface to enable the client to associate the respective MAPpage with one or more physical locations and/or one or more sets of contact information. For example, user interface 1595 (FIG. 15J) enables the client to associate a respective MAPpage with one or more physical locations and/or one or more sets of contact information, creating a many-to-many relationship (e.g., between MAPpages, contact information, and location information), as discussed above with respect to FIG. 7.

In some embodiments, the one or more physical locations, including the first physical location, are (1632) on an interactive digital map. For example, in FIG. 15G, MAPpage 1572 is an online page (for a real estate property) associated with location 1576 on interactive digital map 1564.

In some embodiments, an association (e.g., a relationship in which the items are associated) is (1634) formed with any combination of one or more MAPpages associated with the client, one or more physical locations associated with the client, and zero or more sets of contact information associated with the client. The association forms a many-to-many relationship, which is discussed in detail with respect to FIG. 7, and for sake of brevity, the details are not repeated here.

In some embodiments, the new MAPpage is (1636) associated with one or more physical locations. For example, in some embodiments, a promotion MAPpage is associated with coffee shops at two distinct physical locations. In this example, a user may own five coffee shops around town, but two of the locations would benefit from a promotion. Thus, the user may associate the promotion MAPpage with the two physical locations. If later, the user decides that another one of the coffee shop locations would benefit from the promotion, the user can associate the promotion MAPpage to an additional location (e.g., with user interface 1595, FIG. 15J). Similarly, if the user decides that a location is successful enough with the promotion, the user can remove the relationship between the promotion MAPpage and the location.

In some embodiments, the new MAPpage is (1638) associated with zero or more sets of contact information. In some embodiments, for example, a user profile MAPpage is not associated with contact information. As another example, in some embodiments, a resume MAPpage is associated two sets of contact information (e.g., including work contact information and home contact information).

In some embodiments, two or more MAPpages associated with the client are (1640) associated with a single physical location. For example, a user may be offering multiple products and/or services (e.g., each with a different MAPpage) from a single physical location.

In some embodiments, two or more MAPpages associated with the client are (1642) associated with a single set of contact information. For example, a business (e.g., a bank) with multiple branches may have a single set of contact information for the main business contact information (e.g., the bank's main telephone number, the bank's web site, the bank's email address, etc.).

In some embodiments, for each MAPpage associated with the client, privacy of a respective MAPpage is (1644) uniquely adjusted by the client. For example, if the client has three associated MAPpages, the client can adjust the privacy of a first MAPpage to be completely private (e.g., viewable only by the client), adjust the privacy of a second MAPpage to be partially private (e.g., viewable only by the client and one or more select friends), and adjust the privacy of a third MAPpage to be public (e.g., viewable by all other users).

In some embodiments, the new MAPpage is (1646) associated with one or more existing MAPpages associated with the client. For example, if a client is already associated with multiple branches of a business, if the new MAPpage is for a new branch of the business, the new MAPpage can be associated with one or more existing MAPpages of the existing branches of the business. In some embodiments, the new MAPpage is associated with one or more existing MAPpages not associated with the client (e.g., associated with another client). For example, if a business has multiple branches associated with (e.g., owned by) a first client, and a second client opens a franchise of the business and creates a new MAPpage for the new franchise, the second client may associate the new MAPpage to one or more MAPpages associated with the first client. In some embodiments, a request for association of the new MAPpage with the one or more existing MAPpages must be approved by the other client (e.g., the first client) before the association is made.

In some embodiments, the server system receives (1648), from the client, a new MAPpage template; and in response to receiving the new MAPpage template from the client, provides the new MAPpage template as a selection option for users other than the client. For example, if a first client creates a new MAPpage template and wants to share the new MAPpage template with other users of the MAPpage platform, the first client may submit the new MAPpage template and the server system receives, from the first client, the new MAPpage template. Then, in response to receiving the new MAPpage template (e.g., from the first client), the server system provides the new MAPpage template as a selection option for users other than the first client (e.g., a second client, a third client, or any other client other than the first client). In some embodiments, a template module (e.g., template module 1430, FIG. 14) is used to receive, from the client, a new MAPpage template; and in response to receiving the new MAPpage template from the client, provide the new MAPpage template as a selection option for users other than the client, as described above with respect to FIG. 14.

In some embodiments, the server system receives (1650), from a second client, a search request for MAPpages in the platform; receives, from the second client, a location parameter for the search request; receives, from the second client, at a different time than receiving the location parameter for the search request, a search parameter, distinct from the location parameter, for the search request; executes the search request concurrently with the location parameter and the search parameter; identifies one or more candidate MAPpages that meet the location parameter and the search parameter; and returns, to the second client, at least one of the candidate MAPpages in response to the search request. In some embodiments, the search parameter includes a category parameter for the search request, such as property, automotive, products, services, and jobs. In some embodiments, the search parameter includes an activity parameter for the search request, such as eat, drink, shop, stay, and learn. In some embodiments, the search parameter includes a promotion parameter to search for promotions in the area specified by the location parameter. In some embodiments, the search parameter includes keywords for the search request. In some embodiments, the search parameter includes a search method for the search request (e.g., 'Locate' 1001.1, 'Near Me' 1001.2, 'Promotion' 1001.3, or 'General keyword' 1001.4, as described with respect to FIG. 10). In some embodiments, a search module (e.g., search module 1432, FIG. 14) is used to receive, from a second client, a search request for MAPpages in the platform; receive, from the second client, a location parameter for the search request; receive, from the second client, at a different time than receiving the location parameter for the search request, a search parameter, distinct from the location parameter, for the search request; execute the search request concurrently with the location parameter and the search parameter; identify one or more candidate MAPpages that meet the location parameter and the search parameter; and return, to the second client, at least one of the candidate MAPpages in response to the search request, as described above with respect to FIG. 14.

In some embodiments, the second client and the client are (1652) the same user. In some embodiments, a user who creates MAPpages is also the user who searches for MAPpages (e.g., either for his/her own MAPpages or other MAPpages).

In some embodiments, the server system, prior to receiving, from the second client, the location parameter for the search request, provides (1654), to the second client, a range for the location parameter for the search request. In some embodiments, the range for the location parameter provided for the search request is based on GPS location of the second client. For example, if the second client is at a given location, the server system provides a range for the location parameter for the search request of a five mile radius around the given location. In some embodiments, a search module (e.g., search module 1432, FIG. 14) is used to provide to the second client, prior to receiving, from the second client, the location parameter for the search request, a range for the location parameter for the search request, as described above with respect to FIG. 14.

In some embodiments, the range is (1656) modified by the second client. For example, even if the second client is in San Francisco (and the range for the location parameter provided by the server system is in San Francisco), the second client may want to search for MAPpages in another location (e.g., in another city, such as New York, or in another location in the same city that is different from the range provided by the server system). Thus, in some embodiments, the range for the location parameter for the search request is modified by the second client.

In some embodiments, providing the range for the location parameter for the search request includes (1658) providing a map from which to indicate the location parameter. In some embodiments, the server system provides a map from which the second client can indicate the location parameter. For example, in FIG. 15F, interactive digital map 1564 is provided from which the second client can indicate the location parameter for the search request.

In some embodiments, the location parameter for the search request is (1660) indicated by the second client selecting an area of interest on the map. In some embodiments, the second client selects an area of interest on the map (e.g., displayed on a touch screen) by using a finger and/or stylus to draw a boundary around an area of interest on the map. In some embodiments, the second client selects an area of interest on the map (e.g., displayed on a touch screen) by using a finger and/or stylus to pin an exact location on the map. For example, in FIG. 15F, the second client selects an area of interest on interactive digital map 1564 by using a finger and/or stylus to draw a boundary around an area of interest on the map or by pinning an exact location on the map.

In some embodiments, the server system, in response to the search request, returns (1662), to the second client, the at least one of the candidate MAPpages and one or more search results from a web crawler, wherein the candidate MAPpages are distinguished from the search results from the web crawler. In some embodiments, the candidate MAPpages are visually distinguished from the search results from the web-crawler (e.g., with color, hashing, font, etc.). In some embodiments, a search module (e.g., search module 1432, FIG. 14) is used to return, in response to the search request, to the second client, the at least one of the candidate MAPpages and one or more search results from a web crawler, wherein the candidate MAPpages are distinguished from the search results from the web crawler, as described above with respect to FIG. 14.

In some embodiments, the one or more search results from the web crawler satisfy (1664) the location parameter. For example, in some embodiments, the one or more search results are from an existing map platform (e.g., Google map platform) and the web crawler results are restricted by the location parameter. In some embodiments, the search area is expanded until at least one candidate MAPpage is found. In some embodiments, the search area is expanded until at least one search result from the web crawler is found.

FIGS. 17A-17H illustrate exemplary user interfaces for creating, managing, and/or searching user-managed pages (e.g., MAPpages) linked to locations on an interactive digital map, in accordance with some embodiments. The user interfaces in these figures are used to illustrate the processes described above, including the processes in FIGS. 16A-16E. Although some of the examples which follow will be given with reference to inputs on a touch-screen display (where the touch-sensitive surface and the display are combined, for example on client device 1308), in some embodiments, the device detects inputs on a touch-sensitive surface that is separate from the display (e.g., inputs on a track pad of a laptop computer) or the device detects inputs from other sources (e.g., inputs from a mouse and/or keyboard of a desktop computer). For convenience of explanation, the embodiments described with reference to FIGS. 17A-17H will be discussed with reference to operations performed on a device with a touch-sensitive display system and/or touch screen. For sake of clarity, FIGS. 17A-17H simply show the touch screen of device 1308, without showing other details of device 1308. The user interfaces in FIGS. 17A-17H include the following elements, or a subset or superset thereof: signal strength indicator(s) for wireless communication(s), such as cellular and Wi-Fi signals; time; Bluetooth indicator; and battery status indicator. These well-known elements are not described in detail so as not to unnecessarily obscure aspects of the disclosed embodiments.

Figure 17A:
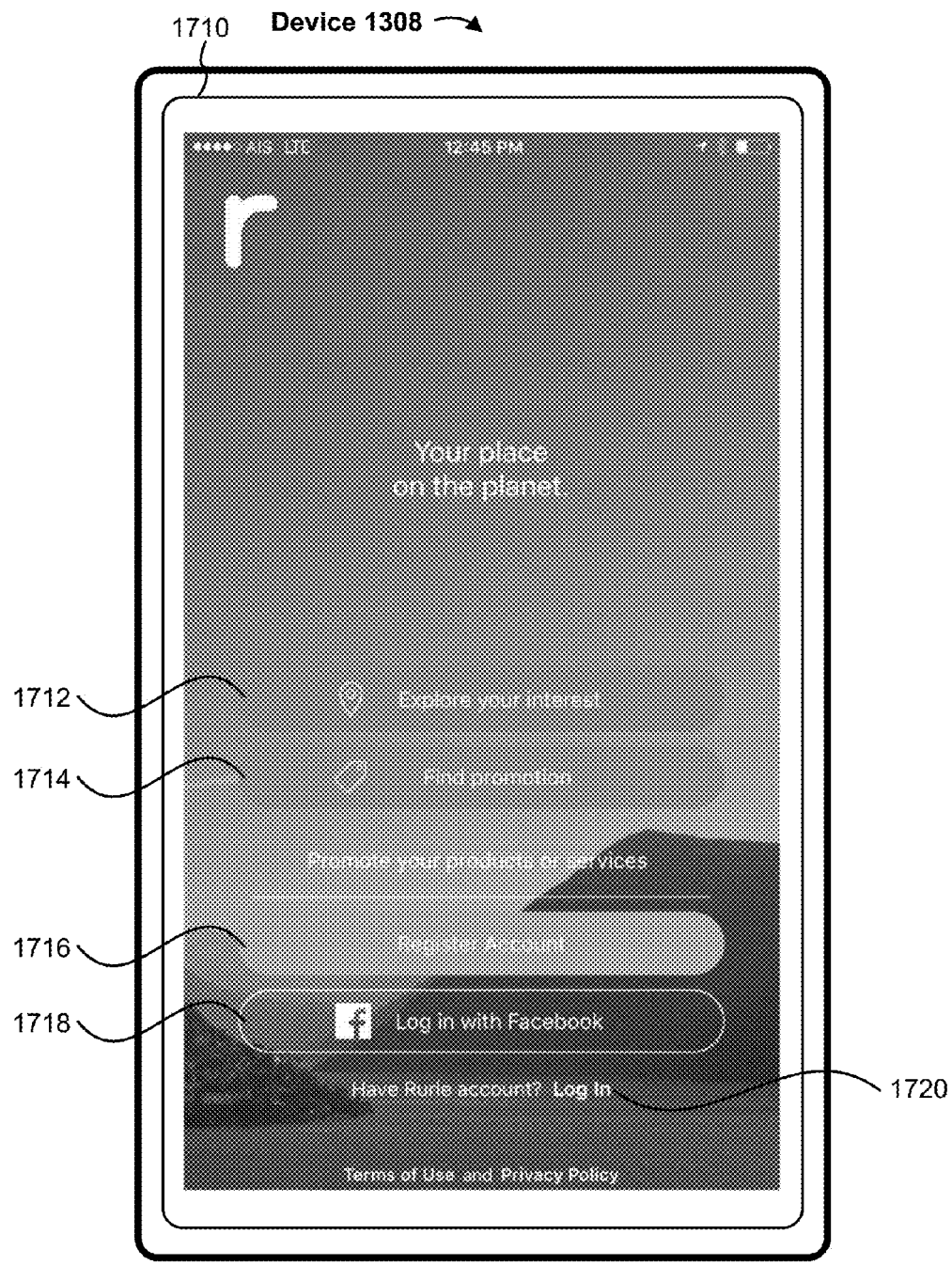
FIGS. 17A-17H illustrate exemplary user interfaces for creating, managing, and/or searching user-managed online pages (e.g., MAPpages) linked to locations on an interactive digital map, in accordance with some embodiments.

FIG. 17A illustrates an exemplary user interface 1710 including a menu of options to navigate a platform containing MAPpages (sometimes called a "MAPpage platform") on client device 1308, in accordance with some embodiments. In some embodiments, FIG. 17A shows an alternative embodiment of user interface 1510, as described above with respect to FIG. 15A. In some embodiments, user interface 1710 includes the following elements, or a subset or superset thereof: icon 1712, labeled "Explore your interest;" icon 1714, labeled "Find promotion;" and one or more options for logging in to an account (e.g., with icon 1716, labeled "Register Account," with icon 1718, labeled "Log in with Facebook," with icon 1720, labeled "Log In"). In some embodiments, when a user selects icon 1712 to "Explore your interest," a user interface for buying a product or service (e.g., user interface 1560 of FIG. 15F or user interface 1730 of FIG. 17C) is displayed. In some embodiments, when a user selects icon 1714 to "Find promotion," a user interface for finding a promotion (e.g., user interface 1590 of FIG. 15I) is displayed. In some embodiments, if a user has not yet logged in to an account, when the user selects icon 1716, a user interface to create an account (e.g., user interface 1520 of FIG. 15B) is displayed. In some embodiments, as shown in FIG. 17A, user interface 1710 includes additional options for logging into an account (e.g., with icon 1720 to log in to an existing account and/or with icon 1718 to log in with another account of the user, such as a Facebook account).

Figure 17B:
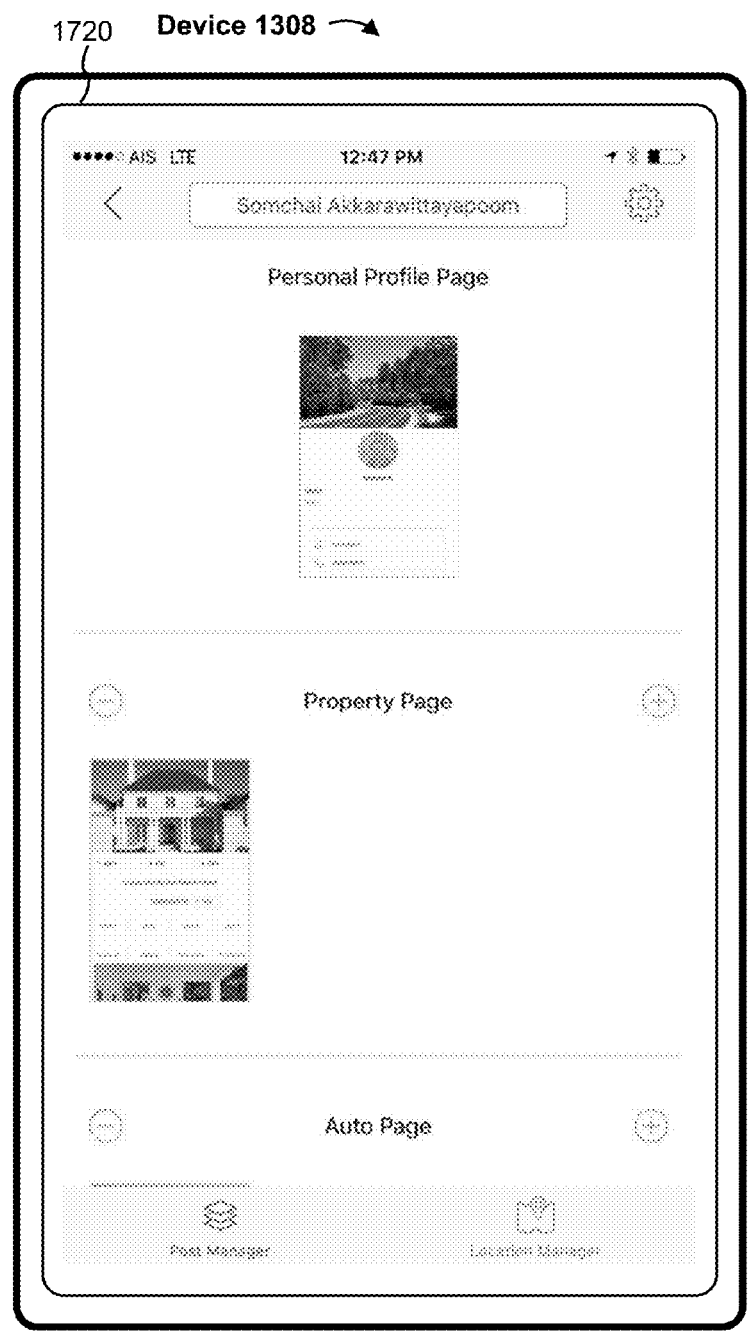

FIG. 17B illustrates an exemplary user interface 1720 for managing MAPpages and information associated with a respective client, in accordance with some embodiments. In some embodiments, FIG. 17B shows an alternative embodiment of user interface 1595, as described above with respect to FIG. 15J. In some embodiments, user interface 1720 is a scrollable interface, allowing the respective client to see a scrollable list of at least some of the content created and/or selected by the respective client. In some embodiments, the content in the scrollable list is organized and displayed by the content categories or types (e.g., personal profile MAPpages, property MAPpages, auto MAPpages, and other types of MAPpages discussed herein and with respect to FIG. 6). In some embodiments, user interface 1720 enables the respective client to manage the content of the MAPpages, manage the location information of the MAPpages, add one or more MAPpages in one or more categories or types, and/or delete MAPpages from one or more categories or types.

Figure 17C:
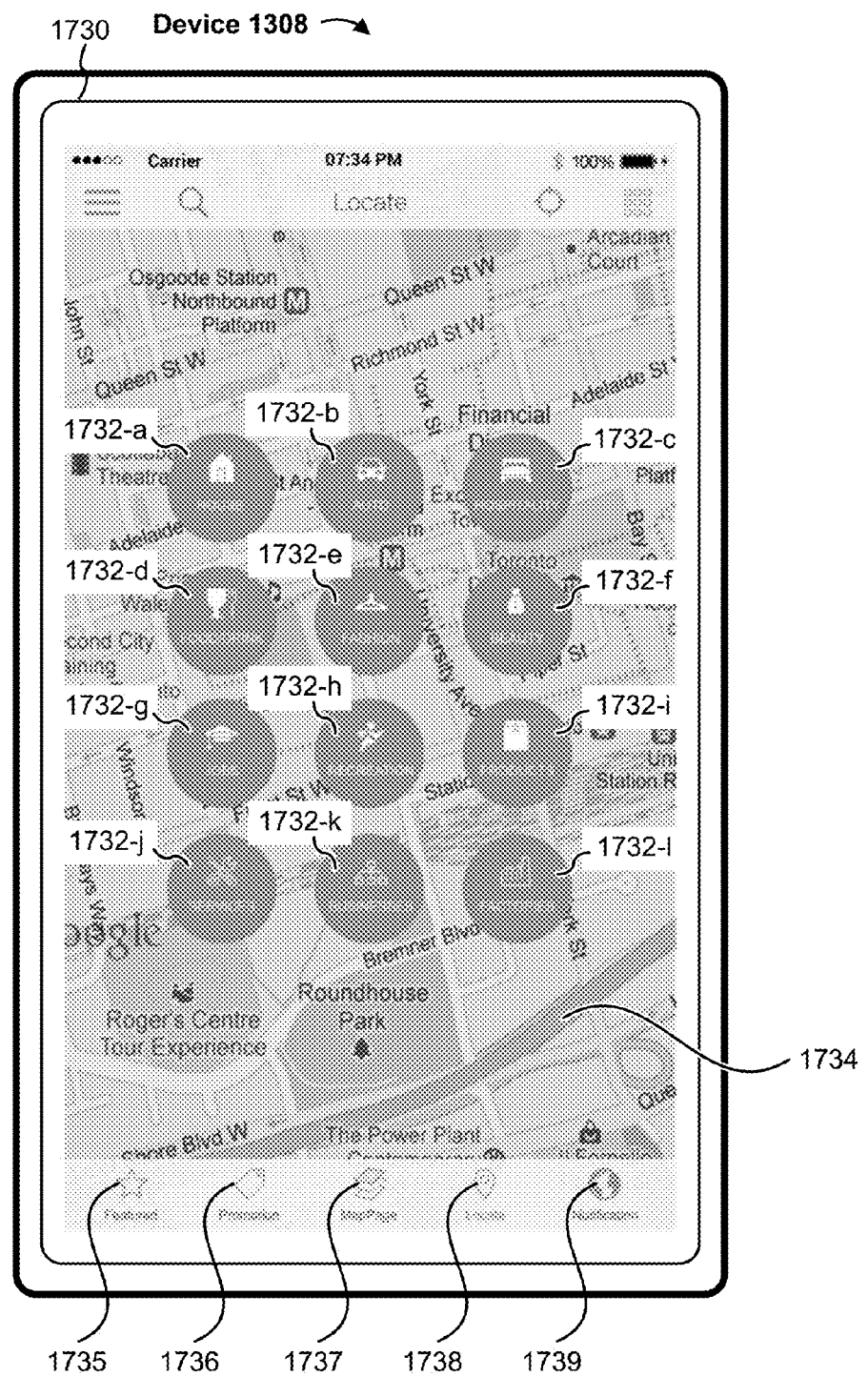

FIG. 17C illustrates an exemplary user interface 1730 for searching with a "locate" operation mode in the MAPpage platform, in accordance with some embodiments. The "locate" operation mode (e.g., 'Locate' 1001.1) is described above with respect to FIG. 10. In some embodiments, FIG. 17C shows an alternative embodiment of user interface 1560, as described above with respect to FIG. 15F. In some embodiments, user interface 1730 includes the following elements, or a subset or superset thereof: icon 1732-a, labeled "House;" icon 1732-b, labeled "Auto;" icon 1732-c, labeled "Hospitality;" icon 1732-d, labeled "Food/Drink;" icon 1732-e, labeled "Fashion;" icon 1732-f, labeled "Beauty;" icon 1732-g, labeled "Jobs;" icon 1732-h, labeled "Recreation;" icon 1732-i, labeled "Products;" icon 1732-j, labeled "Services;" icon 1732-k, labeled "Businesses;" icon 1732-1, labeled "Factories;" interactive digital map 1734; icon 1735, labeled "Featured;" icon 1736, labeled "Promotion;" icon 1737, labeled "Map Page;" icon 1738, labeled "Locate;" and icon 1739, labeled "Notifications." In some embodiments, when a user selects an icon (e.g., icon 1732-a through icon 1732-1), a user interface for searching within the corresponding category is displayed. For example, in some embodiments, when a user selects icon 1732-a for "House," a user interface for locating a property (e.g., user interface 1740 of FIG. 17D) is displayed. As another example, in some embodiments, when a user selects icon 1732-b for "Auto," a user interface for locating an automobile (e.g., with search criteria for an automobile) is displayed. As yet another example, in some embodiments, when a user selects icon 1732-g for "Jobs," a user interface for finding a job or job candidate (e.g., with search criteria for a job or job candidate) is displayed.

Figure 17D:
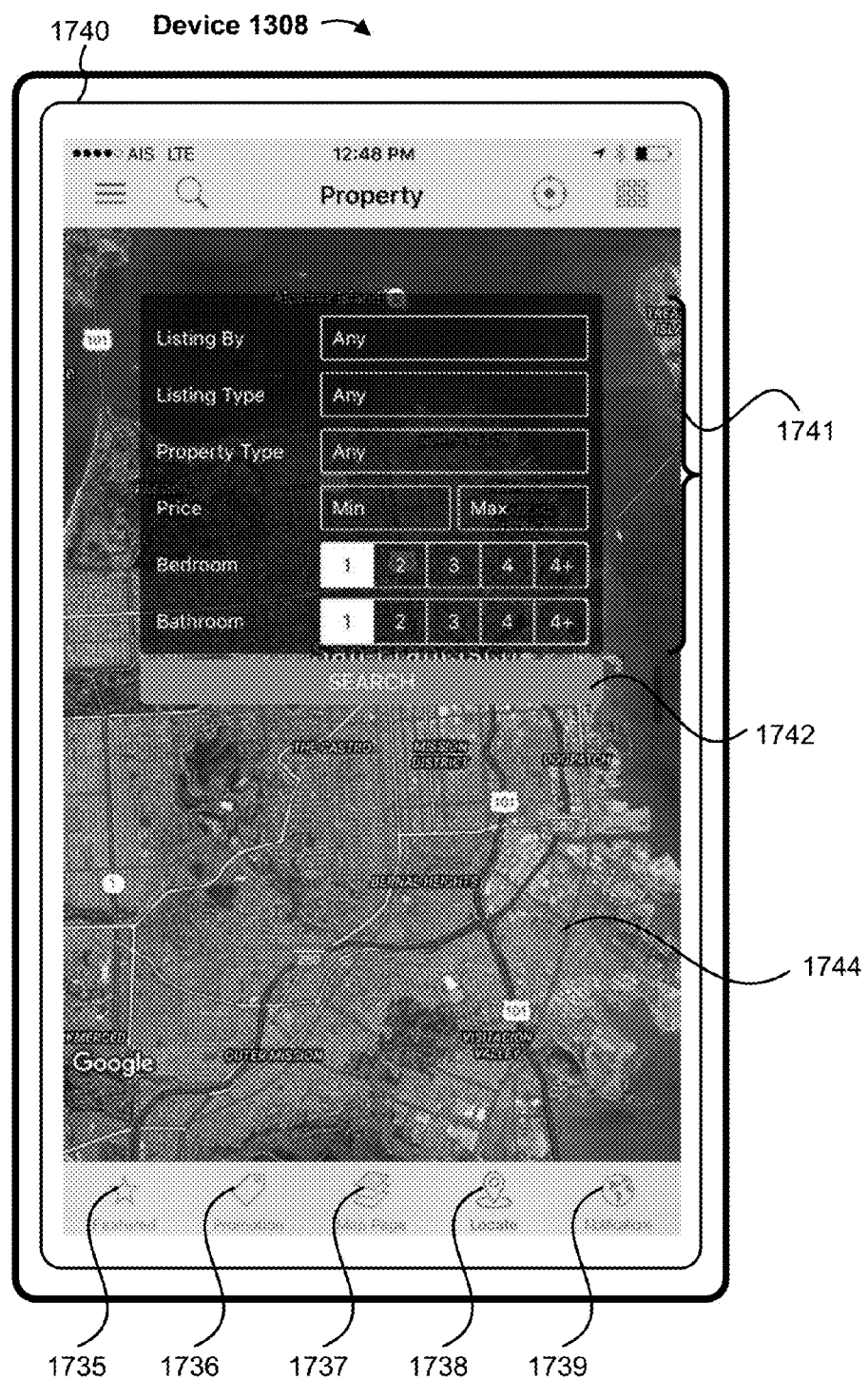

FIG. 17D illustrates an exemplary user interface 1740 for searching for a real estate property, in accordance with some embodiments. In some embodiments, FIG. 17D shows an alternative embodiment of user interface 1560, as described above with respect to FIG. 15F. In some embodiments, user interface 1740 includes the following elements, or a subset or superset thereof: one or more selection menus 1741; icon 1742, labeled "Search;" interactive digital map 1743; icon 1735, labeled "Featured;" icon 1736, labeled "Promotion;" icon 1737, labeled "Map Page;" icon 1738, labeled "Locate;" and icon 1739, labeled "Notifications." In this example, icon 1738 has been selected for "Locate" and the category of "Property" has been selected (e.g., by selecting icon 1732-a of FIG. 17C). A user may then input search criteria with the one or more selection menus 1741, such as who the property is listed by (e.g., by agent, by owner, new construction, etc.), listing type (e.g., for sale, for rent, etc.), property type (e.g., condo, house, townhouse, apartment, etc.), price (e.g., including a minimum and/or maximum price), bedrooms (e.g., selecting a number of bedrooms), and bathrooms (e.g., selecting a number of bathrooms). Although not shown in FIG. 17D, in some embodiments, the user may select an option for sorting the results with a sorting menu (e.g., to sort by relevance, price, size, etc.). The user also may input a location parameter for the search request using interactive digital map 1743. In some embodiments, the user selects an area of interest on interactive digital map 1743 by using a finger and/or stylus to draw a boundary around an area of interest on the map. In some embodiments, the user selects an area of interest on the map by using a finger and/or stylus to pin an exact location on the map. In some embodiments, the user selects icon 1742 to apply the inputted search criteria.

Figure 17E:
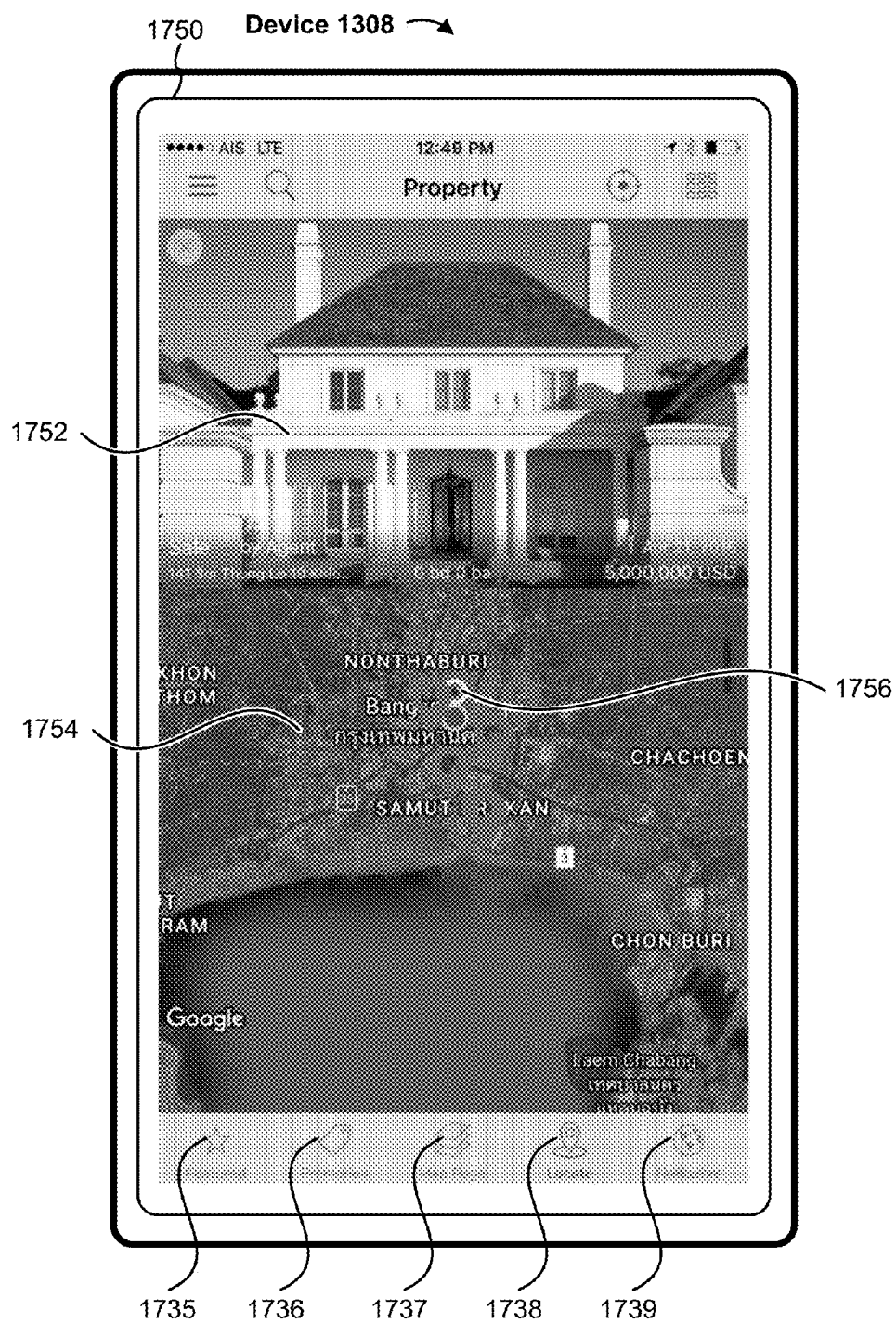

FIG. 17E illustrates an exemplary user interface 1750 for displaying a search result (e.g., in response to a search initiated in user interface 1740 of FIG. 17D), in accordance with some embodiments. In some embodiments, user interface 1750 includes the following elements, or a subset or superset thereof: MAPpage result 1752; interactive digital map 1754; icon 1735, labeled "Featured;" icon 1736, labeled "Promotion;" icon 1737, labeled "Map Page;" icon 1738, labeled "Locate;" and icon 1739, labeled "Notifications." In this example, MAPpage result 1752 shows a property that is for sale by agent for $5,000,000, and the location of the property is highlighted on interactive digital map 1754 (e.g., at location 1756). Although FIG. 17E shows a single search result, in some embodiments, user interface 1750 displays more than one search result. For example, in some embodiments, the user may swipe right and/or left on MAPpage result 1752 to scroll through other real estate properties that match the search criteria. As the user scrolls through different properties that are displayed in MAPpage result 1752, the highlighted location 1756 on interactive digital map 1754 is updated. As another example, in some embodiments, user interface 1750 displays multiple MAPpage results that satisfy the search criteria in a scrollable list.

Figure 17F:
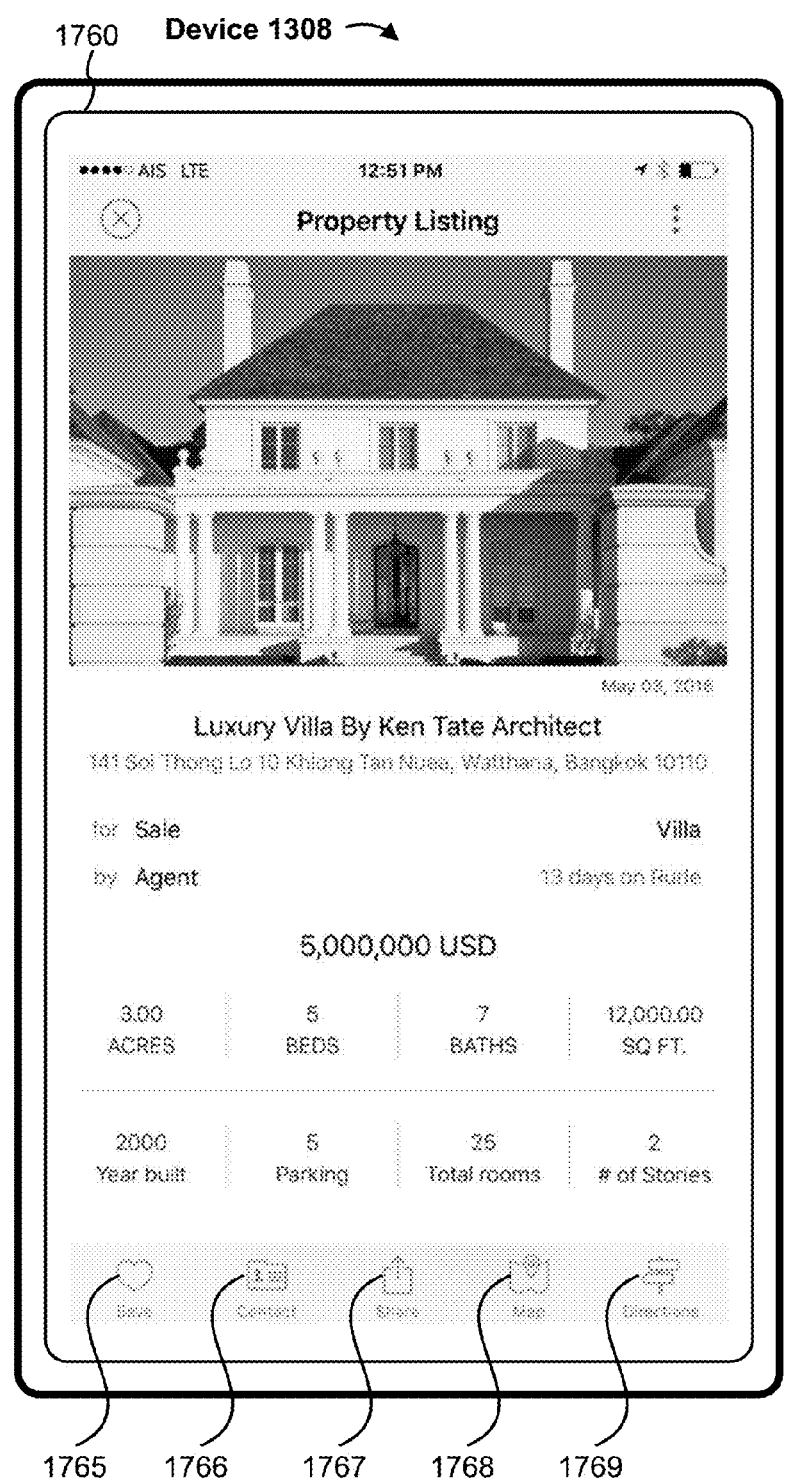

FIG. 17F illustrates an exemplary user interface 1760 for displaying additional information about a search result (e.g., in response to selecting MAPpage result 1752 of FIG. 17E), in accordance with some embodiments. In some embodiments, user interface 1760 includes the following elements, or a subset or superset thereof: information about the MAPpage result (e.g., photograph(s), address, price, square footage, number of bedrooms and bathrooms, etc.); icon 1765, labeled "Save;" icon 1766, labeled "Contact;" icon 1767, labeled "Share;" icon 1768, labeled "Map;" and icon 1769, labeled "Directions." A user has the option to save the listing (e.g., by selecting "Save" icon 1765), to contact the listing party (e.g., by selecting "Contact" icon 1766), to share the listing (e.g., by selecting "Share" icon 1767), to show a map of the listing (e.g., by selecting "Map" icon 1768), and/or to get directions to the listing (e.g., by selecting "Directions" icon 1769).

Figure 17G:

FIG. 17G illustrates an exemplary user interface 1770 for displaying a search result (e.g., in response to a search initiated from user interface 1730 of FIG. 17C from "Jobs" icon 1732-g, for a search from an employer for potential job candidates), in accordance with some embodiments. In some embodiments, user interface 1770 includes the following elements, or a subset or superset thereof: MAPpage result 1772; interactive digital map 1774; icon 1735, labeled "Featured;" icon 1736, labeled "Promotion;" icon 1737, labeled "Map Page;" icon 1738, labeled "Locate;" and icon 1739, labeled "Notifications." In this example, MAPpage result 1772 shows a job candidate with a business degree and three years of experience, and the location of the job candidate is highlighted on interactive digital map 1774 (e.g., at location 1776). Although FIG. 17G shows a single search result, in some embodiments, user interface 1770 displays more than one search result. For example, in some embodiments, the user may swipe right and/or left on MAPpage result 1772 to scroll through other job candidates that match the search criteria. As the user scrolls through different job candidates that are displayed in MAPpage result 1772, the highlighted location 1776 on interactive digital map 1774 is updated. As another example, in some embodiments, user interface 1770 displays multiple job candidates that satisfy the search criteria in a scrollable list.

Figure 17H:
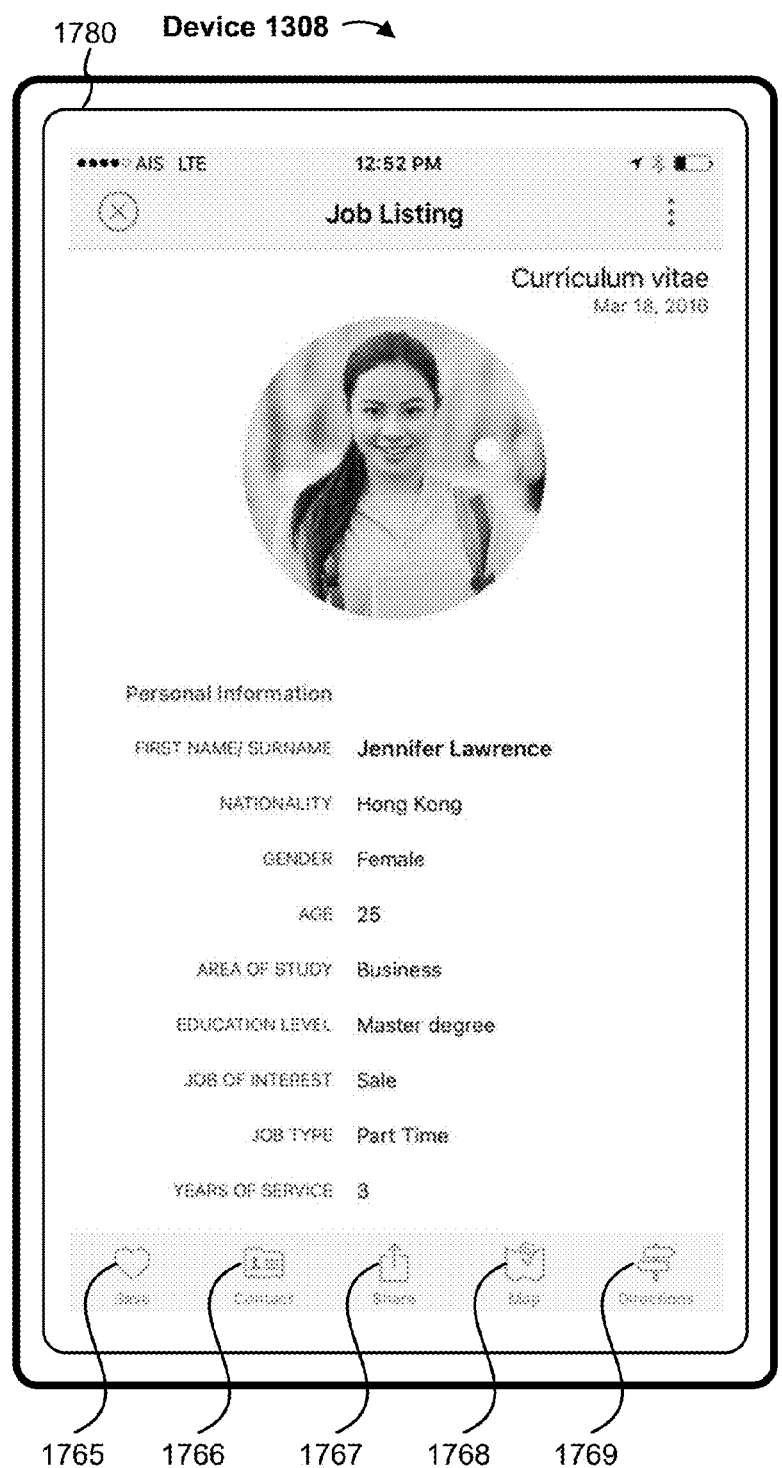

FIG. 17H illustrates an exemplary user interface 1780 for displaying additional information about a search result (e.g., in response to selecting MAPpage result 1772 of FIG. 17G), in accordance with some embodiments. In some embodiments, user interface 1780 includes the following elements, or a subset or superset thereof: information about the MAPpage result (e.g., photograph, name, education level, etc.); icon 1765, labeled "Save;" icon 1766, labeled "Contact;" icon 1767, labeled "Share;" icon 1768, labeled "Map;" and icon 1769, labeled "Directions." A user has the option to save the job candidate (e.g., by selecting "Save" icon 1765), to contact the job candidate (e.g., by selecting "Contact" icon 1766), to share the job candidate's information (e.g., by selecting "Share" icon 1767), to show a map of the location of the job candidate (e.g., by selecting "Map" icon 1768), and/or to get directions to the location of the job candidate (e.g., by selecting "Directions" icon 1769).

Figure 18A:
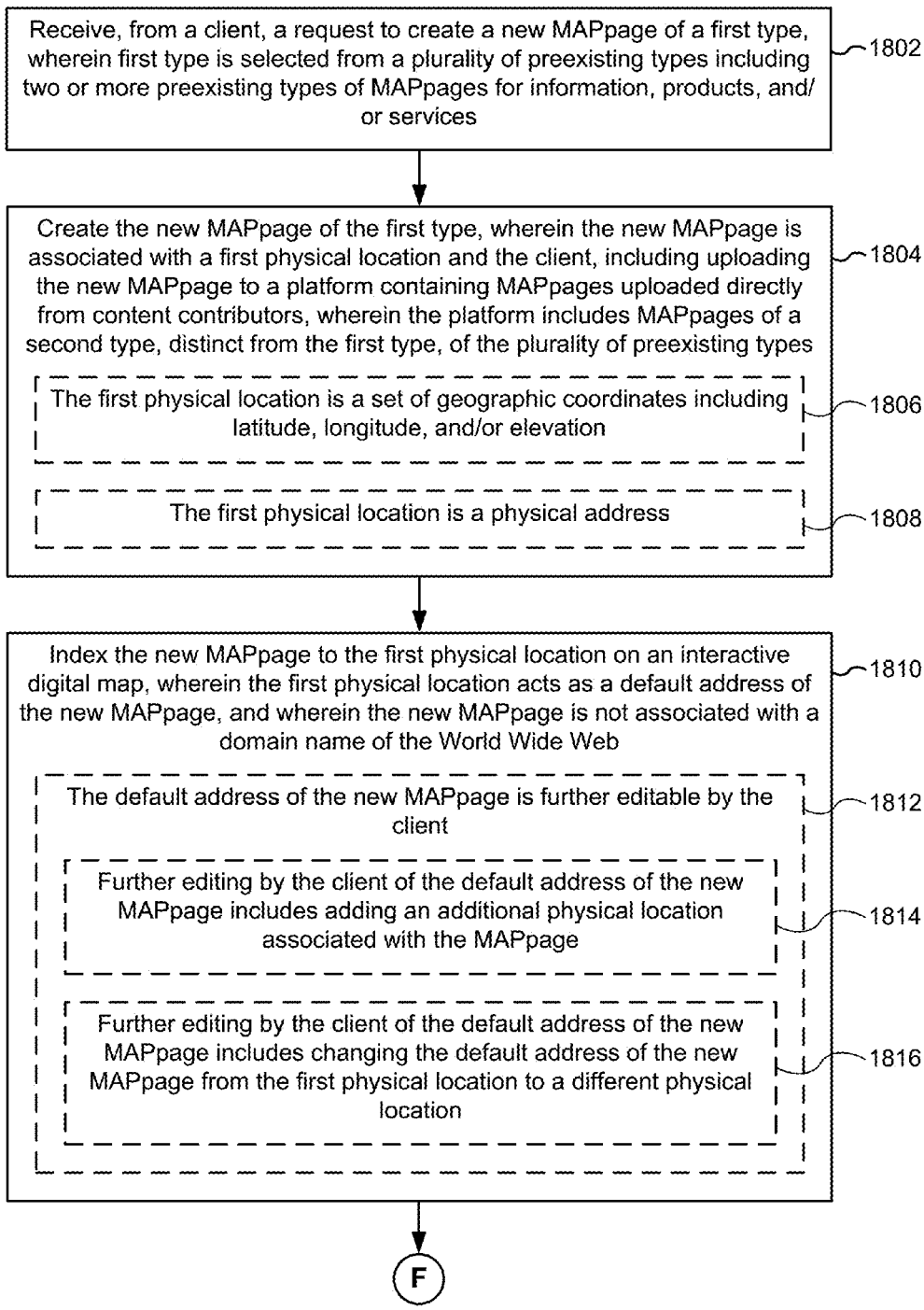
Figure 18B:
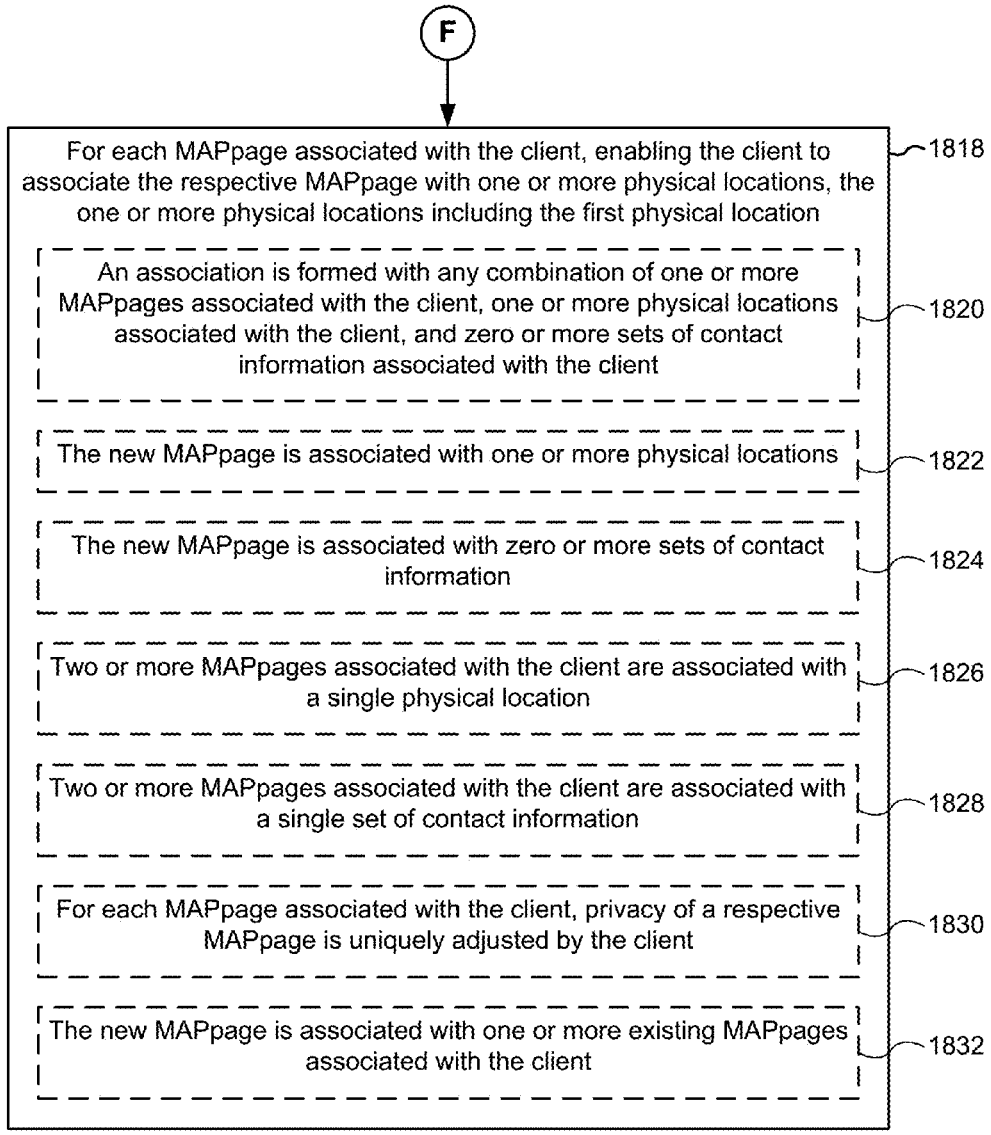

FIGS. 18A-18C are flow diagrams illustrating a method 1800 of creating, indexing, managing, and/or searching user-managed online pages (e.g., MAPpages) linked to locations on an interactive digital map, in accordance with some embodiments. In some embodiments, method 1800 is performed at a server system (e.g., server system 1311-a, FIGS. 13 and 14, or system 200, FIG. 2, or server systems 500, FIG. 5). In some embodiments, various operations performed with reference to method 1800 can be distributed across multiple servers or multiple server systems. In some embodiments, method 1800 is governed by instructions that are stored in a non-transitory computer readable storage medium and that are executed by one or more processors of a server system, such as the one or more processing units (CPUs) 1402 of server system 1311-a, shown in FIG. 14. For ease of explanation, the following describes method 1800 as performed by a single server system (e.g., server system 1311-a). Some operations in method 1800 are, optionally, combined and/or the order of some operations, is optionally, changed. Also, in some embodiments, operations shown in separate figures (e.g., FIGS. 18A-18C) may be combined to form other methods, and operations shown in the same figure and/or discussed in association with the same method may be separated into different methods.

Furthermore, descriptions of elements or operations of the method 1800 which have been described above will be omitted, for clarity and brevity.

As described below, method 1800 provides an efficient and user-friendly way to create, index, search, and manage online pages or documents easily without having any knowledge of HTML or computer programming languages. The method provides a platform for users to create, develop, index, search, share, post, advertise, promote and manage online pages or documents. The method provides a platform for users to interact, comment, provide feedback, communicate, and conduct business transactions with other users.

A server system receives (1802), from a client, a request to create a new MAPpage of a first type, wherein the first type is selected from a plurality of preexisting types including two or more preexisting types of MAPpages for information, products, and/or services. In some embodiments, the request to create the new MAPpage is received from a client (e.g., over communication network 1306, FIG. 13, or over communication network 203, FIG. 2). In some embodiments, the plurality of preexisting types of MAPpages comprises a single listing page, a multi-listing page, a user profile page, a resume page, a company profile page, a promotion page, an advertising page, a cover page, an author page, a content page, a text page, a media page, a gallery page, a booking page, a reservation page, an ordering page, and/or other types such as those listed in FIG. 6. In some embodiments, the plurality of preexisting types of MAPpages comprises a subtype of MAPpage, including property, auto, products, or services on a single-listing page. In some embodiments, a request to create the new MAPpage of the first type is received in response to input from a user of a client device (e.g., client device 1308, FIG. 13). In some embodiments, a receiving module (e.g., receiving module 1422, FIG. 14) is used to receive, from a client, a request to create a new MAPpage of a first type, as described above with respect to FIG. 14.

Figure 20:
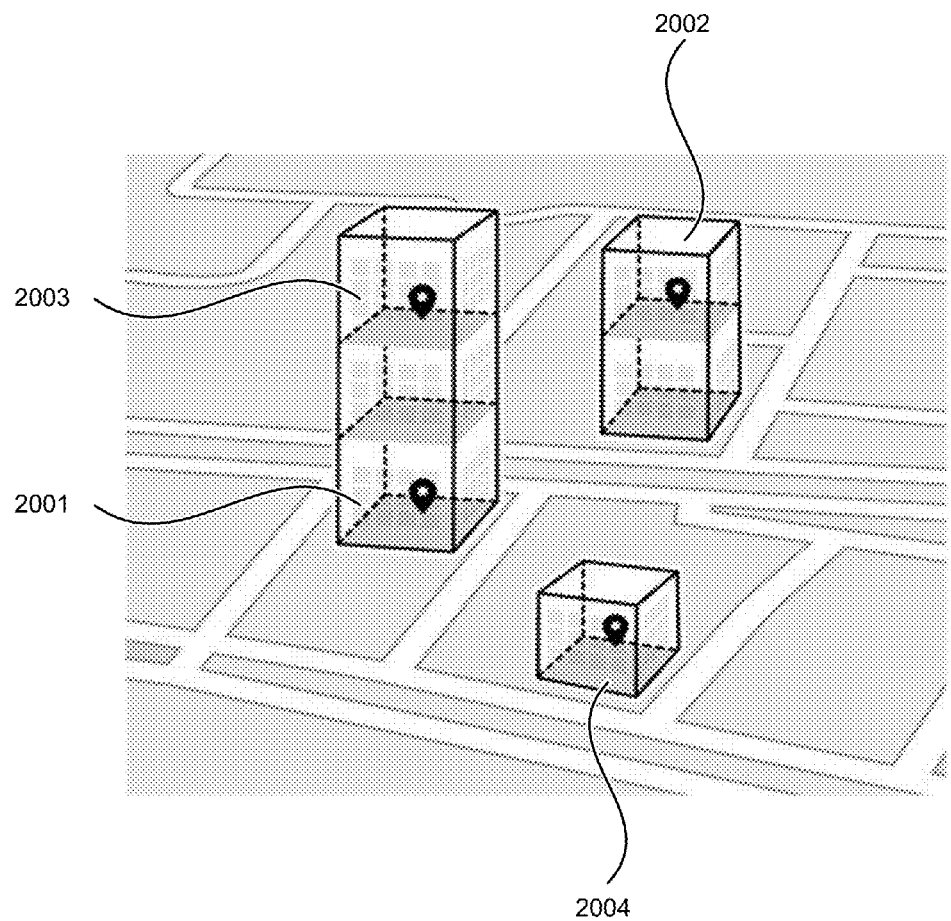
FIG. 20 illustrates an exemplary user interface of a three-dimensional physical location on an interactive digital map, in accordance with some embodiments.

The server system creates (1804) the new MAPpage of the first type, wherein the new MAPpage is associated with a first physical location (e.g., a specific physical location, such as an address, or a set of geographic coordinates including latitude, longitude, and/or elevation, as shown in FIG. 20) and the client, including uploading the new MAPpage of the first type to a platform containing MAPpages uploaded directly from content contributors, wherein the platform includes MAPpages of a second type, distinct from the first type, of the plurality of preexisting types. In some embodiments, the platform containing MAPpages includes Private MAPpages (e.g., MAPpages created and managed by users) and Public MAPpages (e.g., MAPpages created and managed by third party organizations and modified/updated by social contributors (optionally, with approval from the third party organization that manages the MAPpage)). In some embodiments, content contributors include users, such as the client, who create and manage their own MAPpages (e.g., one or more Private MAPpages). In some embodiments, content contributors include third party organizations that create and manage Public MAPpages. In some embodiments, content contributors include social contributors who modify and update Public MAPpages. In some embodiments, a creating module (e.g., creating module 1426, FIG. 14) is used to create the new MAPpage of the first type, wherein the new MAPpage is associated with a first physical location and the client, as described above with respect to FIG. 14.

In some embodiments, the first physical location is (1806) a set of geographic coordinates including latitude, longitude, and/or elevation. In some embodiments, the first physical location corresponds to a location in three dimensions (e.g., with latitude, longitude, and elevation) on the interactive digital map. For example, for a MAPpage associated with a business on the third floor of an office building (e.g., MAPpage 2003 in FIG. 20), the address of the office building corresponds to the latitude and longitude, and the height of the third floor corresponds to the elevation. In some embodiments, the first physical location corresponds to a location in two dimensions (e.g., with latitude and longitude, but not elevation) on the interactive digital map (e.g., as shown by MAPpage 2004 in FIG. 20). For example, for a MAPpage 2001 associated with a coffee shop (on the ground floor), the address of the coffee shop corresponds to the latitude and longitude.

In some embodiments, the first physical location corresponds to a location in two dimensions (e.g., with latitude and longitude, but not elevation) on the interactive map. For example, a MAPpage associated 2004 with a coffee shop on the ground floor, the address of which corresponds to the latitude and longitude.

In some embodiments, the first location is a physical address (1808). For example, the MAPpage 2004 may associate with a coffee shop located at 123 Main Street, the first physical location is 123 Main Street. In some embodiments, the physical address indicates elevation in addition to latitude and longitude. For example, a MAPpage 2003 associated with a business located at 456 Main Street, Suite 300 (e.g., on the third floor of 456 Main Street), the physical address indicates latitude and longitude (e.g., 456 Main Street) and also elevation (Suite 300).

The method includes uploading the new MAPpage of the first type to a platform containing MAPpages uploaded directly from content contributors. The platform includes MAPpages of a second type, distinct from the first type, of the plurality of preexisting types. In some embodiments, the platform containing MAPpages includes Private MAPpages (e.g., MAPpages created and managed by users) and Public MAPpages (e.g., MAPpages created and managed by third party organizations and modified/updated by social contributors (optionally, with approval from the third party organization that manages the MAPpage)). In some embodiments, content contributors include users, such as the client, who create and manage their own MAPpages (e.g., one or more Private MAPpages). In some embodiments, content contributors include third party organizations that create and manage Public MAPpages. In some embodiments, content contributors include social contributors who modify and update Public MAPpages. In some embodiments, a creating module (e.g., creating module 1426, FIG. 14) and/or a managing module (e.g., managing module 1428) is used to upload the new MAPpage of the first type to a platform containing MAPpages, as described above with respect to FIG. 14.

The sever system indexes (1810) the new MAPpage to the first physical location on an interactive digital map, allowing for searching in the platform (e.g., the MAPpage platform). The first physical location acts as a default address of the new MAPpage. The new MAPpage is not associated with a domain name on the World Wide Web (WWW). In some embodiments, the default address of the new MAPpage is further editable (1812) by the client. In some embodiments, further editing (1814) by the client of the default address of the new MAPpage includes adding an additional physical location associated with the MAPpage. In some embodiments, further editing (1816) by the client of the default address of the new MAPpage includes changing the default address from the first physical location to a different physical address. In some embodiments, a managing module (e.g., managing module 1428) is used to edit the new MAPpage, wherein the new MAPpage is edited, as described above with respect to FIG. 14.

Furthermore, for each MAPpage associated with the client, the client is enabled (1818) to associate the respective MAPpage with one or more physical locations, the one or more physical locations including the first physical location. In some embodiments, a managing module (e.g., managing module 1428) is used to associate the new MAPpage, wherein the new MAPpage is associated with one or more physical locations, as described above with respect to FIG. 14.

In some embodiments, an association (e.g., a relationship in which the items are associated) is formed (1820) with any combination of one or more MAPpages associated with the client, one or more physical locations associated with the client, and zero or more sets of contact information associated with the client. The association forms a many-to-many relationship, which is discussed in detail with respect to FIG. 7, and for sake of brevity, the details are not repeated here.

In some embodiments, the new MAPpage is associated (1822) with one or more physical locations. For example, in some embodiments, a promotion MAPpage is associated with coffee shops at two distinct physical locations. In the present example, a user may own five coffee shops around town, but two of the locations would benefit from a promotion. Thus, the user may associate the promotion MAPpage with the two physical locations. When later, the user decides that another one of the coffee shop locations would benefit from the promotion, the user can associate the promotion MAPpage to an additional location (e.g., with user interface 1595, FIG. 15J). Similarly, when the user decides that a location is successful enough with the promotion, the user can remove the relationship between the promotion MAPpage and the location.

In some embodiments, the new MAPpage is associated (1824) with zero or more sets of contact information. Typically, contact information is associated with the new MAPpage, but a MAPpage could have no associated contact information. In some embodiments, for example, a user profile MAPpage is not associated with contact information. As another example, in some embodiments, a resume MAPpage is associated two sets of contact information (e.g., including work contact information and home contact information).

In some embodiments, two or more MAPpages associated with the client are associated (1826) with a single physical location. For example, a user may be offering multiple products and/or services (e.g., each with a different MAPpage) from a single physical location.

In some embodiments, two or more MAPpages associated with the client are associated (1828) with a single set of contact information. For example, a business (e.g., a bank) with multiple branches may have a single set of contact information for the main business contact information (e.g., the bank's main telephone number, the bank's web site, the bank's email address, etc.).

In some embodiments, for each MAPpage associated with the client, privacy of a respective MAPpage is uniquely adjusted (1830) by the client. For example, when the client has three associated MAPpages, the client can adjust the privacy of a first MAPpage to be completely private (e.g., viewable only by the client), adjust the privacy of a second MAPpage to be partially private (e.g., viewable only by the client and one or more select friends), and adjust the privacy of a third MAPpage to be public (e.g., viewable by all other users).

In some embodiments, the new MAPpage is (1832) associated with one or more existing MAPpages associated with the client. For example, when a client is already associated with multiple branches of a business, if the new MAPpage is for a new branch of the business, the new MAPpage can be associated with one or more existing MAPpages of the existing branches of the business.

In some embodiments, the server system receives (1834), from a second client, a search request for MAPpages in the platform, wherein the search request includes a location parameter and a search parameter; executes the search request concurrently with the location parameter and the search parameter; identifies one or more candidate MAPpages that meet the location parameter and the search parameter; and returns, to the second client, two or more candidate MAPpages in response to the search request, wherein a first candidate MAPpage is displayed with a first set of attributes and a second candidate MAPpage is displayed with a second set of attributes. In some embodiments, the search parameter includes a category parameter for the search request, such as property, automotive, products, services, and jobs. In some embodiments, the search parameter includes an activity parameter for the search request, such as eat, drink, shop, stay, and learn. In some embodiments, the search parameter includes a promotion parameter for promotions in the area specified by the location parameter. In some embodiments, the search parameter includes keywords for the search request. In some embodiments, the second client is the same or different that the first client.

In some embodiments, the search parameter includes an activity parameter for the search request, such as eat, drink, shop, stay, and learn. In some embodiments, the search parameter includes a promotion parameter to search for promotions in the area specified by the location parameter. In some embodiments, the search parameter includes keywords for the search request. In some embodiments, the search parameter includes a search method for the search request (e.g., 'Locate' 1001.1, 'Near Me' 1001.2, 'Promotion' 1001.3, or 'General keyword' 1001.4, as described with respect to FIG. 10.

In some embodiments, the attributes include a premium status of a MAPpage. For example, when a client acquires a premium MAPpage (e.g., an AdPage), the premium MAPpage(s) will have a different look and/or display first/higher in the search results. In some embodiments, the different look may include highlighting the premium MAPpage different on the interactive digital map or the like.

FIGS. 19A-19H illustrate exemplary user interfaces for content pages of user-managed pages (e.g., MAPpages) linked to locations on an interactive digital map, in accordance with some embodiments. Although some of the examples which follow will be given with reference to inputs on a touch-screen display (where the touch-sensitive surface and the display are combined, for example on client device 1308), in some embodiments, the device detects inputs on a touch-sensitive surface that is separate from the display (e.g., inputs on a track pad of a laptop computer) or the device detects inputs from other sources (e.g., inputs from a mouse and/or keyboard of a desktop computer). For convenience of explanation, the embodiments described with reference to FIGS. 19A-19H will be discussed with reference to operations performed on a device with a touch-sensitive display system and/or touch screen. For sake of clarity, FIGS. 19A-19H simply describes the touch screen of device 1308, without describing other details of device 1308, such as various buttons on the device. The user interfaces in FIGS. 19A-19H may include the following elements, or a subset or superset thereof: signal strength indicator(s) for wireless communication(s), such as cellular and Wi-Fi signals; time; Bluetooth indicator; and battery status indicator. These well-known elements are not described in detail so as not to unnecessarily obscure aspects of the disclosed embodiments, and may be omitted from the Figures for clarity and ease of description.

In the present embodiments, the content pages are configured to be read much like a printed Magazine. In some embodiments, such as the present exemplary embodiment, the MAPpage comprises a cover page, an author page, a plurality of media and/or further content pages. The user navigates the content pages by scrolling or various commands well known in the art of phone navigation.

Furthermore, in some embodiments, such as those shown in FIGS. 19A-19E, various user interfaces include a set of icons 1902, 1904, 1906, 1908, 1910. In some embodiments, the icons 1902 to 1910 are temporarily displayed according to a command of the user, such as a touch command or voice command. When no command has been input for a predetermined time period, the icons may become temporarily translucent or transparent in order to improve the aesthetic appearance of the MAPpage, and may reappear on command. In some embodiments, the icon 1902 is configured to allow the user to navigate to the previous page of the MAPpage, allow the user to navigate to an initial page of the MAPpage, and/or allow the user to exit the MAPpage. In some embodiments, the icon 1904 is configured to allow the user to locate the MAPpage on the interactive digital map and/or allow the user to receive directions to the physical location of the MAPpage. In some embodiments, the icon 1906 is configured to allow the user to view and/or participate in a forum, a thread, a comments section, and/or a predetermined description of the page written by a MAPpages content contributor(s). In some embodiments, the icon 1908 is configured to allow the user to bookmark the MAPpage for future viewing, allow the user to view a listing of previously saved bookmarks, and/or allow the user to view a listing of MAPpages associated with the MAPpage. Furthermore, in some embodiments, the icon 1910 is configured to allow the user to view a listing of additional options or commands that may not be included in the above icons 1902, 1904, 1906, and 1908. For example, the icon 1910 may include any of the content from the above icons or include auxiliary options useful to the user. However, the present invention is not limited to the above icons, and may include any number of icons having features well known in the art of phone interface navigation icons.

Furthermore, content shown and described in FIGS. 19A-19H is provided by the content contributors of a given MAPpage, or may be provided by a user or community of the MAPpage.

Furthermore, a plurality of elements may display on various interfaces of FIGS. 19A-19H, and the present invention is not limited to the specific number described below. For example, when an interface is described as having text media content, the interface may include a plurality of text or media content.

Figure 19A:
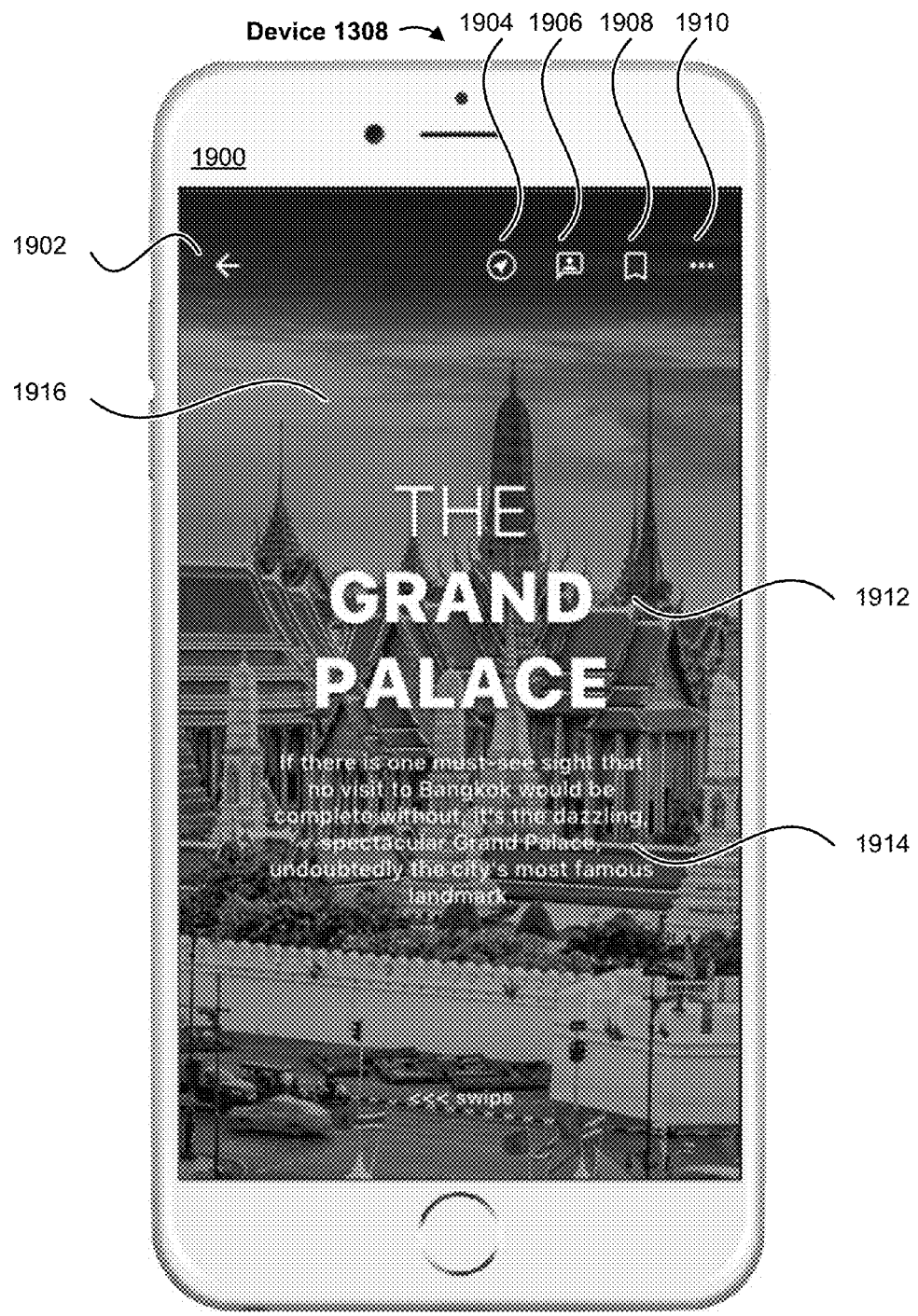
FIGS. 19A-19H illustrate exemplary user interfaces for various content pages of user-managed online pages (e.g., MAPpages) linked to locations on an interactive digital map, in accordance with some embodiments.

FIG. 19A illustrates an exemplary user interface 1900 for a cover page of a MAPpage and information associated with the MAPpage. The user interface 1900 comprises a background image 1916. In some embodiments, the image 1916 may be a plurality of images, video, or text. In some embodiments, the interface 1900 includes a title 1912 and a brief description 1914; however, the present invention is not limited thereto. For instance, in another exemplary embodiment description 1914 may be omitted, or only image 1916 is displayed.

Figure 19B:
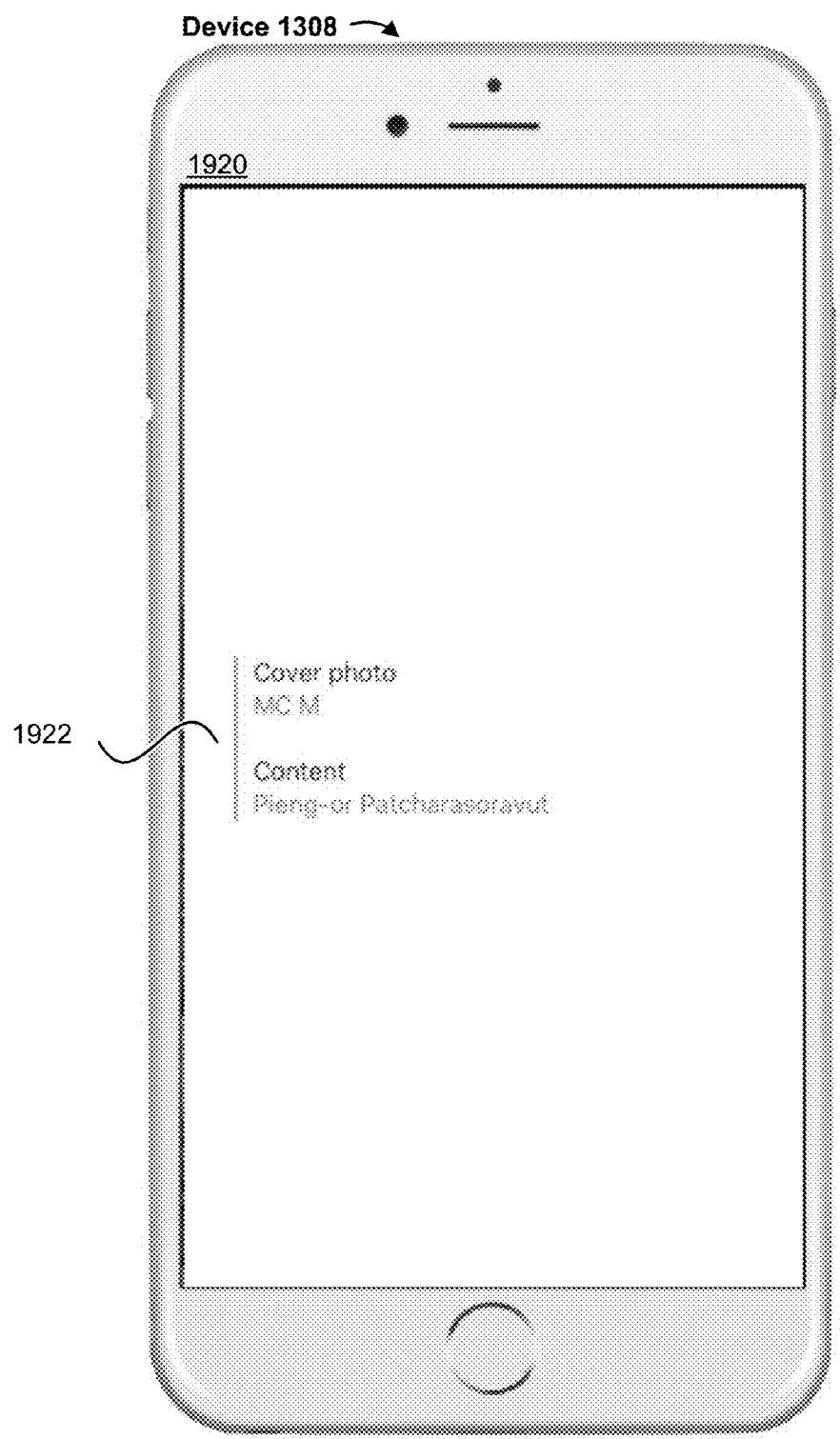

FIG. 19B illustrates an exemplary user interface 1920 for an author page, in accordance with some embodiments. In the present exemplary embodiment, the interface 1920 is configured to display crediting information 1922 for the image 1916 of FIG. 19A; however, the present invention is not limited thereto. For instance, in another exemplary embodiment, information 1922 may include relevant information for the creator, or content contributor, of the MAPpage. In some embodiments, interface 1920 may be superimposed or combined with interface 1910.

Figure 19C:
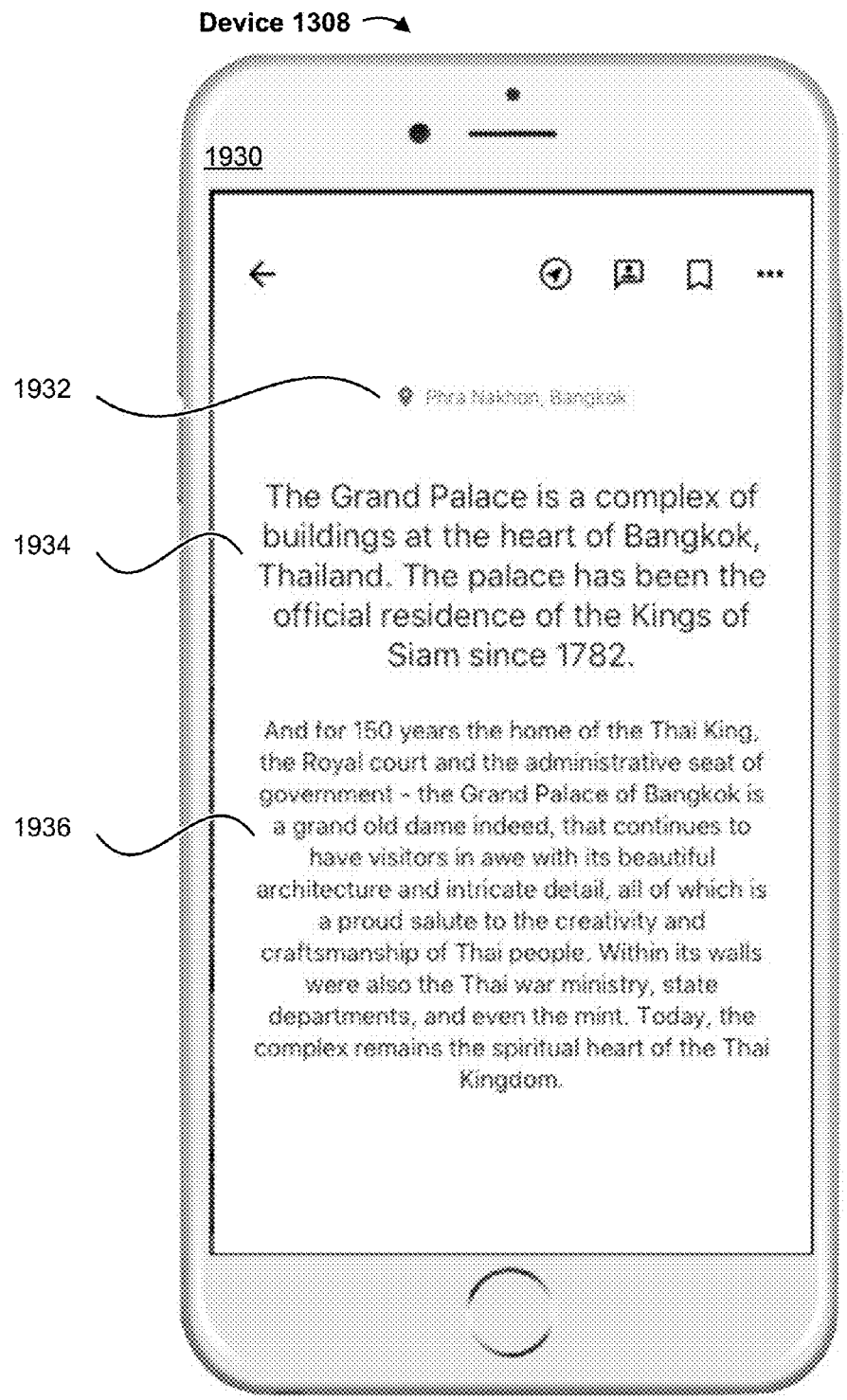

FIG. 19C illustrates an exemplary user interface 1930 for a text content page, in accordance with some embodiments. In the present case, the interface 1930 includes geographic information 1932 regarding the physical location or physical address of the MAPpage. In some embodiments, information 1932 may include a link to the location of the MAPpage on the digital interactive map. In some embodiments, text 1934, 1936 includes information provided by the content contributor regarding the MAPpage, but may include information provided by the user.

Figure 19D:
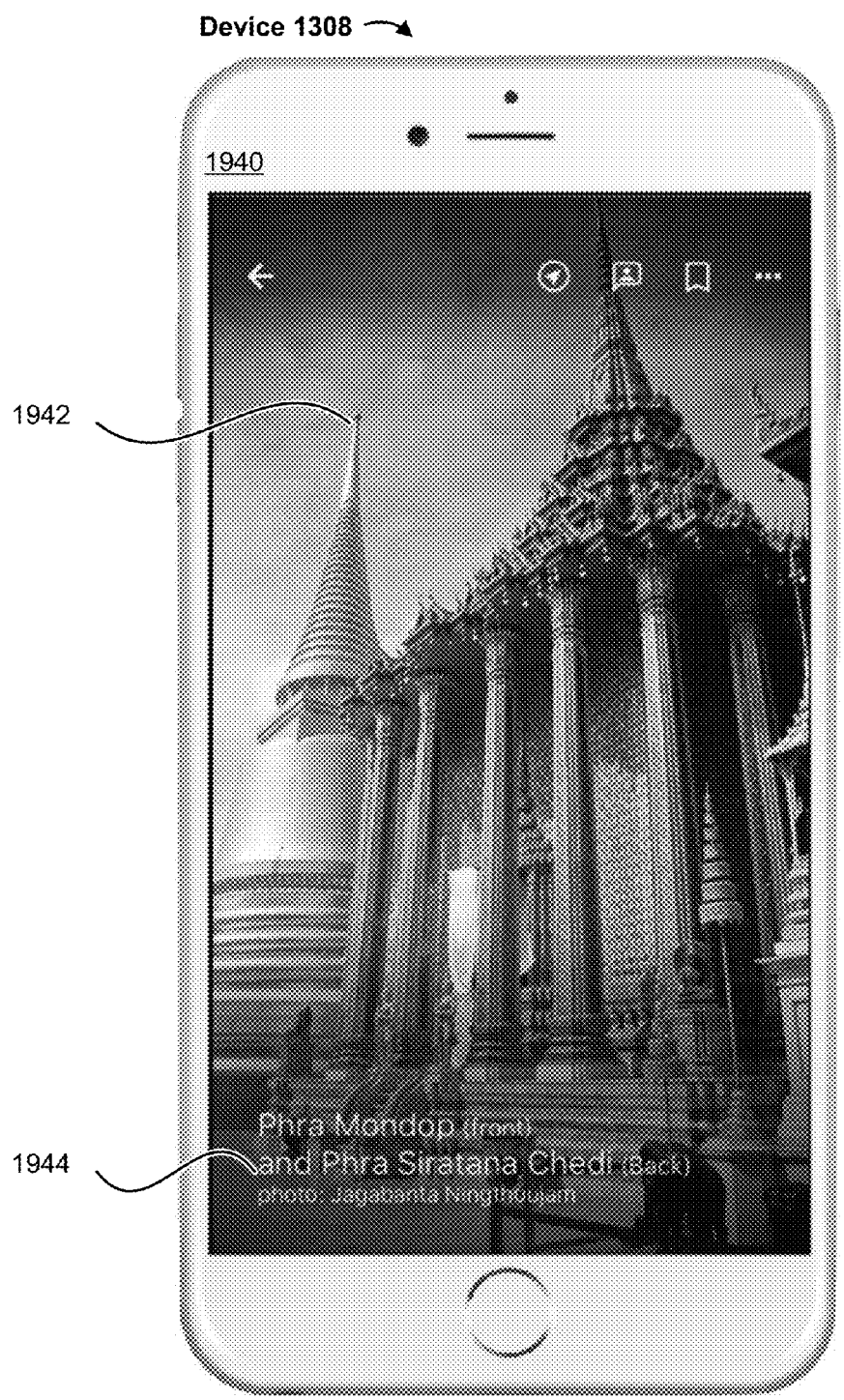

FIG. 19D illustrates an exemplary user interface 1940 of a media page, in accordance with some embodiments. The interface 1940 includes media content 1942 and text 1944. In the present embodiment, the content 1942 is an image relevant to the MAPpage but may also be a video, a GIF, a plurality of images, or the like. In some embodiments, content 1942 is provided by the content contributor of the MAPpage or the user. In the present case, text 1944 includes a description of the content 1942; however, the present invention is not limited thereto. In some embodiments, text 1944 may be omitted such that only content 1942 is displayed on the interface 1940.

Figure 19E:
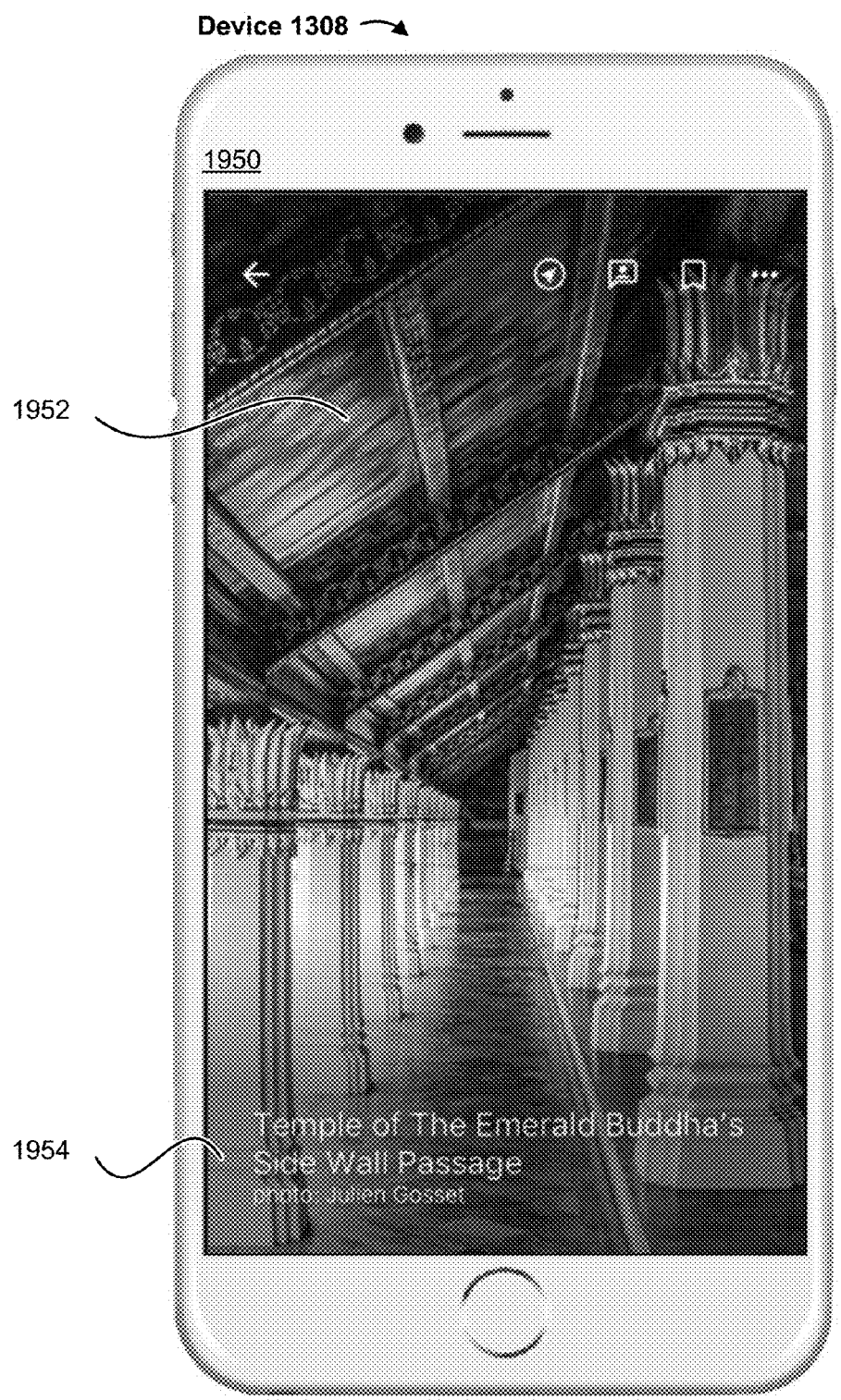

FIG. 19E illustrates another exemplary user interface 1950 of a media page comprising content 1952 and text 1954, in accordance with some embodiments.

Figure 19F:
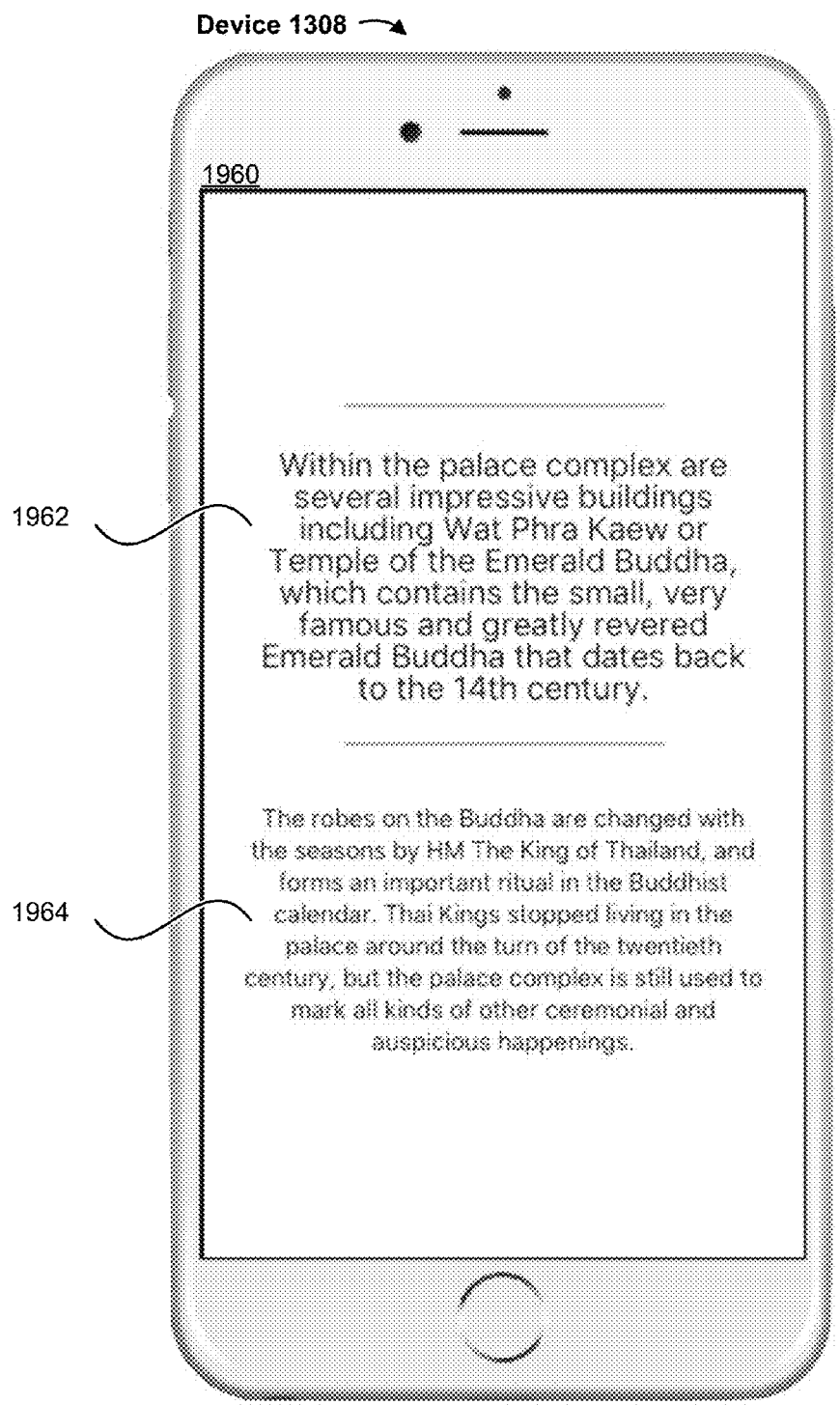

FIG. 19F illustrates another exemplary user interface 1960 of a content page, in accordance with some embodiments. The interface 1960 displays text 1962, 1964 which pertains to the content of a previous page. In some embodiments, one of text 1962 or 1964 may be displayed, or the interface 1960 may include any number of texts.

Figure 19G:
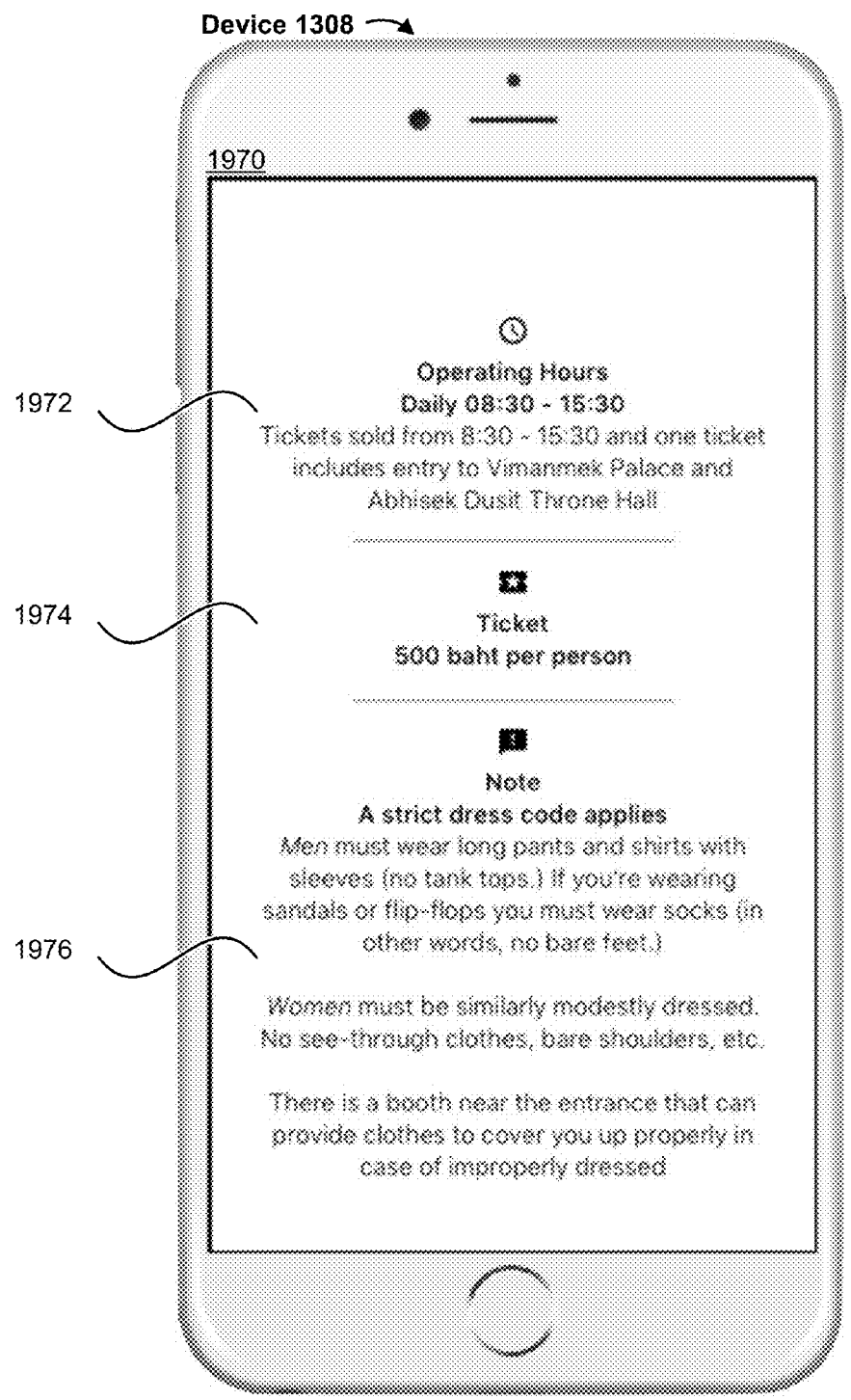

FIG. 19G illustrates yet another exemplary user interface 1970 of a content page, in accordance with some embodiments. In the present embodiment, the interface 1970 includes text 1972, 1974, 1976 which contain relevant information to the current MAPpage. In the present embodiment, text 1974 may include an external or internal link to a purchase a product, view a website, or view another MAPpage; however, the present invention is not limited thereto. In some embodiments, text 1974 may include a feature to automatically purchase a product with predetermined purchasing information.

Figure 19H:
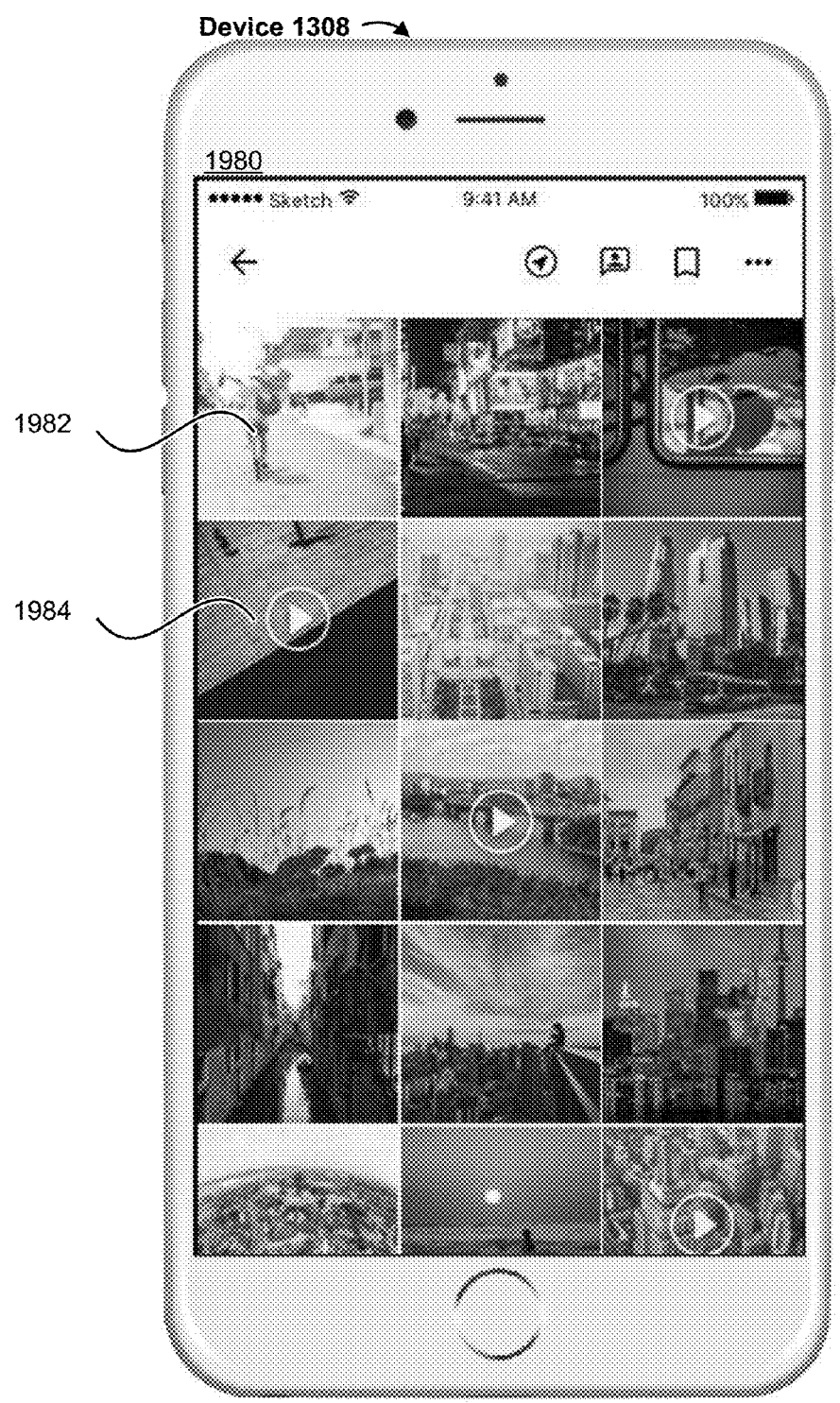

FIG. 19H illustrates an exemplary user interface 1980 of a media album page, in accordance with some embodiments. The interface 1980 comprises a collection of media content, such a plurality of images including an image 1982 and/or a plurality of videos including a video 1984; however, the present invention is not limited thereto. For instance, in some embodiments a media album may comprise only one media content. In some embodiments, the user may select media content from the media album page. Selecting the media content can open a media page of the media content, such as the media page of FIG. 19D or FIG. 19E.

FIG. 20 illustrates an exemplary user interface of a three-dimensional physical location on an interactive digital map, in accordance with some embodiments. In some embodiments, the user may need to differentiate locations of MAPpages in two and/or three dimensions. As described above, the MAPpage 2001 can represent a location on the ground for of a multi-floored building. The MAPpage 2003 represents a location in the same building but located on a different floor from the MAPpage 2001. MAPpages 2001, 2002, and 2003 can be represented in three dimensions, requiring a latitude, a longitude, and an elevation to describe an accurate and precise location. The MAPpage 2004 may be presented in two dimensions, as only a latitude and a longitude describe an accurate and precise location for a single story building.

It will be understood that, although the terms "first," "second," etc. are, in some instances, used herein to describe various elements, these elements should not be limited by these terms. These terms are only used to distinguish one element from another. For example, a first type could be termed a second type, and, similarly, a second type could be termed a first type, without changing the meaning of the description, so long as all occurrences of the "first type" are renamed consistently and all occurrences of the "second type" are renamed consistently. The first type and the second type are both types, but they are not the same type, unless the context clearly indicates otherwise.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" is, optionally, construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A computer-implemented method, comprising:
at a server system:
receiving, from a client, a request to create a new MAPpage of a first type, wherein the first type is selected from a plurality of preexisting types including two or more preexisting types of MAPpages for information, products, and/or services:
creating the new MAPpage of the first type, wherein the new MAPpage is associated with a first physical location and the client, including uploading the new MAPpage of the first type to a platform containing MAPpages uploaded directly from content contributors, wherein the platform includes MAPpages of a second type, distinct from the first type, of the plurality of preexisting types;
indexing the new MAPpage to the first physical location on an interactive digital map, wherein the first physical location acts as a default address of the new MAPpage, and wherein the new MAPpage is not associated with a domain name on the World Wide Web (WWW); and
for each MAPpage associated with the client, enabling the client to associate the respective MAPpage with one or more physical locations, the one or more physical locations including the first physical location.

2. The method of claim 1, wherein the first physical location is a set of geographic coordinates including latitude, longitude, and/or elevation.

3. The method of claim 1, wherein the first physical location is a physical address.

4. The method of claim 1, wherein the default address of the new MAPpage is further editable by the client.

5. The method of claim 4, wherein further editing by the client of the default address of the new MAPpage includes adding an additional physical location associated with the MAPpage.

6. The method of claim 4, wherein further editing by the client of the default address of the new MAPpage includes changing the default address of the MAPpage from the first physical location to a different physical location.

7. The method of claim 1, wherein an association is formed with any combination of one or more MAPpages associated with the client, one or more physical locations associated with the client, and zero or more sets of contact information associated with the client.

8. The method of claim 1, wherein the new MAPpage is associated with one or more physical locations.

9. The method of claim 1, wherein the new MAPpage is associated with zero or more sets of contact information.

10. The method of claim 1, wherein two or more MAPpages associated with the client are associated with a single physical location.

11. The method of claim 1, wherein two or more MAPpages associated with the client are associated with a single set of contact information.

12. The method of claim 1, wherein for each MAPpage associated with the client, privacy of a respective MAPpage is uniquely adjusted by the client.

13. The method of claim 1, wherein the new MAPpage is associated with one or more existing MAPpages associated with the client.

14. The method of claim 1, including:
at the server system:
receiving, from a second client, a search request for MAPpages in the platform, wherein the search request includes a location parameter and a search parameter;
executing the search request concurrently with the location parameter and the search parameter;
identifying one or more candidate MAPpages that meet the location parameter and the search parameter; and
returning, to the second client, two or more candidate MAPpages in response to the search request, wherein:
a first candidate MAPpage is displayed with a first set of attributes, and
a second candidate MAPpage is displayed with a second set of attributes.

15. A server system comprising one or more processors and memory, the memory storing instructions that, when executed by the one or more processors, cause the server system to:
receive, from a client, a request to create a new MAPpage of a first type, wherein the first type is selected from a plurality of preexisting types including two or more preexisting types of MAPpages for information, products and/or services;
create the new MAPpage of the first type, wherein the new MAPpage is associated with a first physical location and the client, including uploading the new MAPpage of the first type to a platform containing MAPpages uploaded directly from content contributors, wherein the platform includes MAPpages of a second type, distinct from the first type, of the plurality of preexisting types;
index the new MAPpage to the first physical location on an interactive digital map, wherein the first physical location acts as a default address of the new MAPpage, and wherein the new MAPpage is not associated with a domain name on the World Wide Web (WWW); and
for each MAPpage associated with the client, enable the client to associate the respective MAPpage with one or more physical locations, the one or more physical locations including the first physical location.

16. A non-transitory computer readable storage medium storing one or more programs, the one or more programs comprising instructions that, when executed by a server system, cause the server system to:
receive, from a client, a request to create a new MAPpage of a first type, wherein the first type is selected from a plurality of preexisting types including two or more preexisting types of MAPpages for information, products and/or services;
create the new MAPpage of the first type, wherein the new MAPpage is associated with a first physical location and the client, including uploading the new MAPpage of the first type to a platform containing MAPpages uploaded directly from content contributors, wherein the platform includes MAPpages of a second type, distinct from the first type, of the plurality of preexisting types;
index the new MAPpage to the first physical location on an interactive digital map, wherein the first physical location acts as a default address of the new MAPpage, and wherein the new MAPpage is not associated with a domain name on the World Wide Web (WWW); and
for each MAPpage associated with the client, enable the client to associate the respective MAPpage with one or more physical locations, the one or more physical locations including the first physical location.

* * * * *